USO08493391B2

(12) United States Patent
Arabolos

(10) Patent No.: US 8,493,391 B2
(45) Date of Patent: Jul. 23, 2013

(54) GENERATING DESIGNS FOR PRODUCT ADORNMENT

(75) Inventor: John Arabolos, West Haven, CT (US)

(73) Assignee: Image Terrain, Inc., West Haven, CT (US)

( * ) Notice: Subject to any disclaimer, the term of this patent is extended or adjusted under 35 U.S.C. 154(b) by 1030 days.

(21) Appl. No.: 12/509,912

(22) Filed: Jul. 27, 2009

(65) Prior Publication Data

US 2010/0020084 A1 Jan. 28, 2010

Related U.S. Application Data

(60) Provisional application No. 61/137,141, filed on Jul. 25, 2008, provisional application No. 61/135,988, filed on Jul. 25, 2008, provisional application No. 61/137,151, filed on Jul. 25, 2008, provisional application No. 61/135,996, filed on Jul. 25, 2008, provisional application No. 61/135,987, filed on Jul. 25, 2008.

(51) Int. Cl.
*G09G 5/00* (2006.01)
*G06T 11/20* (2006.01)

(52) U.S. Cl.
USPC .......................................... 345/441; 345/672

(58) Field of Classification Search
USPC .............. 345/419, 420, 441, 672, 674; 703/1; 382/190; 430/396
See application file for complete search history.

(56) References Cited

U.S. PATENT DOCUMENTS

| 6,682,879 | B2 * | 1/2004 | Conk | 430/396 |
|---|---|---|---|---|
| 2003/0002057 | A1 | 1/2003 | Kono | |
| 2003/0058254 | A1 | 3/2003 | Dworsky | |
| 2003/0145497 | A1 | 8/2003 | Leslie | |
| 2004/0181373 | A1 * | 9/2004 | Lachman | 703/1 |
| 2006/0076732 | A1 * | 4/2006 | Chiou | 273/153 R |
| 2009/0053452 | A1 * | 2/2009 | Takahashi | 428/44 |
| 2009/0310864 | A1 * | 12/2009 | Takagi et al. | 382/190 |

FOREIGN PATENT DOCUMENTS

EP 0945831 9/1999

OTHER PUBLICATIONS

Pickover, et al., Electronic Kaleidoscopes for the Mind, Computer Graphics Forum, vol. 12, No. 1, 1993, pp. 41-46.

(Continued)

*Primary Examiner* — Chante Harrison
(74) *Attorney, Agent, or Firm* — McCarter & English, LLP

(57) ABSTRACT

Ordered pattern are generated based on an existing image by providing an isosceles right triangle-shaped first image, and creating a second image based thereon. The second image at least includes a first portion entirely formed from a plurality of mirrored or unmirrored, rotated or unrotated, and non-overlapping instances of the first image arranged in the shape of a complete rectangle. The legs of the complete rectangle are at least as long as either the legs or the hypotenuse of the isosceles right triangle. The first portion of the second image encompasses an area at least twice that of the first image. The plurality of instances of the first image are joined at their respective isosceles right triangle hypotenuses, legs, and corners. A computer system for performing various embodiments of such method is provided, as are a wide variety of products adorned with attractive examples of such ordered images.

18 Claims, 43 Drawing Sheets

OTHER PUBLICATIONS

Sattgast, Kaleidoscope Tutorial for Adobe Photoshop Users, Scrapper's Guide [online], 2006, pp. 1-19, XP002551767; http://web.archive.org/web/20060526005611; http://www.scrappersguide.com/tutorial.

Fischer, Tutorial: Stripes and Plaids in Paint Shop Pro, Internet Article, [online], 2007, XP002551768; http://web.archive.org/web/20070221160517; http://www.digitalscrapbookplace.com/university/tutorials/pdf/psp_stripeplaid_pf.pdf.

Ulead Systems, Inc., Photo Express Version 4.0, User Manual, [online], 2000, pp. 1-43, XP002551769; http://www.mercurystyle.com/manuals/S3 51 ManualEnglish.pdf.

Anonymous; KaleiderTM 4.2(for Windows 98, NT, XP and Vista); [online]; 2007, XP002551770; http://web.archive.org/web/2007109184147; http://www.whizical.com/.

PCT International Search Report dated Nov. 13, 2009.

* cited by examiner

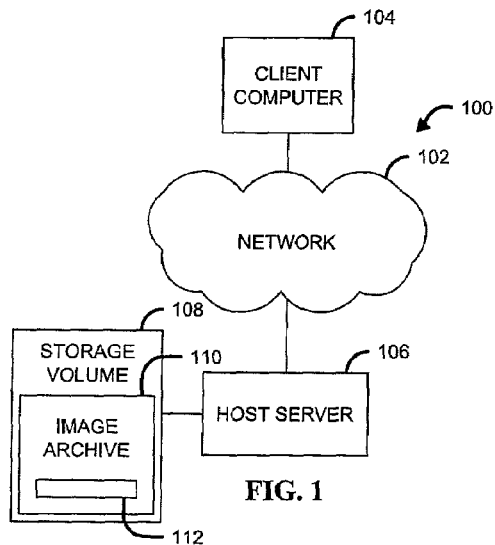
FIG. 1
FIG. 2
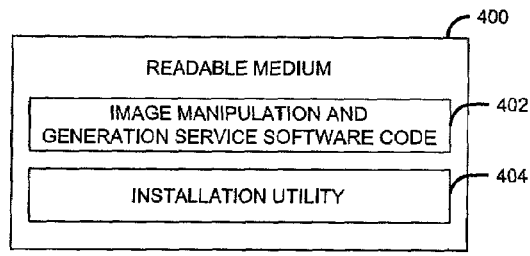
FIG. 4
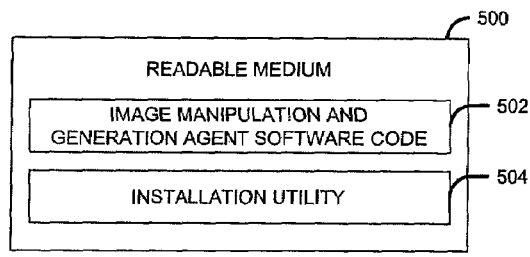
FIG. 5
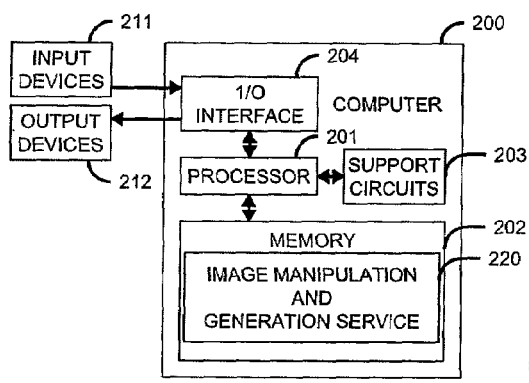
FIG. 3
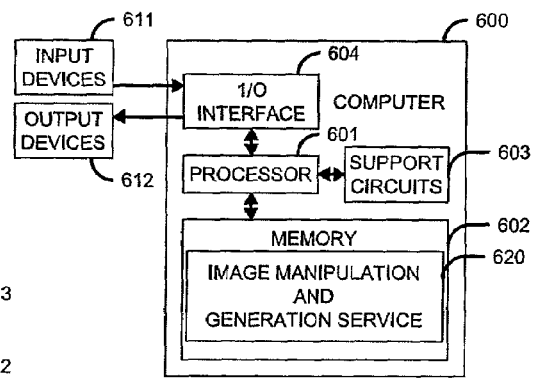
FIG. 6

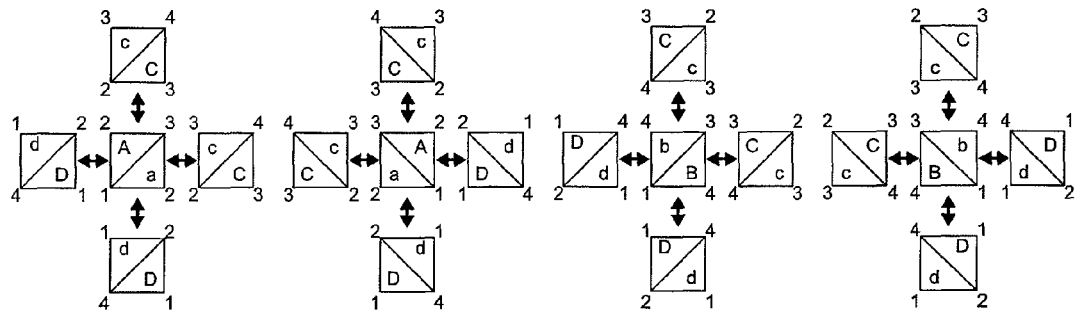
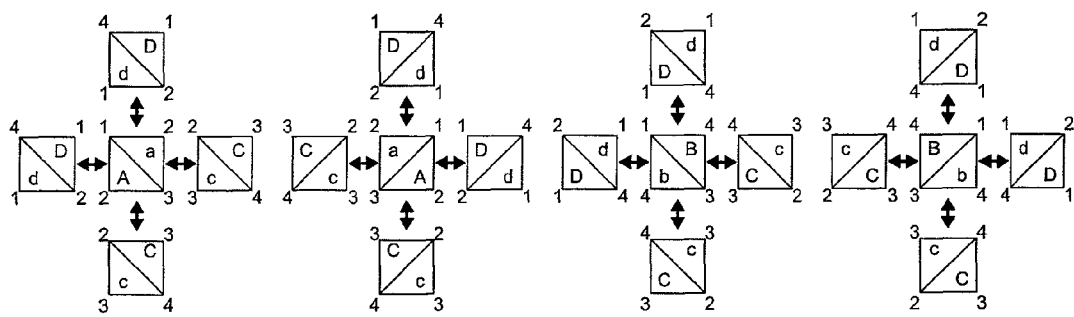
FIG. 11  FIG. 12
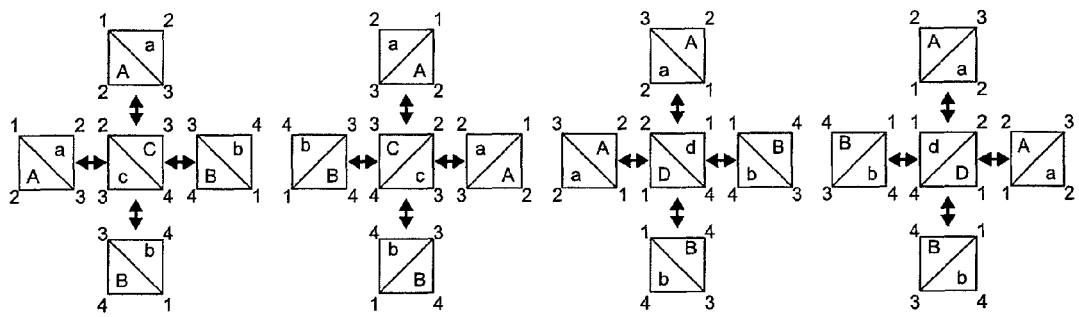
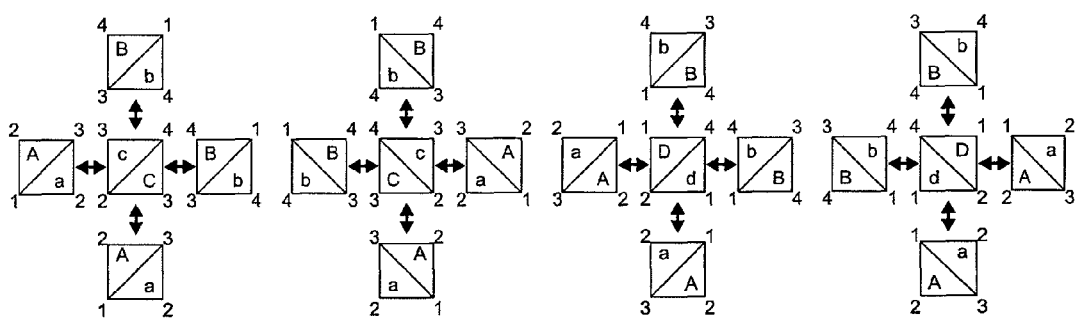
FIG. 13  FIG. 14

GENERATING DESIGNS FOR PRODUCT ADORNMENT

CROSS REFERENCE TO RELATED APPLICATIONS

This application is based on and claims the benefit of the following U.S. provisional patent applications: 1) Ser. No. 61/137,141 filed Jul. 25, 2008; 2) Ser. No. 61/135,988 filed Jul. 25, 2008; 3) Ser. No. 61/137,151 filed Jul. 25, 2008; 4) Ser. No. 61/135,996 filed Jul. 25, 2008; and 5) Ser. No. 61/135,987 filed Jul. 25, 2008. The entire content of each of the foregoing provisional patent applications is incorporated herein by reference.

BACKGROUND

1. Technical Field

The invention relates generally to apparatus, systems, and methods for generating product designs. More particularly, the invention relates to apparatus, systems and methods for creating new and/or coordinated patterns and other images from existing images, including found or existing natural reference materials, and found or existing synthetic images, the latter including synthetically designed motifs available within the public domain.

2. Background Art

For millennia, artists, designers, and artisans alike have sought to incorporate attractive colors, textures, and patterns into the products and other objects of their labors, well aware of the strong visual effect such elements can have on individual people, whether they be, for example, patrons of the fine arts, occupants of homes or other structures such as office buildings or public squares, or consumers or professionals who deal in the production and sale of manufactured articles such as fabrics or ceramic tiles. In many instances, a judicious use of various colors in just the right combination, or a clearly unique appearance in terms of texture or overall look, can mean the difference between success and failure in terms market success and/or overall public appeal for the object or product in question. Accordingly, talented and motivated artists, designers, and artisans are typically hard at work trying to remain well-attuned to the preferences and tastes of their customers and patrons, lest their work fall out of favor.

Organic objects and structures, and/or the scenes and vistas associated therewith, while appearing somewhat inscrutable or chaotic to some, have nevertheless long served as an inspiration for individuals having not only an eye for beauty, but also an appreciation for symmetry and order. Speaking more generally, the human eye is naturally drawn to the sometimes ordinary and mundane, but at least as often fresh and unique, patterns, colors, and textures that appear in the natural world around us. It is therefore not unusual for individuals to try to capture or preserve what they see in nature (e.g., by taking snapshot images via film or digital photography) so that when they retire to their respective domiciles, places of business, or leisure venues, they will have at least some ability to recall, relive, or recreate the viewing pleasure afforded by the original scene. This human tendency is, of course, not lost on the aforementioned talented and motivated artists, designers, and artisans, many of whom, eager to maximize their prospects for artistic and commercial success, borrow liberally from the seemingly infinite combinations and patterns of color and texture to be discovered, and rediscovered, in the natural world.

Despite efforts to date, a need remains for innovative, and convenient products and associated methods for generating ornamental designs from reference images. More particularly, a need remains for products, systems, and methods for converting reference images into attractive patterns for adorning and/or incorporating into selected items, including wherein the selected items are articles of commerce and/or consumer products. These and other needs are satisfied by the products, systems, and methods described herein and readily apparent extensions, modifications, and/or enhancements thereto.

SUMMARY

In accordance with exemplary embodiments of the invention, a method for generating an ordered pattern based on an existing image is provided. The method includes providing a first image, the first image exhibiting an edgewise perimeter defining an isosceles right triangle including a first isosceles right triangle corner, a second isosceles right triangle corner, a third isosceles right triangle corner, a first isosceles right triangle leg extending between the first and second isosceles right triangle corners, a second isosceles right triangle leg joined to the first isosceles right triangle leg at the second isosceles right triangle corner and extending between the second isosceles right triangle corner and the third isosceles right triangle corner, and an isosceles right triangle hypotenuse joined to the second isosceles right triangle leg at the third isosceles right triangle corner, extending between the third isosceles right triangle corner and the first isosceles right triangle corner, and joined to the first isosceles right triangle leg at the first isosceles right triangle corner, including wherein each of the first and second isosceles right triangle legs exhibits a similar first length extent between the first and second isosceles right triangle corners, and the second and third isosceles right triangle corners, respectively, and the isosceles right triangle hypotenuse exhibits a second length extent between the third and first isosceles right triangle corners. The method further includes creating a second image based on the first image, the second image at least including a first portion formed in its entirety from a plurality of axially symmetrically mirrored or unmirrored, axially rotated or unrotated, and non-overlapping instances of the first image specifically arranged in the shape of a complete rectangle defining respective first and second pairs of parallel rectangle legs, each of the rectangle legs of the first pair of parallel rectangle legs exhibiting a similar third length extent between the rectangle legs of the second pair of parallel rectangle legs, and each of the rectangle legs of the second pair of parallel rectangle legs exhibiting a similar fourth length extent between the rectangle legs of the first pair of parallel rectangle legs. Each of the third and fourth length extents associated with the complete rectangle is at least as long as at least one of the first and second length extents associated with the isosceles right triangle. A total area encompassed by the first portion of the second image is at least twice as large as a total area encompassed by the first image. The plurality of instances of the first image being specifically arranged in the shape of a complete rectangle includes wherein each instance of the first image of the plurality of instances of the first image is positioned adjacent to at least one other instance thereof, and further includes wherein adjacent instances of the first image of each pair of adjacent instances of the first image are one of: 1) joined at and aligned along their respective first isosceles right triangle leg, 2) joined at and aligned along their respective second isosceles right triangle leg, and 3) joined at and aligned along their respective isosceles right triangle hypotenuses, as well as two of: 4) joined at their respective first isosceles right triangle corners, 5) joined at their respective second isosceles right triangle corners, and 6) joined at their respective third isosceles right triangle corners.

In accordance with at least some embodiments of such method, the plurality of instances of the first image includes a total of two instances of the first image, the complete rectangle is a regular rectangle, or square, and each of the third and fourth length extents associated with the complete rectangle is equivalent in length to the first length extent associated with the isosceles right triangle.

In accordance with at least some embodiments of such method, the plurality of instances of the first image includes a total of four instances of the first image, the complete rectangle is a regular rectangle, or square, and each of the third and fourth length extents associated with the complete rectangle is equivalent in length to the second length extent associated with the isosceles right triangle.

In accordance with at least some embodiments of such method, the plurality of instances of the first image includes a total of four instances of the first image, the complete rectangle is a regular rectangle, or square, and each of the third and fourth length extents associated with the complete rectangle is twice as long as the first length extent associated with the isosceles right triangle.

In accordance with at least some embodiments of such method, the plurality of instances of the first image includes at least four instances of the first image.

In accordance with at least some embodiments of such method, the complete rectangle is a regular rectangle, or square, and each of the third and fourth length extents associated with the complete rectangle is three times as long as one of the first and second length extents associated with the isosceles right triangle.

In accordance with at least some embodiments of such method, the complete rectangle is a regular rectangle, or square, and each of the third and fourth length extents associated with the complete rectangle is at least three times as long as one of the first and second length extents associated with the isosceles right triangle.

In accordance with at least some embodiments of such method, the complete rectangle is an oblong rectangle.

In accordance with at least some embodiments of such method, the complete rectangle is an oblong rectangle, and one of the third and fourth length extents associated with the complete rectangle is equivalent in length to one of the first and second length extents associated with the isosceles right triangle.

In accordance with at least some embodiments of such method, the complete rectangle is an oblong rectangle, a first one of the third and fourth length extents associated with the complete rectangle is at least twice as long as one of the first and second length extents associated with the isosceles right triangle, and the other of the third and fourth length extents associated with the complete rectangle is longer than the first one thereof.

In accordance with at least some embodiments of such method, the plurality of mirrored or non-mirrored, rotated or non-rotated, and non-overlapping instances of the first image specifically arranged in the shape of a complete rectangle includes a total of eighteen (18) non-overlapping instances of the first image forming a regular rectangle including primary squares assembled together in a 3×3 matrix bi-quadrant, and the method further comprises one of: 1) selecting a portion of the 3×3 matrix bi-quadrant for further processing, the portion comprising a centered pattern square or an offset pattern square, and creating a further 3×3 matrix bi-quadrant based on the centered pattern square; 2) selecting a portion of the 3×3 matrix bi-quadrant for further processing, the portion comprising a pixel line, and extending the pixel line in a direction normal to the direction of extension of the pixel line to create a set of parallel stripes based on the pixel line; or 3) selecting a portion of the 3×3 matrix bi-quadrant for further processing, the portion comprising a linear portion thereof having a width of at least two pixel lines, and replicating or mirroring the linear portion thereof as necessary in a direction normal to the direction of extension of the linear portion thereof to create a set of parallel pattern stripes based on the linear portion thereof.

In accordance with at least some embodiments of such method, the plurality of mirrored or non-mirrored, rotated or non-rotated, and non-overlapping instances of the first image specifically arranged in the shape of a complete rectangle includes a total of eighteen (18) non-overlapping instances of the first image forming a regular rectangle including primary squares assembled together in a 3×3 matrix bi-quadrant, and selecting a portion of the 3×3 matrix bi-quadrant for further processing, the portion comprising a pixel line, and extending the pixel line in a direction normal to the direction of extension of the pixel line to create a set of parallel stripes based on the pixel line, and further comprises: 1) rotating the pixel line ninety (90) degrees; 2) extending the pixel line in a direction normal to the direction of extension of the pixel line to create another set of parallel stripes based on the pixel line; and 3) combining the first and second set of parallel stripes to create a plaid pattern.

In accordance with at least some embodiments of such method, the first image includes an image of a set of parallel stripes or a set of parallel pattern stripes, wherein the stripes of the set of parallel stripes or the stripes of the set of parallel pattern stripes are oriented at an angle to one or both of the horizontal and the vertical.

In accordance with at least some embodiments of such method, the step of providing the first image further includes:
A) selecting an existing image;
B) defining a pictorial reference based on the existing image, wherein the pictorial reference exhibits an edgewise perimeter defining a regular rectangle, the regular rectangle including a first leg, a second leg adjacent the first leg, a third leg adjacent the second leg, an fourth leg adjacent both the first leg and the third leg, a first corner joining the fourth leg and the first leg, a second corner joining the first leg and the second leg, a third corner joining the second leg and the third leg, and an fourth corner joining the third leg and the fourth leg; selecting a first portion of the pictorial reference in the shape of an isosceles right triangle; and
C) creating the first image by selecting and cropping from the pictorial reference a first portion thereof in the shape of an isosceles right triangle, the first portion of the pictorial reference being a half-portion of the pictorial reference associated with a first one of the first, second, third, and fourth corners of the regular rectangle such that the legs of the isosceles right triangle associated with the first portion of the pictorial reference are defined by a corresponding first unique pairing of the first, second, third, and fourth legs of the regular rectangle joined by the first one of the first, second, third, and fourth corners thereof, and the hypotenuse of the isosceles right triangle associated with the first portion of the pictorial reference extends diagonally across the regular rectangle between the regular rectangle legs of the first unique pairing;

and the overall method further includes:
D) creating a third image by selecting and cropping from the pictorial reference a second portion thereof in the shape of an isosceles right triangle, the first and second portions of the pictorial reference overlapping each other to an extent of half the total area of each such portion, the second portion being a half-portion of the pictorial reference associated with a second one of the first, second, third, and fourth corners of the regular rectangle adjacent the first one thereof such that the legs of the isosceles right triangle associated with the second portion of the pictorial reference are defined by a corresponding second unique pairing of the first, second, third, and fourth legs of the regular rectangle joined by the second one of the first, second, third, and fourth corners thereof, and the hypotenuse of the isosceles right triangle associated with the second portion of the pictorial reference extends diagonally across the regular rectangle between the regular rectangle legs of the second unique pairing;

E) creating a second portion of the second image based on the third image, the second portion of the second image being formed in its entirety from a similar plurality of axially symmetrically mirrored or unmirrored, axially rotated or unrotated, and non-overlapping instances of the third image specifically arranged in the shape of a similar, complete rectangle defining respective third and fourth pairs of parallel rectangle legs, each of the rectangle legs of the third pair of parallel rectangle legs exhibiting a similar third length extent between the rectangle legs of the fourth pair of parallel rectangle legs, and each of the rectangle legs of the fourth pair of parallel rectangle legs exhibiting a similar fourth length extent between the rectangle legs of the third pair of parallel rectangle legs;

F) assembling the rectangle-shaped first portion of the second image and the rectangle-shaped second portion of the second image together, including wherein the first and second portions of the second image are joined at and aligned along respective corresponding instances of one of their respective first and second isosceles right triangle legs, and as well as each of: 1) joined at respective corresponding instances of one of their respective first isosceles right triangle corners positioned between the isosceles right triangle hypotenuse thereof and a first one of the isosceles right triangle legs thereof, and 2) joined at respective corresponding instances of another one of their respective second isosceles right triangle corners positioned between the first one of the isosceles right triangle legs thereof and the second one of the isosceles right triangle legs thereof;

G) creating a fourth image by selecting and cropping from the pictorial reference a third portion thereof in the shape of an isosceles right triangle, the second and third portions of the pictorial reference overlapping each other to an extent of half the total area of each such portion, the third portion being a half-portion of the pictorial reference associated with a third one of the first, second, third, and fourth corners of the regular rectangle adjacent the second one thereof such that the legs of the isosceles right triangle associated with the third portion of the pictorial reference are defined by a corresponding third unique pairing of the first, second, third, and fourth legs of the regular rectangle joined by the third one of the first, second, third, and fourth corners thereof, and the hypotenuse of the isosceles right triangle associated with the third portion of the pictorial reference being aligned with and coextensive with the hypotenuse of the isosceles right triangle associated with the first portion of the pictorial reference;

H) creating a third portion of the second image based on the fourth image, the third portion of the second image being formed in its entirety from a similar plurality of axially symmetrically mirrored or unmirrored, axially rotated or unrotated, and non-overlapping instances of the fourth image specifically arranged in the shape of a similar, complete rectangle defining respective fifth and sixth pairs of parallel rectangle legs, each of the rectangle legs of the fifth pair of parallel rectangle legs exhibiting a similar third length extent between the rectangle legs of the sixth pair of parallel rectangle legs, and each of the rectangle legs of the sixth pair of parallel rectangle legs exhibiting a similar fourth length extent between the rectangle legs of the fifth pair of parallel rectangle legs;

I) assembling the rectangle-shaped second portion of the second image and the rectangle-shaped third portion of the second image together, including wherein the second and third portions of the second image are joined at and aligned along respective corresponding instances of one of their respective first and second isosceles right triangle legs, and as well as each of: 1) joined at respective corresponding instances of one of their respective first isosceles right triangle corners positioned between the isosceles right triangle hypotenuse thereof and a first one of the isosceles right triangle legs thereof, and 2) joined at respective corresponding instances of another one of their respective second isosceles right triangle corners positioned between the first one of the isosceles right triangle legs thereof and the second one of the isosceles right triangle legs thereof;

J) creating a fifth image by selecting and cropping from the pictorial reference a fourth portion thereof in the shape of an isosceles right triangle, the third and fourth portions of the pictorial reference overlapping each other to an extent of half the total area of each such portion, and the fourth and first portions of the pictorial reference overlapping each other to an extent of half the total area of each such portion, the fourth portion being a half-portion of the pictorial reference associated with a fourth one of the first, second, third, and fourth corners of the regular rectangle adjacent each of the third and first ones thereof such that the legs of the isosceles right triangle associated with the fourth portion of the pictorial reference are defined by a corresponding fourth unique pairing of the first, second, third, and fourth legs of the regular rectangle joined by the fourth one of the first, second, third, and fourth corners thereof, and the hypotenuse of the isosceles right triangle associated with the fourth portion of the pictorial reference being aligned with and coextensive with the hypotenuse of the isosceles right triangle associated with the second portion of the pictorial reference;

K) creating a fourth portion of the second image based on the fifth image, the fourth portion of the second image being formed in its entirety from a similar plurality of axially symmetrically mirrored or unmirrored, axially rotated or unrotated, and non-overlapping instances of the fifth image specifically arranged in the shape of a similar, complete rectangle defining respective seventh and eighth pairs of parallel rectangle legs, each of the rectangle legs of the seventh pair of parallel rectangle legs exhibiting a similar third length extent between the rectangle legs of the eighth pair of parallel rectangle legs, and each of the rectangle legs of the eighth pair of parallel rectangle legs exhibiting a similar fourth length extent between the rectangle legs of the seventh pair of parallel rectangle legs; and L) assembling the rectangle-shaped third portion of the second image and the rectangle-shaped fourth portion of the second image together, including wherein the third and fourth portions of the second image are joined at and aligned along respective corresponding instances of one of their respective first and second isosceles right triangle legs, and as well as each of: 1) joined at respective corresponding instances of one of their respective first isosceles right triangle corners positioned between the isosceles right triangle hypotenuse thereof and a first one of the isosceles right triangle legs thereof, and 2) joined at respective corresponding instances of another one of their respective second isosceles right triangle corners positioned between the first one of the isosceles right triangle legs thereof and the second one of the isosceles right triangle legs thereof.

In accordance with at least some embodiments of such method including such additional steps A through L, each of the rectangle associated with the first portion of the second image, the rectangle associated with the second portion of the second image, the rectangle associated with the third portion of the second image, and the rectangle associated with the fourth portion of the second image, defines a single primary square formed from a total of two instances of the respective one of the first, third, fourth, and fifth image mirrored about the respective isosceles right triangle hypotenuse.

In accordance with at least some embodiments of such method including such additional steps A through L, each of the rectangle associated with the first portion of the second image, the rectangle associated with the second portion of the second image, the rectangle associated with the third portion of the second image, and the rectangle associated with the fourth portion of the second image, defines a total of nine primary squares assembled in a 3×3 matrix, each primary square of the total of nine primary squares being formed from a total of two instances of the respective one of the first, third, fourth, and fifth image.

In accordance with at least some embodiments of such method including such additional steps A through L, the method further comprises:

M) incorporating the pictorial reference in a regular N×N array of multiple adjacent pictorial references based on the existing image, wherein N is a whole number greater than or equal to two (2);

N) repeating all of the above steps with respect to each of the other pictorial references of the regular N×N array of multiple adjacent pictorial references; and O) generating a horizontally and vertically continuous matrix of images formed from respective 3×3 matrix images formed from each of at least three of the four isosceles right triangles associated with each of the pictorial references in the pictorial references of the N×N array.

In accordance with at least some embodiments of at least one or more of all of the above methods, the method further comprises adorning a product with an ordered pattern by incorporating at least one instance of the second image into a visible surface of the product, wherein the product is one or more selected from the group comprising: a flexible fabric, a textile, a print fabric, a woven fabric, a jacquard fabric, a wearable garment, a paper product, wallpaper, stationery, gift-wrap, a greeting card, a paper plate, a napkin, a rug, a tile, linoleum flooring, dinnerware, a tabletop, barware, a comforter, a pillow, linen, a curtain, a window treatment, a neckerchief, a computer display, upholstery for a chair, upholstery for a sofa, a light-projection transparency, and an architectural window.

In accordance with exemplary embodiments of the invention, a computer system is provided. The computer system includes a digital memory element, wherein on the digital memory element is stored a plurality of instructions, the plurality of instructions including instructions which, when executed by a processor, cause the processor to perform steps of a method for generating an ordered pattern from an existing image in accordance with the steps of one or more of all of the above methods. The computer system further includes a processor disposed in electronic communication with the computer-readable medium, the processor being further adapted to execute the instructions of such plurality of instructions so as to perform the steps of such method.

In accordance with exemplary embodiments of the invention, a product is provided. The product includes a substrate. The substrate of the product defines at least one visible surface. The product is adorned with at least one instance of the second image configured in accordance with the steps of one or more of all of the above methods. The at least one instance of the second image is incorporated into the visible surface of the substrate. The product is one or more selected from the group comprising: a textile, a print fabric, a woven fabric, a jacquard fabric, a wearable garment, a paper product, wallpaper, stationery, gift-wrap, a greeting card, a paper plate, a napkin, a rug, a tile, linoleum flooring, dinnerware, a tabletop, barware, a comforter, a pillow, linen, a curtain, a window treatment, a neckerchief, a computer display, upholstery for a chair, upholstery for a sofa, a light-projection transparency, and an architectural window.

The invention accordingly comprises apparatus, products, systems, and methods for generating product designs possessing the features, functions, steps, properties, and/or the relation of components which will be exemplified in the technology hereinafter described, as well as products bearing, incorporating, or exhibiting product designs generated by the use of such apparatus, systems, and methods for generating designs for product adornment, and the scope of the invention will be indicated in the claims.

BRIEF DESCRIPTION OF THE DRAWINGS

For a fuller understanding of the invention, reference is made to the following description taken in connection with the accompanying drawings, in which:

FIG. 1 is a block diagram depicting an exemplary embodiment of a system in accordance with embodiments of the present disclosure;

FIG. 2 is a block diagram depicting an exemplary embodiment of a computer system in accordance with embodiments of the present disclosure;

FIG. 3 is a block diagram depicting another exemplary embodiment of a computer system in accordance with embodiments of the present disclosure;

FIG. 4 is a block diagram depicting an exemplary embodiment of a readable media product in accordance with embodiments of the present disclosure;

FIG. 5 is a block diagram depicting another exemplary embodiment of a readable media product in accordance with embodiments of the present disclosure;

FIG. 6 is a block diagram depicting another embodiment of yet another computer system in accordance with embodiments of the present disclosure;

FIGS. 11-14 are diagrams depicting those corresponding legs and corners at or along which certain other pairs of related instances of primary squares in accordance with embodiments of the present disclosure may be joined;

FIG. 34 is a diagram depicting a possible example of one hundred instances of bi-quadrants selected from the fourteen examples of bi-quadrants shown and discussed herein with respect to FIG. 33, assembled together to form a 10×10 matrix of bi-quadrants in accordance with embodiments of the present disclosure;

FIG. 35 is a diagram depicting a possible example of one hundred twenty-eight instances of bi-quadrants, half of which are selected from the fourteen examples of bi-quadrants shown and discussed herein with respect to FIG. 33, the other half of which are mirrored versions of same, assembled together to form an 8×16 matrix of bi-quadrants in accordance with embodiments of the present disclosure;

FIGS. 57, 58, and 59 depict methods by which a computer system and related computer software application in accordance with embodiments of the present disclosure may be used, both easily and quickly, to convert a seemingly random and rapidly-created line art drawing into a wide variety of ordered patterns for use (for example) in adorning products;

DETAILED DESCRIPTION

Figure 7:
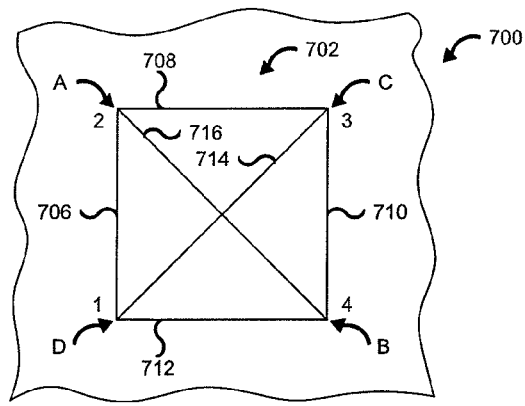
FIG. 7 is a diagram depicting a pictorial reference in accordance with embodiments of the present disclosure, the pictorial reference being divided into four partially overlapping half portions, each partially overlapping half portion being an isosceles right triangle.

The disclosed apparatus, systems and methods comprehend a new 'disruptive' technology suitable for investigating and developing the systemic morphological pattern sequencing of the 'graphic image terrain.' The applicant anticipates this sequencing will be applied to the interior, textile, graphic design and other related scientific and technological industries for purposes of designing and creating an infinite number of both uniquely new or coordinated patterns from both found natural reference materials and/or other currently existing synthetically designed motifs available within the public domain.

The present disclosure includes design process technology that provides the user the ability to generate never before seen patterns, designs, and artwork. It may be the next step in the evolution of art and design for systemic morphological sequencing and related mathematical algorithmic principals to aesthetically control and create both order and systemic structure from any random organic and/or synthetic imagery. This unique process provides designers with the ability to manipulate the morphology of shape and form in order to develop original design content automatically. As it relates to the aesthetic requirements of the applied and commercial arts and other related industries, designers employing the presently disclosed design process technology are empowered to achieve a predetermined set of creative design goals in minutes. Designers and artists are further empowered to expose design purely abstractly, in order to discover other unknown yet applicable design motifs that can be utilized for any given aesthetic need.

The presently disclosed design process technology encourages designers to photograph and capture the graphic representations of chaotic organic patterns found in nature or synthetic man-made objects or environments and produce designs containing self-similar repetitive or non-repetitive patterns within the fixed perimeter of hard line two-dimensional symmetrically-constructed and overlaid geometry that defines a static representation of geometrically regular surface space. This design process technology can also be applied to any type of existing synthetic manmade graphic representations of radically varying form and or content by utilizing said graphic representations as the initial reference image to be processed. Also according to the presently disclosed technology, designers are given the tools to apply an algorithm of form, structure, and connectivity to a given reference image's randomly distributed graphic components. In accordance with the present disclosure, one or more related or leg- or hypotenuse-linked isosceles right triangles associated with respective portions of a larger initial image are replicated, mirrored and specifically arranged as appropriate and as desired to assemble large, broad images consisting of unique, eye-catching patterns extending over a potentially infinite plane, both continuously, and in all directions.

FIG. 1 is a block diagram depiction of an exemplary embodiment of a system 100 in accordance with embodiments of the present disclosure. The system 100 may include a network 102. The network 102 may comprise a communication system that connects computer systems by wire, cable, fiber optic, and/or wireless links facilitated by various well-known network elements, such as hubs, switches, routers, and the like. The network 102 may employ various well-known protocols to communicate information.

The system 100 may further include a client computer 104, and additional client computers (not shown), up to a client computer N1 (not shown), where N1 represents any number of client computers practical for operation of systems in accordance with embodiments of the present disclosure. The system 100 may further include a host server 106, and additional servers (not shown), up to a server N2 (not shown), where N2 represents any number of client computers practical for operation of systems in accordance with embodiments of the present disclosure. The system 100 may further include a storage volume 108, and additional storage volumes (not shown), up to a storage volume N3 (not shown), where N3 represents any number of storage volumes practical for operation of systems in accordance with embodiments of the present disclosure. The client computer 104 and the host server 106 may be coupled to each other via the network 102.

The host server 106 may host an image manipulation and generation service for permitting system users to upload reference images (e.g., digital images) for storage in the storage volume 108, manipulate images (e.g., digital images) stored in the storage volume 108, and/or generate additional images (e.g., digital images) for at least temporary storage in the storage volume 108. In turn, the client computer 104 may include an image manipulation and generation agent present on the client computer 104 for interacting with the host server 106, e.g., for purposes of accessing, manipulating, generating, and/or storing images in accordance with the present disclosure. The host server 106 may be configured to manage one or more storage volumes 108. Each of the storage volumes 108 may comprise any type of block-backed storage areas and may be implemented using any type or storage system or storage systems, such as a disk drive system, a tape drive system, or a combination thereof. A disk drive system may include, for example, one or more storage disks, e.g., an array of storage disks, or a redundant array of storage disks.

The storage volume 108 may contain an image archive 110 for storing images. Such images may be lodged in the image archive 110 in the form of a plurality of archive entries 112. The host server 106 may be configured to communicate with the content archive 110, including updating the content archive 110 to cause corresponding archive entries 112 to reflect new information, and to retrieve such information as directed or as needed.

FIG. 2 is a block diagram depicting an exemplary embodiment of a computer system 200 in accordance with embodiments of the present disclosure. The computer system 200 may be used to implement the host server 106 in FIG. 1. The computer system 200 includes a processor 201, a memory 202, various support circuits 203, and an I/O interface 204. The processor 201 may include one or more microprocessors known in the art. The support circuits 203 for the processor 201 may include conventional cache, power supplies, clock circuits, data registers, I/O interfaces, and the like. The I/O interface 204 may be directly coupled to the memory 202 or coupled through the processor 201. The I/O interface 204 may also be configured for communication with a network, with various storage devices, as well as other types of input 211 and output devices 212 (e.g., mouse, keyboard, display, etc.). The memory 202 stores processor-executable instructions and/or data that may be executed by and/or used by the processor 201. These processor-executable instructions may comprise hardware, firmware, software, and the like, or some combination thereof.

Modules having processor-executable instructions that are stored in the memory 202 may include an image manipulation and generation service 220. The image manipulation and generation service 220 enables the host server 106 or the computer system 200 to facilitate the manipulation and generation of images by clients, and the retrieval and storage of images by clients with respect to the image archive 110 stored on the storage volume 108, and to interact for the same purpose with a corresponding image manipulation and generation agent present on the client computer 104. In embodiments, the image manipulation and generation service 220 can be embodied by a specially configured software application, e.g., in the form of a corresponding readable media product, such as is described below with reference to FIG. 4. The computer system 200 may be programmed with an operating system, which may be OS/2, Java Virtual Machine, Linux, Solaris, Unix, Windows, Windows95, Windows 98, Windows NT, Windows2000, WindowsME, Windows Server, Symbian OS, WindowsCE, Windows Vista, and Mac OS, among other known platforms. At least a portion of an operating system may be disposed in the memory 202. The memory 202 may include one or more of the following: random access memory, read only memory, magneto resistive read/write memory, optical read/write memory, cache memory, magnetic read/write memory, and the like, as well as signal-bearing media as described below.

FIG. 3 is a block diagram depicting an exemplary embodiment of a computer system 300 in accordance with embodiments of the present disclosure. The computer system 300 may be used to implement the client computer 104 in FIG. 1. The computer system 300 includes a processor 301, a memory 302, various support circuits 303, and an I/O interface 304. The processor 301 may include one or more microprocessors known in the art. The support circuits 303 for the processor 301 may include conventional cache, power supplies, clock circuits, data registers, I/O interfaces, and the like. The I/O interface 304 may be directly coupled to the memory 302 or coupled through the processor 301. The I/O interface 304 may also be configured for communication with a network, with various storage devices, as well as other types of input 311 and output devices 312 (e.g., mouse, keyboard, display, etc.). The memory 302 stores processor-executable instructions and/or data that may be executed by and/or used by the processor 301. These processor-executable instructions may comprise hardware, firmware, software, and the like, or some combination thereof.

Modules having processor-executable instructions that are stored in the memory 302 may include an image manipulation and generation agent 350. The image manipulation and generation agent 350 enables the computer system 300 or the client computer 104 to interact with the image manipulation and generation service 220 of FIG. 2 and the host server 106 of FIG. 1 to permit a user of the computer system 300 or the client computer 104 to interact with the host server 106 or the content access service 220 to upload reference images (e.g., digital images) for storage in the storage volume 108, manipulate images (e.g., digital images) stored in the storage volume 108, and/or generate additional images (e.g., digital images) for at least temporary storage in the storage volume 108. In embodiments, the content access agent 350 can be embodied by an appropriate Internet browser, such as Microsoft Explorer, Netscape Navigator, or Mac Safari. In other embodiments, the content access agent 350 can be embodied by a specially configured software application, e.g., in the form of a corresponding readable media product, such as is described below with reference to FIG. 5. The computer system 300 may be programmed with an operating system, which may be OS/2, Java Virtual Machine, Linux, Solaris, Unix, Windows, Windows95, Windows 98, Windows NT, Windows2000, WindowsME, Windows Server, Symbian OS, WindowsCE, Windows Vista, and Mac OS, among other known platforms. At least a portion of an operating system may be disposed in the memory 302. The memory 302 may include one or more of the following: random access memory, read only memory, magneto resistive read/write memory, optical read/write memory, cache memory, magnetic read/write memory, and the like, as well as signal-bearing media as described below.

FIG. 4 depicts a readable media product 400 in accordance with embodiments of the present disclosure. A software code 402 and a related software installation utility 404 may be stored on the readable media product 400. Users possessing a suitable computer system may employ the software installation utility 404 to install the software code 402 on the computer system. In embodiments of the present disclosure, a computer system on which the software code 402 has been installed will have access to a corresponding software application which, when opened or otherwise activated on the computer system, may function as an image manipulation and generation service, such as the image manipulation and generation service 220 described above with reference to FIG. 2. The readable media product may comprise a computer-readable media product, such as a CD media product, or a DVD media product, among other known products.

FIG. 5 depicts a readable media product 500 in accordance with embodiments of the present disclosure. A software code 502 and a related software installation utility 504 may be stored on the readable media product 500. Users possessing a suitable computer system may employ the software installation utility 504 to install the software code 502 on the computer system. In embodiments of the present disclosure, a computer system on which the software code 502 has been installed will have access to a corresponding software application which, when opened or otherwise activated on the computer system, may function as an image manipulation and generation agent, such as image manipulation and generation agent 350 described above with reference to FIG. 3. The readable media product may comprise a computer-readable media product, such as a CD media product, or a DVD media product, among other known products.

FIG. 6 is a block diagram depicting an exemplary embodiment of a computer system 600 in accordance with embodiments of the present disclosure. The computer system 600 may be used to implement a variation of the host server 106 in FIG. 1 in which host server functions need not necessarily be present or provided, and in which access is provided to an individual computer user to gain access to remaining functionality in the absence of the network 102. The computer system 600 includes a processor 601, a memory 602, various support circuits 603, and an I/O interface 604. The processor 601 may include one or more microprocessors known in the art. The support circuits 603 for the processor 601 may include conventional cache, power supplies, clock circuits, data registers, I/O interfaces, and the like. The I/O interface 604 may be directly coupled to the memory 602 or coupled through the processor 601. The I/O interface 604 may also be configured for communication with a network, with various storage devices, as well as other types of input 611 and output devices 612 (e.g., mouse, keyboard, display, etc.). The memory 602 stores processor-executable instructions and/or data that may be executed by and/or used by the processor 601. These processor-executable instructions may comprise hardware, firmware, software, and the like, or some combination thereof.

Modules having processor-executable instructions that are stored in the memory 602 may include an image manipulation and generation service 620. The image manipulation and generation service 620 enables a user of the computer system 600 to manipulate and generate images, and to retrieve and store images with respect to the image archive 110 stored on the storage volume 108. In embodiments, the image manipulation and generation service 620 can be embodied by a specially configured software application, e.g., in the form of a corresponding readable media product, such as is described below with reference to FIG. 4. The computer system 200 may be programmed with an operating system, which may be OS/2, Java Virtual Machine, Linux, Solaris, Unix, Windows, Windows95, Windows 98, Windows NT, Windows2000, WindowsME, Windows Server, Symbian OS, WindowsCE, Windows Vista, and Mac OS, among other known platforms. At least a portion of an operating system may be disposed in the memory 602. The memory 602 may include one or more of the following: random access memory, read only memory, magneto resistive read/write memory, optical read/write memory, cache memory, magnetic read/write memory, and the like, as well as signal-bearing media as described below.

Referring now collectively to FIGS. 1-6, embodiments of the system 100 in accordance with the present disclosure include systems and methods for manipulating, generating, storing, and/or retrieving images. For example, such embodiments may include or provide the following: 1) systems/methods for generating ordered patterns from organic reference images; 2) systems/methods for manipulating reference images and/or generating additional images derived from the reference images and including one or more combinations of different primary elements cropped from the reference images, mirrored versions of the primary elements, mirrored versions of the mirrored versions of the primary elements, rotated versions of the primary elements, and/or mirrored and rotated versions of the primary elements; 3) systems/methods for providing a consumer product decorated with a pattern derived from a color and texture palette associated with a pre-selected organic or natural reference image, among other potential embodiments, and/or 4) one or more, or all, of the procedures and methods described below (e.g., including wherein the images described below may comprise digital images, including but not limited to digitally manipulable images, digitally generated images, and/or digitally displayable images). In accordance with at least some such embodiments, as well as other embodiments of the present disclosure, a software platform is provided, which software platform may, for example, be divided as needed, and/or as desired (including but not limited to a conventional distribution of such features and functions as between server and client computers) between and among 1) the image manipulation and generation agent 350 of the computer system 300 or the client computer 104, 2) the image manipulation and generation service 220 of the computer system 200, the computer system 600, or the host server 106, and/or 3) the content archive 110 of the storage volume 108.

Turning now to FIG. 7, a portion or portions of an existing image 700 may be used to generate further images, including but not necessarily limited to ordered patterns, in accordance with embodiments of the present disclosure. For example, a part of the existing image 700 may be identified or selected, e.g., by means of a frame or otherwise, to serve as a pictorial reference 702 for further processing. In accordance with the embodiment shown in FIG. 7, the pictorial reference 702 may include or define an edgewise perimeter 704 in the shape of a rectangle, e.g., a regular rectangle, or square. Other shapes for pictorial references are possible in accordance with the present disclosure, including irregular shapes, and non-rectangular shapes.

The square-shaped edgewise perimeter 704 defined by the pictorial reference 702 includes a first corner 1, a second corner 2, a third corner 3, a fourth corner 4, a first leg 706 extending between the first corner 1 and the second corner 2, a second leg 708 extending between the second corner 2 and the third corner 3 and positioned adjacent to the first leg 706, a third leg 710 extending between the third corner 3 and the fourth corner 4 and positioned adjacent to the second leg 708, and a fourth leg 712 extending between the fourth corner 4 and the first corner 1 and positioned adjacent to each of the third leg 710 and the first leg 706. In accordance with embodiments of the present disclosure, one or more portions of the pictorial reference 702 may be used to generate one or more further images, including one or more ordered patterns. For example, the pictorial reference 702 may be divided in half along a first diagonal line 714 extending between the first corner 1 and the third corner 3, providing two separate images indicated, respectively, at the reference letters 'A' and 'B'. For another example, the pictorial reference 702 may be divided in half along a second diagonal line 716 extending between the second corner 2 and the fourth corner 4, providing two separate images indicated, respectively, at the reference letters 'C' and 'D'. In accordance with embodiments of the present disclosure, each such image A, B, C, and D may be referred to as a 'primary element.'

As shown in FIG. 7, each of the images A, B, C, and D defines an edgewise perimeter in the shape of an isosceles right triangle. In the case of the isosceles right triangles associated with the edgewise perimeter of the image A and the edgewise perimeter of the image B, the hypotenuse of the triangle coincides with the first diagonal line 714. In the case of the isosceles right triangles associated with the edgewise perimeter of the image C and the edgewise perimeter of the image D, the hypotenuse of the triangle coincides with the second diagonal line 714. In the case of the isosceles right triangles associated with the edgewise perimeter of the image D and the edgewise perimeter of the image A, one leg of the triangle coincides with the first leg 706 of the square-shaped edgewise perimeter 704 defined by the pictorial reference 702. In the case of the isosceles right triangles associated with the edgewise perimeter of the image A and the edgewise perimeter of the image C, one leg of the triangle coincides with the second leg 708 of the square-shaped edgewise perimeter 704 defined by the pictorial reference 702. In the case of the isosceles right triangles associated with the edgewise perimeter of the image C and the edgewise perimeter of the image B, one leg of the triangle coincides with the third leg 710 of the square-shaped edgewise perimeter 704 defined by the pictorial reference 702. And in the case of the isosceles right triangles associated with the edgewise perimeter of the image B and the edgewise perimeter of the image D, one leg of the triangle coincides with the fourth leg 712 of the square-shaped edgewise perimeter 704 defined by the pictorial reference 702.

Still referring to FIG. 7, and as discussed above, each of the images A, B, C, and D comprehends a half portion of the total area of the original pictorial reference 702. Due to the fact that each comprehends a separate half portion of the total area of the original pictorial reference 702, the image A and the image B do not necessarily overlap each other in terms of their respective image content. Also due to the fact that each comprehends a separate half portion of the total area of the original pictorial reference 702, the image C and the image D do not necessarily overlap each other in terms of their respective image content. However, the image content associated with image D and the image content associated with image A overlap each other to an extent of a half portion of the total area of each such image. Also, the image content associated with image A and the image content associated with image C overlap each other to an extent of a half portion of the total area of each such image. Further, the image content associated with image C and the image content associated with image B overlap each other to an extent of a half portion of the total area of each such image. And still further, the image content associated with image B and the image content associated with image D overlap each other to an extent of a half portion of the total area of each such image.

As will be discussed further below, in accordance with respective embodiments of the present disclosure, each of the image A, the image B, the image C, and the image D, may be used to generate one or more further images, including one or more ordered patterns.

Figure 8:
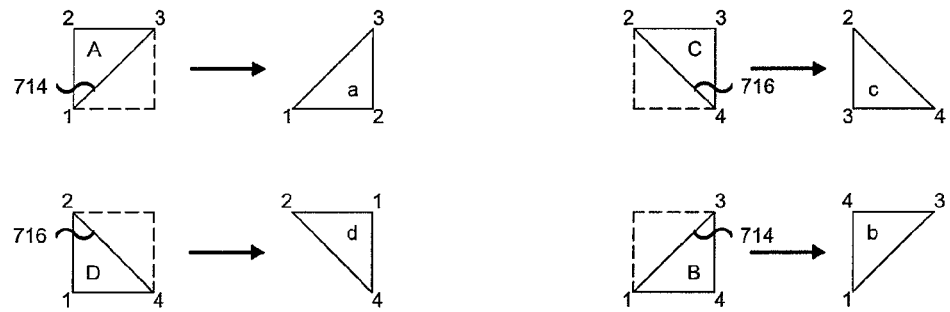
FIG. 8 is a diagram depicting primary squares in accordance with embodiments of the present disclosure, each primary square being formed from a different respective instance of an isosceles right triangle half-portion of the pictorial reference of FIG. assembled together with a corresponding mirror image of the same taken about the respective isosceles right triangle hypotenuse.
Figure 8:
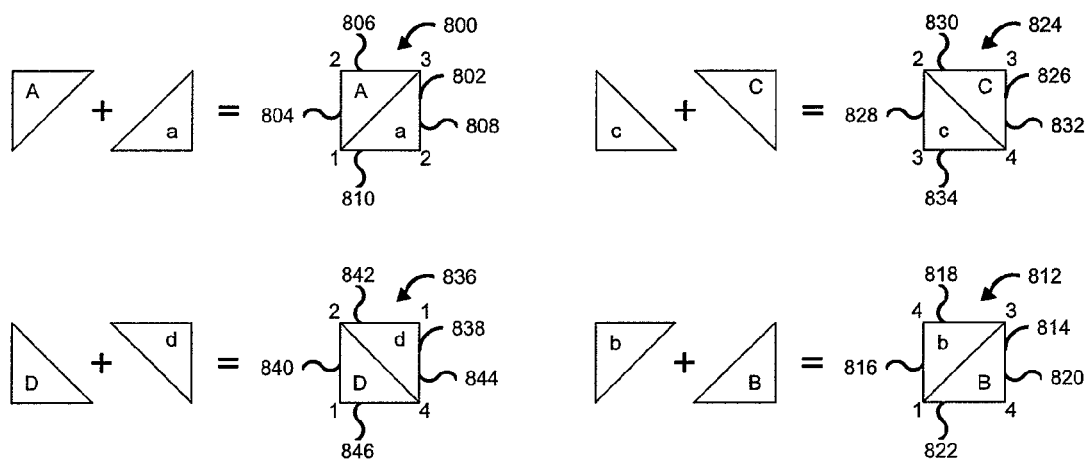

Turning now to FIG. 8, each of the images A and B may be mirrored about the first diagonal line 714 to form respective mirror images thereof, indicated in FIG. 8 via reference letters 'a' and 'b'. Similarly, each of the images C and D may be mirrored about the second diagonal line 716 to form respective mirror images thereof, indicated in FIG. 8 via reference letters 'c' and 'd'. In accordance with embodiments of the present disclosure, each such image a, b, c, and d may be referred to as a 'symmetrical counterpart' of the respective image A, B, C, and D. The manner in which the images a, b, c, and d relate back to the original pictorial reference 702 is at least partially reflected in the corner labels associated with the images a, b, c, and d as shown in FIG. 8.

The mirror image a may be combined with the original image A to form a larger image 800. The image 800 may include or define an edgewise perimeter 802 in the shape of a rectangle, which may be a regular rectangle, or square. The square-shaped edgewise perimeter 802 defined by the image 800 includes a first leg 804, a second leg 806 adjacent to the first leg 804, a third leg 808 adjacent to the second leg 806, and a fourth leg 810 adjacent both the third leg 808 and the first leg 804. The first and second legs 804, 806 of the image 800 coincide, respectively, with the first and second legs 706, 708 (FIG. 7) of the square-shaped edgewise perimeter 704 (FIG. 7) defined by the pictorial reference 702 (FIG. 7). Also, the lower left, upper left, and upper right corners of the image 800 coincide, respectively, with the corner 1, the corner 2, and the corner 3 of the pictorial reference 702 (FIG. 7). Because the image a is a mirror image of the image A, the third leg 808 of the image 800 corresponds in mirrored fashion to the second leg 708 (FIG. 7) of the pictorial reference 702 (FIG. 7), the fourth leg 810 of the image 800 corresponds in mirrored fashion to the first leg 706 (FIG. 7) of the pictorial reference 702 (FIG. 7), and the lower right corner of the image 800 corresponds in mirrored fashion to the corner 2 of the pictorial reference 702 (FIG. 7). Accordingly, whereas the lower right corner of the original pictorial reference 702 (FIG. 7) is labeled with the numeral 4, the lower right corner of the image 800 is labeled with the numeral 2. Labeling the lower right corner of the image 800 in this manner assists the viewer in tracking or determining the manner in which the content, edges (peripheral sides), and corners of the image 800 relate back to those of the original pictorial reference 702 (FIG. 7).

Similarly, the mirror image b may be combined with the original image B to form a larger image 812. The image 812 may include or define an edgewise perimeter 814 in the shape of a rectangle, which may be a regular rectangle, or square. The square-shaped edgewise perimeter 814 defined by the image 812 includes a first leg 816, a second leg 818 adjacent to the first leg 816, a third leg 820 adjacent to the second leg 818, and a fourth leg 822 adjacent both the third leg 820 and the first leg 816. The third and fourth legs 820, 822 of the image 812 coincide, respectively, with the third and fourth legs 710, 712 (FIG. 7) of the square-shaped edgewise perimeter 704 (FIG. 7) defined by the pictorial reference 702 (FIG. 7). Also, the lower left, upper right, and lower right corners of the image 812 coincide, respectively, with the corner 1, the corner 3, and the corner 4 of the pictorial reference 702 (FIG. 7). Because the image b is a mirror image of the image B, the first leg 816 of the image 812 corresponds in mirrored fashion to the fourth leg 712 (FIG. 7) of the pictorial reference 702 (FIG. 7), the second leg 818 of the image 812 corresponds in mirrored fashion to the third leg 710 (FIG. 7) of the pictorial reference 702 (FIG. 7), and the upper left corner of the image 812 corresponds in mirrored fashion to the corner 4 of the pictorial reference 702 (FIG. 7). Accordingly, whereas the upper left corner of the original pictorial reference 702 (FIG. 7) is labeled with the numeral 2, the upper left corner of the image 812 is labeled with the numeral 4. Labeling the upper left corner of the image 812 in this manner assists the viewer in tracking or determining the manner in which the content, edges (peripheral sides), and corners of the image 812 relate back to those of the original pictorial reference 702 (FIG. 7).

Also similarly, the mirror image c may be combined with the original image C to form a larger image 824. The image 824 may include or define an edgewise perimeter 826 in the shape of a rectangle, which may be a regular rectangle, or square. The square-shaped edgewise perimeter 826 defined by the image 824 includes a first leg 828, a second leg 830 adjacent to the first leg 828, a third leg 832 adjacent to the second leg 830, and a fourth leg 834 adjacent both the third leg 832 and the first leg 828. The second and third legs 830, 832 of the image 824 coincide, respectively, with the second and third legs 708, 710 (FIG. 7) of the square-shaped edgewise perimeter 704 (FIG. 7) defined by the pictorial reference 702 (FIG. 7). Also, the upper left, upper right, and lower right corners of the image 824 coincide, respectively, with the corner 2, the corner 3, and the corner 4 of the pictorial reference 702 (FIG. 7). Because the image c is a mirror image of the image C, the fourth leg 834 of the image 824 corresponds in mirrored fashion to the third leg 710 (FIG. 7) of the pictorial reference 702 (FIG. 7), the first leg 828 of the image 824 corresponds in mirrored fashion to the second leg 708 (FIG. 7) of the pictorial reference 702 (FIG. 7), and the lower left corner of the image 824 corresponds in mirrored fashion to the corner 3 of the pictorial reference 702 (FIG. 7). Accordingly, whereas the lower left corner of the original pictorial reference 702 (FIG. 7) is labeled with the numeral 1, the lower left corner of the image 824 is labeled with the numeral 3. Labeling the lower left corner of the image 824 in this manner assists the viewer in tracking or determining the manner in which the content, edges (peripheral sides), and corners of the image 824 relate back to those of the original pictorial reference 702 (FIG. 7).

Also similarly, the mirror image d may be combined with the original image D to form a larger image 836. The image 836 may include or define an edgewise perimeter 838 in the shape of a rectangle, which may be a regular rectangle, or square. The square-shaped edgewise perimeter 838 defined by the image 836 includes a first leg 840, a second leg 842 adjacent to the first leg 840, a third leg 844 adjacent to the second leg 842, and a fourth leg 846 adjacent both the third leg 844 and the first leg 840 The fourth and first legs 846, 840 of the image 836 coincide, respectively, with the fourth and first legs 712, 706 (FIG. 7) of the square-shaped edgewise perimeter 704 (FIG. 7) defined by the pictorial reference 702 (FIG. 7). Also, the lower right, lower left, and upper left corners of the image 836 coincide, respectively, with the corner 4, the corner 1, and the corner 2 of the pictorial reference 702 (FIG. 7). Because the image d is a mirror image of the image D, the second leg 842 of the image 836 corresponds in mirrored fashion to the first leg 706 (FIG. 7) of the pictorial reference 702 (FIG. 7), the third leg 844 of the image 836 corresponds in mirrored fashion to the fourth leg 712 (FIG. 7) of the pictorial reference 702 (FIG. 7), and the upper right corner of the image 800 corresponds in mirrored fashion to the corner 1 of the pictorial reference 702 (FIG. 7). Accordingly, whereas the upper right corner of the original pictorial reference 702 (FIG. 7) is labeled with the numeral 3, the upper right corner of the image 836 is labeled with the numeral 1. Labeling the upper right corner of the image 836 in this manner assists the viewer in tracking or determining the manner in which the content, edges (peripheral sides), and corners of the image 836 relate back to those of the original pictorial reference 702 (FIG. 7).

As discussed above, the images A, B, C, and D may be combined with their symmetrical counterparts in images a, b, c, and d to form larger images 800, 812, 824, and 836. As also discussed, the images 800, 812, 824, and 836 may include or define an edgewise perimeter 802, 814, 826, and 838 in the shape of a rectangle, which may be a regular rectangle, or square. As such, and in accordance with embodiments of the present disclosure, each of the images 800, 812, 824, and 836 may be referred to as a 'primary square' that includes one instance of a primary element (i.e., in the form of one of the images A, B, C, or D) assembled together with one instance of a symmetrical counterpart of such primary element (i.e., in the form of a corresponding one of the images a, b, c, and d).

In accordance with at least some embodiments of the present disclosure, each of the squares defined by the respective edgewise perimeters 802, 814, 826, 838 of the images 800, 812, 824, and 836 may be similar to (i.e., the same size as) the square defined by the edgewise perimeter 704 of the pictorial reference 702 shown and discussed with reference to FIG. 7. In accordance with at least some other embodiments of the present disclosure, the creation of the images 800, 812, 824, and 836 may result in one or more of the edgewise perimeters 802, 814, 826, 838 being of a smaller scale or size compared to that of the edgewise perimeter 704 of the pictorial reference 702 shown and discussed with reference to FIG.

7. In accordance with still further embodiments of the present disclosure, the creation of the images 800, 812, 824, and 836 may result in one or more of the edgewise perimeters 802, 814, 826, 838 being of a larger scale or size compared to that of the edgewise perimeter 704 of the pictorial reference 702 shown and discussed with reference to FIG. 7. In accordance with at least some or all of such embodiments, the pictorial reference 702 (FIG. 7) and the images 800, 812, 824, 836 may share both a common square shape, as well as at least some common content, such that each of the images 800, 812, 824, and 836 may be considered to be related to, based on, and/or derived from the pictorial reference 702, at least for purposes of generating further images therefrom.

In accordance with embodiments of the present disclosure, the image a may be a mirror image of the image A, the image b may be a mirror image of the image B, the image c is may be a mirror image of the image C, and the image d may be a mirror image of the image D. Accordingly, while the content of the images a, b, c, and d may not necessarily be the same as a corresponding portion (e.g., the lower right half (for the image a), the upper left half (for the image b), the lower left half (for the image c), or the upper right half (for the image d)) of the pictorial reference 702 (FIG. 7), the images a, b, c, and d may be considered to be derived directly from other respective portions of the pictorial reference 702 (FIG. 7). In addition, and as discussed briefly above, the legs of the isosceles right triangles formed by the edgewise perimeters 802, 814, 826, 838 associated with the images a, b, c, and d may all be mirror images of corresponding legs of the edgewise perimeter 704 (FIG. 7) of the pictorial reference 702 (FIG. 7), and may be symmetric with respect thereto about one or the other of the first and second diagonal lines 714, 716 (FIG. 7). In such circumstances, each of the legs of the isosceles right triangles formed by the edgewise perimeters 802, 814, 826, 838 may be geometrically and otherwise (e.g., in terms of visual content, and/or in terms of texture) similar to one of the first, second, third, and fourth legs 706, 708, 710, 712 of the edgewise perimeter 704 (FIG. 7) of the pictorial reference 702 (FIG. 7).

Figure 9:
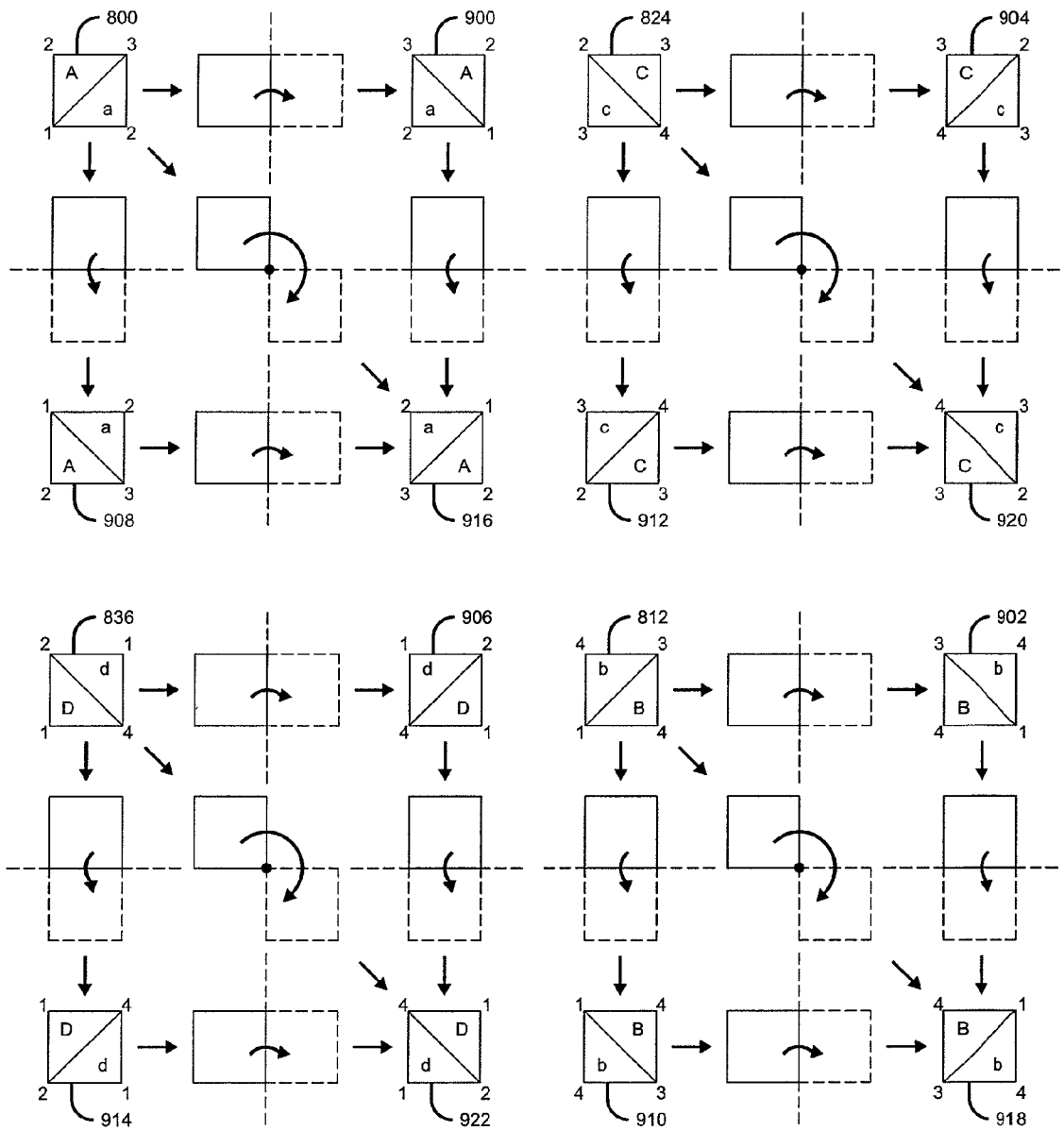
FIG. 9 is a diagram depicting three additional primary square which may derived from each of the primary squares shown and described herein with reference to FIG. 8.
Figure 10:
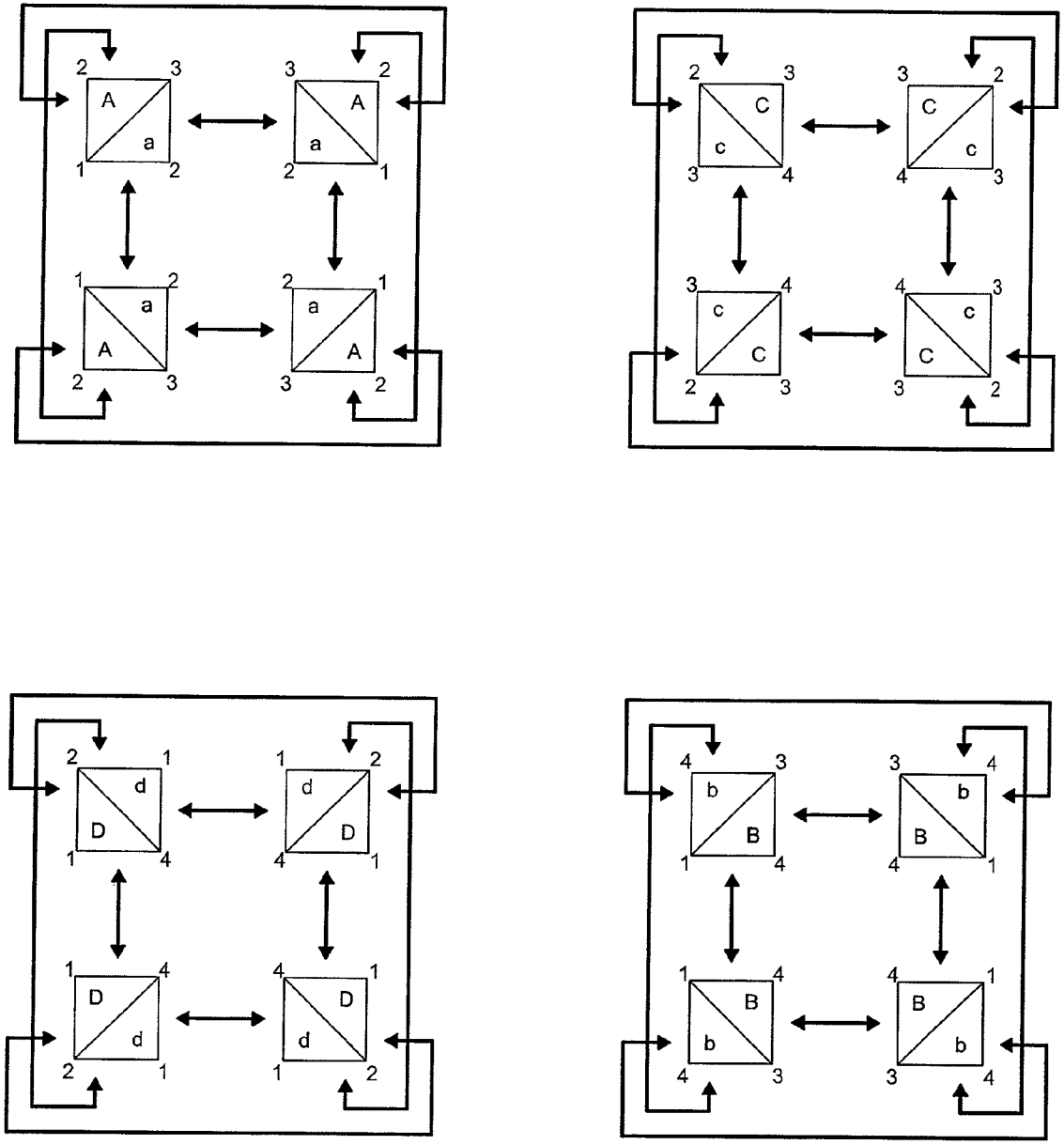
FIG. 10 is a diagram depicting those corresponding legs and corners at or along which pairs of related instances of primary squares in accordance with embodiments of the present disclosure may be joined.

Turning now to FIG. 9, further steps, and/or different steps, in generating further images from the use of the images A, B, C, and D may include creating mirror images of the images 800, 812, 824, 836. For example, images 900, 902, 904, and 906 may be created by mirroring the respective images 800, 812, 824, and 836 about one or the other of their vertical legs as shown. For another example, images 908, 910, 912, and 914 may be created by mirroring the respective images 800, 812, 824, and 836 about one or the other of their horizontal legs as shown. For yet another example, images 916, 918, 920, and 922 may be created by: 1) mirroring the respective images 900, 902, 904, and 906 about one or the other of their horizontal legs as shown; 2) mirroring the respective images 908, 910, 912, and 914 about one or the other of their vertical legs as shown; or 3) rotating the respective images 800, 812, 824, and 836 one hundred and eighty (180) degrees within the plane of FIG. 9 as shown.

In accordance with embodiments of the present disclosure, each of the images 800, 812, 824, 836, 900, 902, 904, 906, 908, 910, 912, 914, 916, 918, 920, and 922 shown in FIGS. 8 and 9 may be a portion of, or become a portion of, a larger image. In such circumstances, and further in accordance with embodiments of the present disclosure, each of the images 800, 812, 824, 836, 900, 902, 904, 906, 908, 910, 912, 914, 916, 918, 920, and 922 may be referred to as an 'primary square' of such larger image.

Turning now to FIGS. 10, 11, 12, 13, and 14, common legs associated with otherwise differently-constituted primary squares associated with the same image (e.g., common legs associated with otherwise differently-constituted primary squares to be positioned adjacent to each other to form larger images. In order to provide a greater understanding of the potential extent of such commonality, it can be helpful to use the corner designations 1, 2, 3, and 4 shown in FIG. 7 as a tool to track, for a given side of a given primary element image (whether mirrored or unmirrored), or of a given symmetrical counterpart image corresponding to such primary element image, the two corresponding 'corners of origin' for that side in the original pictorial reference 702 (FIG. 7).

For example, if the identity and sequence of the corner designations of two sides of two differently-configured primary squares formed from a common original image are both the same, the two sides may be considered to be similar (e.g., in terms of their length, their visual content, and/or their texture). As a result, the two differently-configured primary squares may be positioned adjacent to each other such that the matching sides of the two primary squares are aligned (e.g., such that the matching sides are coextensive and/or collinear). As indicated via corresponding connecting lines and arrows in FIG. 10: 1) at least four vertical (one above the other), and at least four horizontal (side-by-side) adjacent positioning arrangements are possible as between differently-configured primary squares associated with or formed from image A; 2) at least four vertical, and at least four horizontal adjacent positioning arrangements are possible as between differently-configured primary squares associated with or formed from image B; 3) at least four vertical, and at least four horizontal adjacent positioning arrangements are possible as between differently-configured primary squares associated with or formed from image C; and 4) at least four vertical, and at least four horizontal adjacent positioning arrangements are possible as between differently-configured primary squares associated with or formed from image D. As will be discussed further below, such commonalities allow for primary squares formed from the use of the same one of the images A, B, C, and D to be positioned adjacent to each other, and thereby form larger images in accordance with embodiments of the present disclosure.

Referring again to FIG. 7, and as discussed above, the respective isosceles right triangles associated with the images A and B share no legs in common with each other, and the respective isosceles right triangles associated with the images C and D share no legs in common with each other. However, the isosceles right triangle associated with the image A shares one leg with the isosceles right triangle associated with the image C, and another leg with the isosceles right triangle associated with the image D. Also, the isosceles right triangle associated with the image B shares one leg with the isosceles right triangle associated with the image C and another leg with the isosceles right triangle associated with the image D.

As indicated via corresponding connecting lines and arrows shown in FIGS. 11, 12, 13, and 14: 1) at least four vertical, and at least four horizontal adjacent positioning arrangements are possible as between primary squares associated with or formed from image A and primary squares associated with or formed from image C; 2) at least four vertical, and at least four horizontal adjacent positioning arrangements are possible as between primary squares associated with or formed from image A and primary squares associated with or formed from image D; 3) at least four vertical (one above the other), and at least two horizontal (side-by-side) adjacent positioning arrangements are possible as between primary squares associated with or formed from image B and primary squares associated with or formed from image C; and 4) at least four vertical (one above the other), and at least two horizontal (side-by-side) adjacent positioning arrangements are possible as between primary squares associated with or formed from image B and primary squares associated with or formed from image D.

As shown and discussed with reference to FIGS. 10, 11, 12, 13, and 14, the images A, B, C, and D may be used to create further images created solely from the use of such images, and that are larger than the element-sized images 800, 812, 824, 836, 900, 902, 904, 906, 908, 910, 912, 914, 916, 918, 920, and 922 shown in FIGS. 8 and 9. In some instances, such further images may be formed solely from the use of a particular one of the images A, B, C, and D, mirrored and replicated as necessary and/or as desired. In other instances, such further images may be formed from the use of two, three, or all of the images A, B, C, and D, (again) mirrored and replicated as necessary and/or as desired.

Examples of Additional Images Formed from Images A, B, C, D

Figure 15:
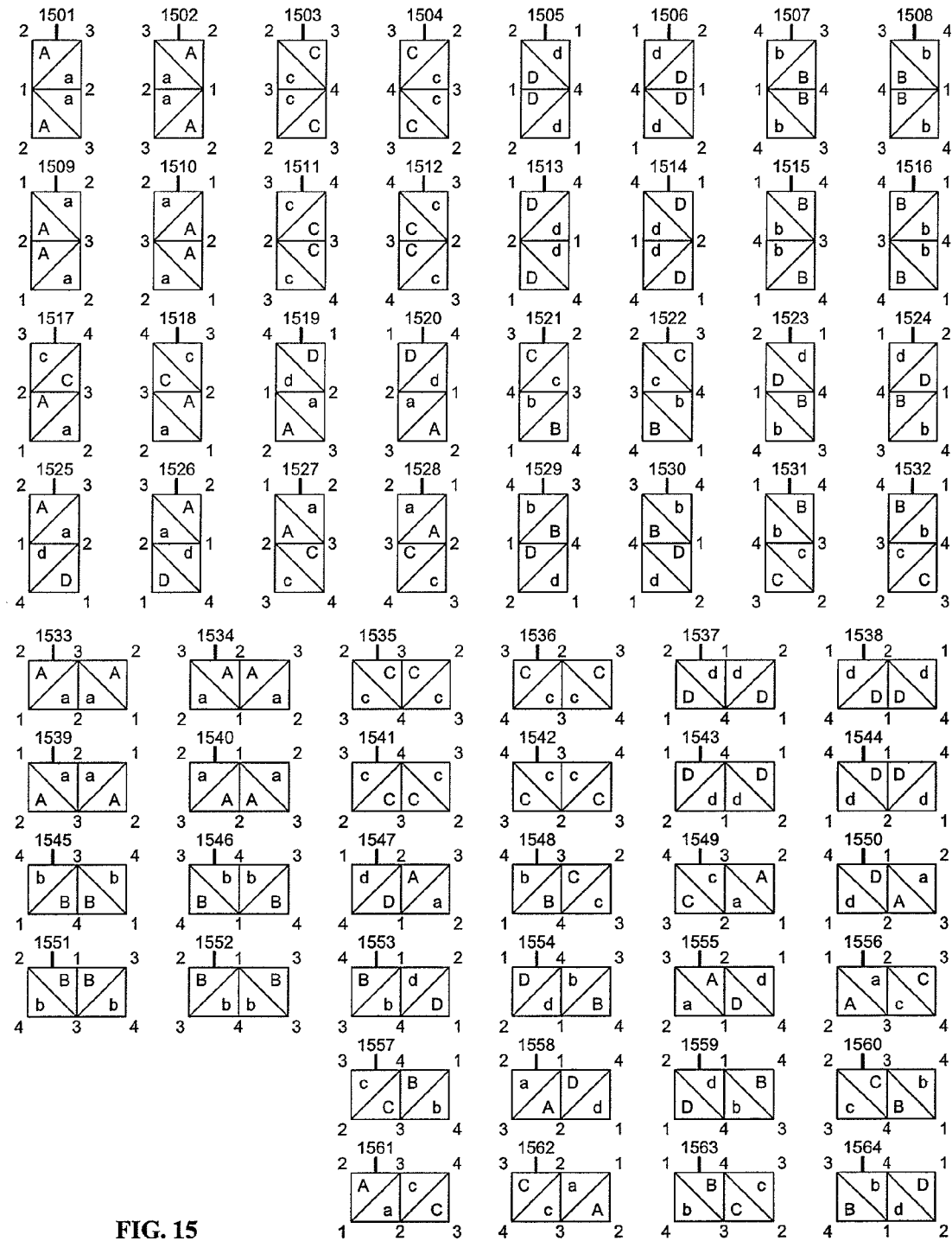
FIG. 15 is a diagram depicting possible examples of pairs related instances of primary squares joined at or along their corresponding legs and corners in accordance with embodiments of the present disclosure.

For a first example of additional images formed from images A, B, C, and D, a variety of larger images including two (2) primary square images may be formed. Images 1501-1564 shown in FIG. 15 fit this description. The images 1501-1532 may be formed by positioning one instance of the images 800, 812, 824, 836, 900, 902, 904, 906, 908, 910, 912, 914, 916, 918, 920, and 922 shown in FIGS. 8 and 9 adjacent to another instance of the images 800, 812, 824, 836, 900, 902, 904, 906, 908, 910, 912, 914, 916, 918, 920, and 922 in vertical sequence to form respective 2×1 (i.e., two rows, one column) matrices comprising such primary square images. The images 1533-1564 may be formed by positioning one instance of the images 800, 812, 824, 836, 900, 902, 904, 906, 908, 910, 912, 914, 916, 918, 920, and 922 shown in FIGS. 8 and 9 adjacent to another instance of the images 800, 812, 824, 836, 900, 902, 904, 906, 908, 910, 912, 914, 916, 918, 920, and 922 in horizontal sequence to form respective 1×2 (i.e., one row, two columns) matrices comprising such primary square images. To the extent any of the images 1501-1564 are created, formed, or derived solely from one of the images A, B, C, or D (e.g., see images 1501-1516, images 1533-46, and images 1551-1552), the particular one of the images A, B, C, or D may alternatively be mirrored about corresponding vertical, horizontal, and/or diagonal lines as necessary or as appropriate to arrive at the desired 1×2 or 2×1 matrix. In the case of still larger images (e.g., as discussed below), and/or in the case of images created, formed, or derived from multiple ones of the images A, B, C, or D (e.g., see images 1517-1532, 1547-1550, and 1553-1564; see also other images as discussed below), a similar means of assembling such images may be undertaken in accordance with embodiments of the present disclosure.

Figure 16:
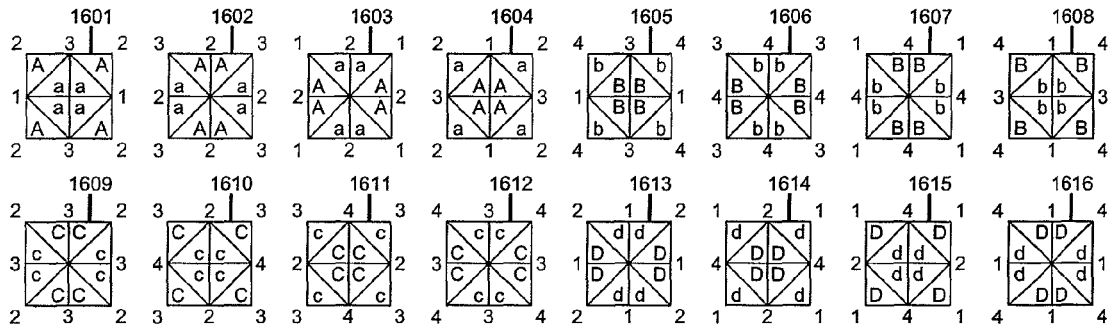
FIG. 16 is a diagram depicting possible examples of four separate related instances of primary squares assembled together to form respective 2×2 matrices or 'quadrants' in accordance with embodiments of the present disclosure.

For a second example, a variety of larger images including four (4) primary square images may be formed. Images 1601-1616 shown in FIG. 16 fit this description. Each of the images 1601-1616 includes four (4) primary square images, one each occupying the respective upper left, upper right, lower left, and lower right corner portions of the images 1601-1616. The images 1601-1616 may include or define respective edgewise perimeters in the shape of a rectangle, which rectangle may be a regular rectangle, or square. As shown in FIG. 16, the images 1601-1616 may include four primary squares assembled together in vertical and horizontal sequence to form a square 2×2 matrix. In accordance with the present disclosure, each such image, as well as other similar images, may be referred to as a 'quadrant.'

Figure 17:
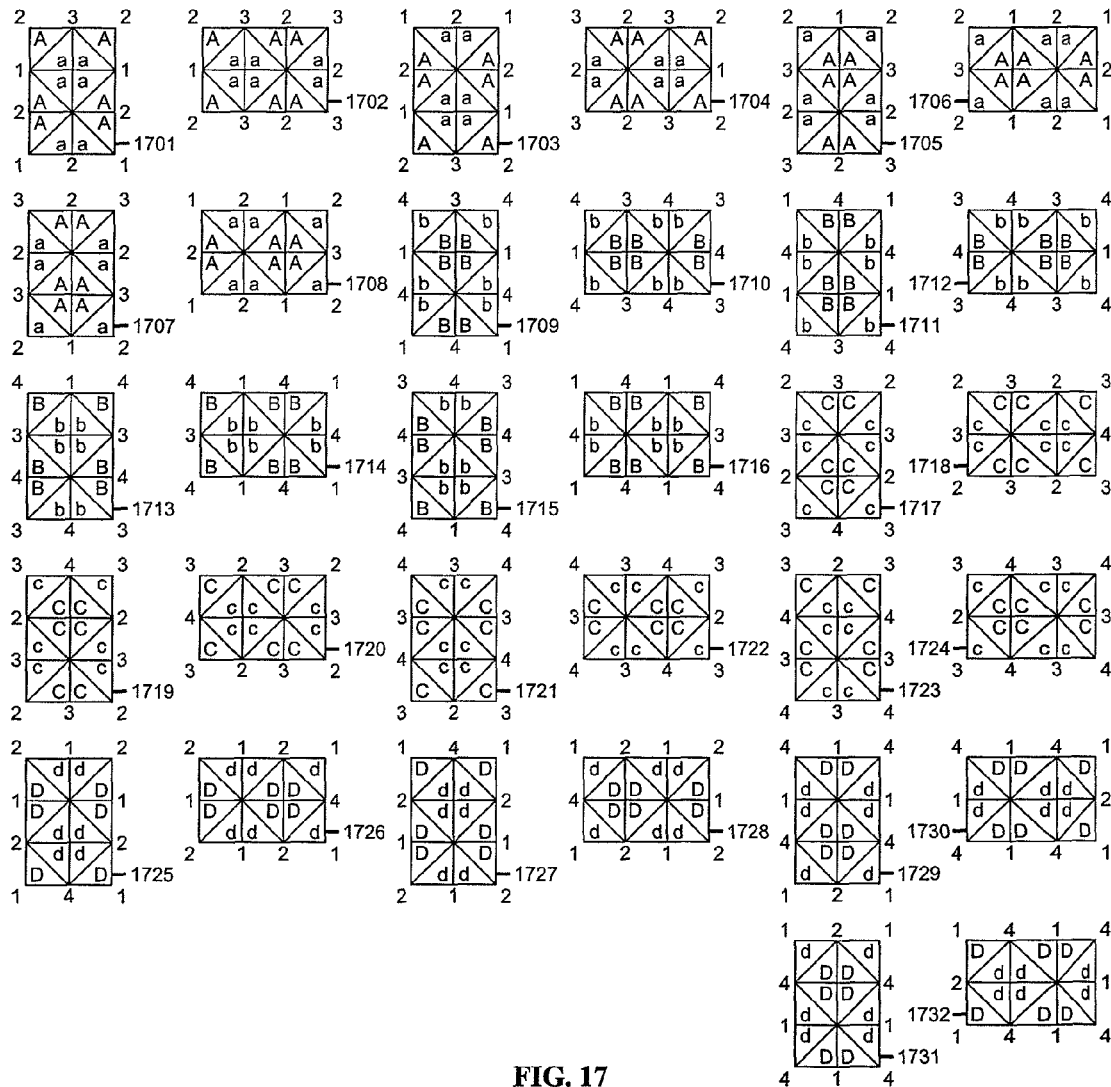
FIG. 17 is a diagram depicting possible examples of six related instances of primary squares assembled together to form respective 2×3 or 3×2 matrices in accordance with embodiments of the present disclosure.

For a third example, a variety of larger images including six (6) primary square images may be formed. Images 1701-1732 shown in FIG. 17 fit this description. Each of the images 1701-1732 includes six (6) primary squares. The images 1701-1732 may be rectangular. As shown in FIG. 17, the images 1701, 1703, 1705, 1707, 1709, 1711, 1713, 1715, 1717, 1719, 1721, 1723, 1725, 1727, 1729, and 1731 may include six primary squares assembled together in vertical and horizontal sequence to form a 3×2 (three rows, two columns) matrix. As also shown, the images 1702, 1704, 1706, 1708, 1710, 1712, 1714, 1716, 1718, 1720, 1722, 1724, 1726, 1728, 1730, and 1732 may include six primary squares assembled together in vertical and horizontal sequence to form respective 2×3 (two rows, three columns) matrices.

Figure 18:
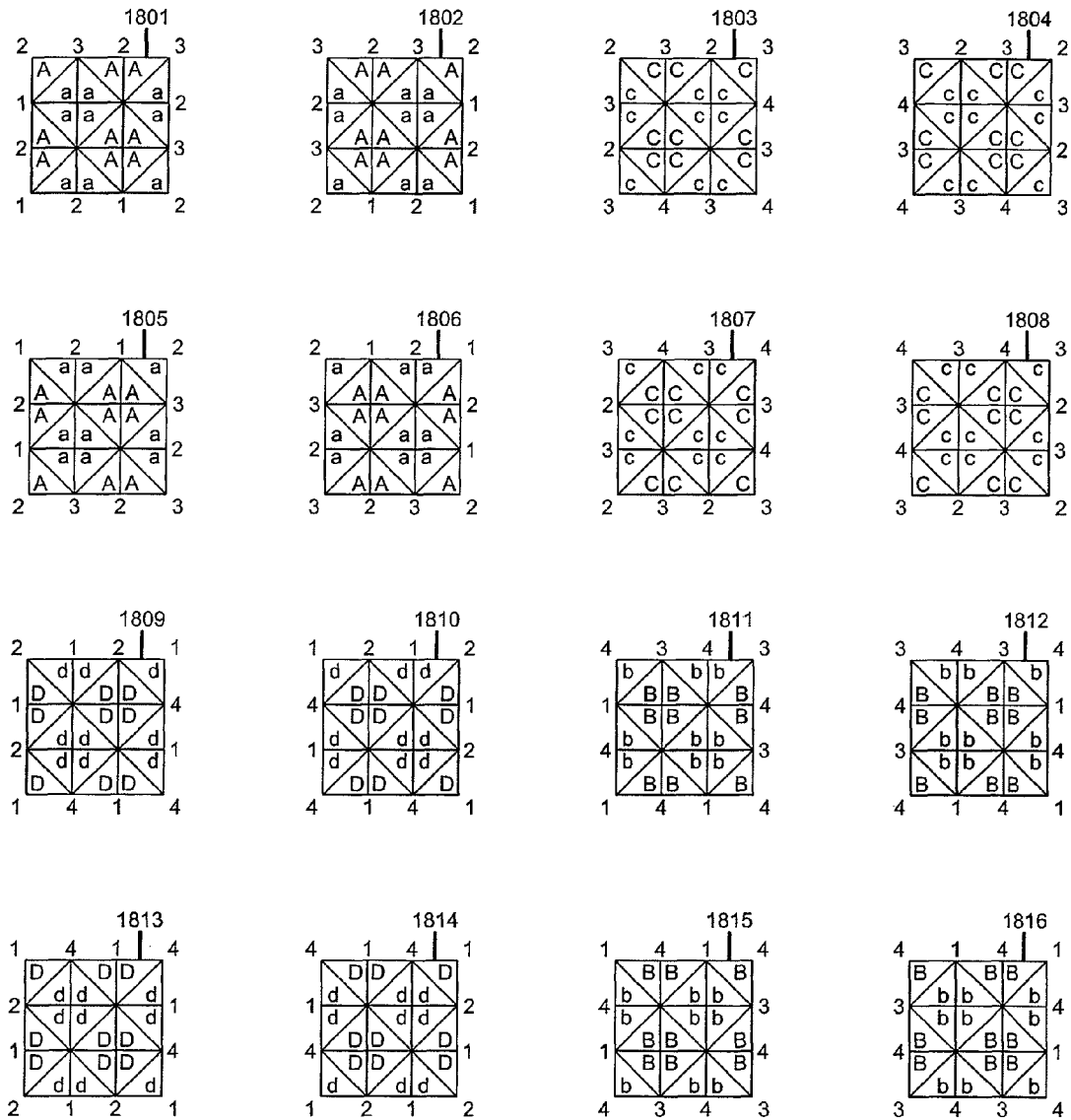
FIG. 18 is a diagram depicting possible examples of nine related instances of primary squares assembled together to form respective 3×3 matrices or 'bi-quadrants' in accordance with embodiments of the present disclosure.

For a fourth example, a variety of larger images including nine (9) primary square images may be formed. Images 1801-1816 shown in FIG. 18 fit this description. The images 1801-1816 may include or define respective edgewise perimeters in the shape of a rectangle, which rectangle may be a regular rectangle, or square. As shown in FIG. 18, the images 1801-1816 may include nine primary squares assembled together in vertical and horizontal sequence to form respective 3×3 matrices. In accordance with the present disclosure, each such image, as well as other similar images, may be referred to as a 'bi-quadrant.'

Figure 19:
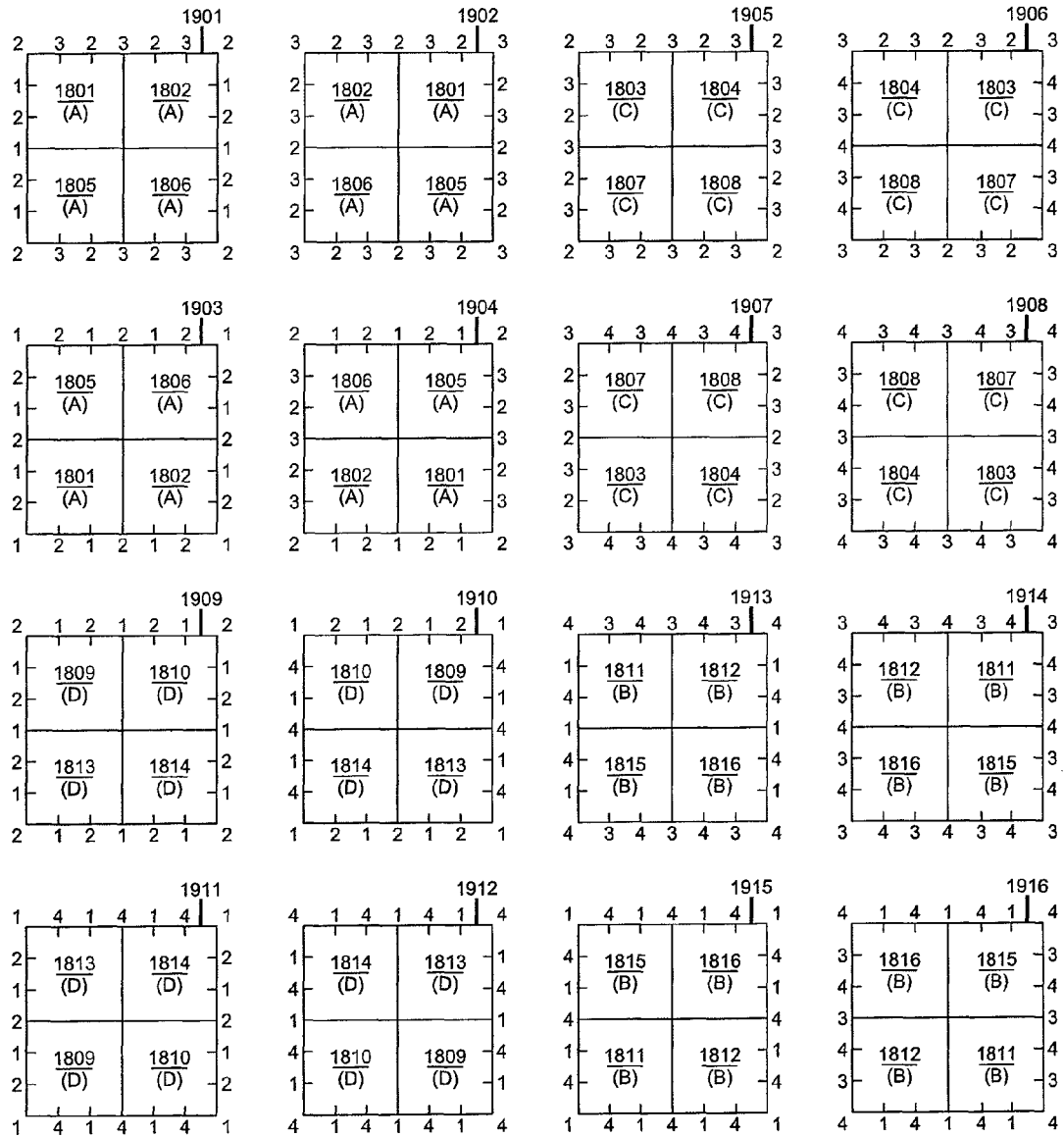
FIG. 19 is a diagram depicting possible examples of nine related instances of primary squares assembled together to form respective 6×6 matrices in accordance with embodiments of the present disclosure.

For a fifth example, a variety of larger images including thirty-six (36) primary square images may be formed. Images 1901-1916 shown in FIG. 19 fit this description. The images 1901-1916 may include or define respective edgewise perimeters in the shape of a rectangle, which rectangle may be a regular rectangle, or square. As shown in FIG. 19, the images 1901-1916 may include thirty-six primary squares assembled together in vertical and horizontal sequence to form respective 6×6 matrices. Each of the images 1901-1904 includes each of the bi-quadrant images 1801, 1802, 1805, and 1806 assembled together in vertical and horizontal sequence to form a respective 2×2 matrix. Each of the images 1905-1908 includes each of the bi-quadrant images 1803, 1804, 1807, and 1808 assembled together in vertical and horizontal sequence to form a respective 2×2 matrix. Each of the images 1909-1912 includes each of the bi-quadrant images 1809, 1810, 1813, and 1814 assembled together in vertical and horizontal sequence to form a respective 2×2 matrix. Each of the images 1913-1916 includes each of the bi-quadrant images 1811, 1812, 1815, and 1816 assembled together in vertical and horizontal sequence to form a respective 2×2 matrix.

Figures 20, 21:
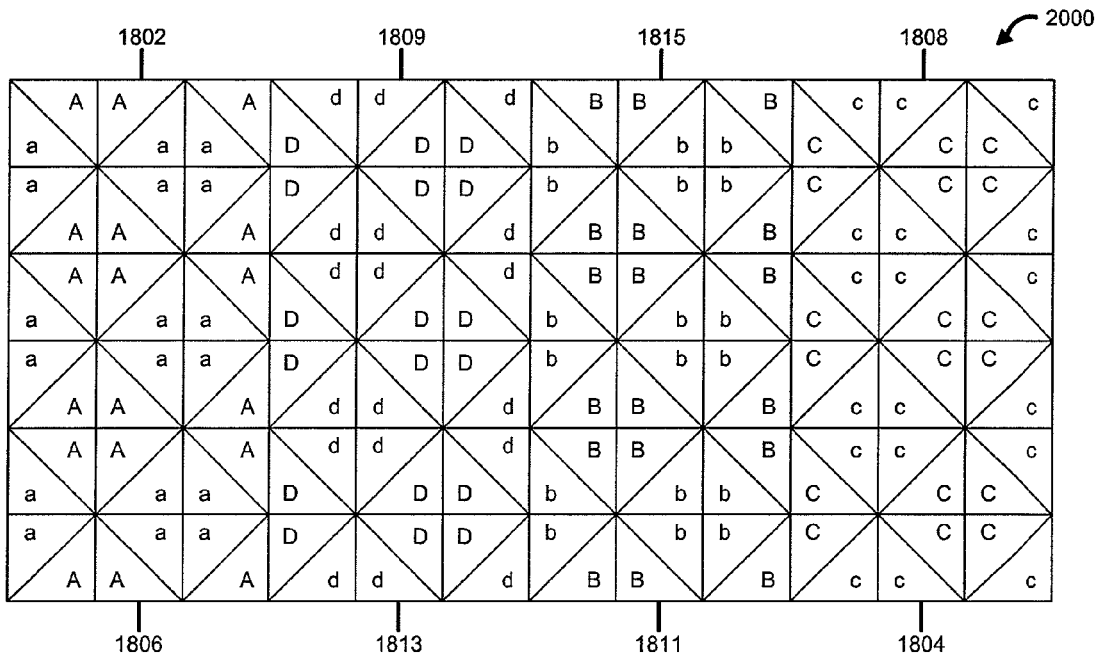
FIG. 20 is a diagram depicting a possible example of eight instances of bi-quadrants assembled together to form a 2×4 matrix of bi-quadrants in accordance with embodiments of the present disclosure.
FIG. 21 is a diagram depicting a possible example of forty instances of bi-quadrants assembled together to form a 5×8 matrix of bi-quadrants in accordance with embodiments of the present disclosure.

For a sixth example, a variety of larger images including seventy-two (72) primary square images may be formed. The image 2000 shown in FIG. 20 fits this description. The image 2000 may include or define an edgewise perimeter in the shape of a rectangle. As shown in FIG. 20, the image 2000 may include seventy-two primary squares assembled together in vertical and horizontal sequence to form a 6×12 matrix. The image 2000 includes each of bi-quadrant images 1802, 1806, 1809, 1813, 1815, 1811, 1808, and 1804 assembled together in vertical and horizontal sequence to form a respective 2×4 matrix.

For a seventh example, a variety of larger images including a multiplicity of primary square images in the form of forty (40) bi-quadrants may be formed. The image 2100 shown in FIG. 21 fits this description. The image 2100 may include or define an edgewise perimeter in the shape of a rectangle. As shown in FIG. 21, the image 2100 may include multiple instances of each of bi-quadrant images 1802, 1806, 1809, 1813, 1815, 1811, 1808, and 1804 assembled together in vertical and horizontal sequence to form a 5×8 matrix.

Figures 22, 23:
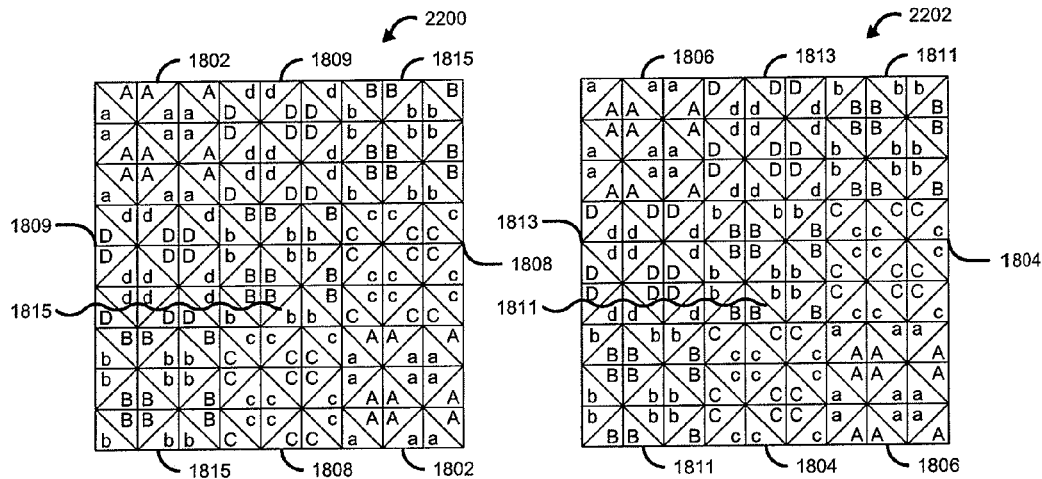
FIG. 22 is a diagram depicting possible examples of nine instances of bi-quadrants assembled together to form a 3×3 matrix of bi-quadrants in accordance with embodiments of the present disclosure.
FIG. 23 is a diagram depicting possible examples of forty-nine instances of bi-quadrants assembled together to form a 7×7 matrix of bi-quadrants in accordance with embodiments of the present disclosure.

For an eighth example, a variety of larger images including a multiplicity of primary square images in the form of nine (9) bi-quadrants may be formed. The images 2200 and 2202 shown in FIG. 22 fit this description. Each of the images 2200 and 2202 may include or define an edgewise perimeter in the shape of a rectangle, which rectangle may be a regular rectangle, or square. As shown in FIG. 22, the image 2200 may include multiple instances of each of bi-quadrant images 1802, 1809, 1815, and 1808 assembled together in a vertical and horizontal sequence to form a 3×3 matrix, and the image 2202 may include multiple instances of each of bi-quadrant images 1806, 1813, 1811, and 1804 assembled together in a vertical and horizontal sequence to form a 3×3 matrix.

For a ninth example, a variety of larger images including a multiplicity of primary square images in the form of forty-nine (49) bi-quadrants may be formed. The images 2300 and 2302 shown in FIG. 23 fit this description. Each of the images 2300 and 2302 may include or define an edgewise perimeter in the shape of a rectangle, which rectangle may be a regular rectangle, or square. As shown in FIG. 23, the image 2300 may include multiple instances of each of bi-quadrant images 1802, 1809, 1815, and 1808 assembled together in a vertical and horizontal sequence to form a 7×7 matrix, and the image 2302 may include multiple instances of each of bi-quadrant images 1806, 1813, 1811, and 1804 assembled together in a vertical and horizontal sequence to form a 7×7 matrix.

Figure 24:
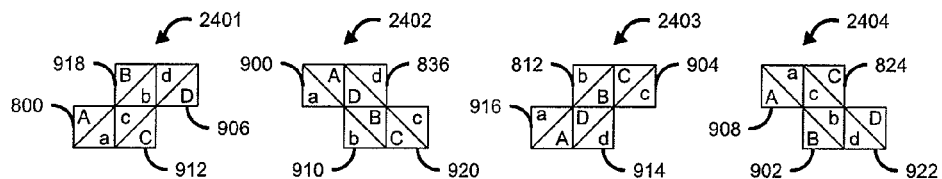
FIG. 24 is a diagram depicting possible examples of four instances of primary squares assembled together to form 2×3 matrices of primary squares in accordance with embodiments of the present disclosure, each such matrix missing one primary square from each row and from each of the first and third columns.

To extend the second example, namely: larger images including four (4) primary square images, images 2401, 2402, 2403, and 2404 shown in FIG. 24 also fit this description. The image 2401 includes one instance each of images 800, 918, 912, and 906; the image 2402 includes one instance each of images 900, 910, 920, and 836, the image 2403 includes one instance each of images 916, 812, 904, and 914, and the image 2404 includes one instance each of images 908, 902, 824, and 922. As shown in FIG. 24, each of the images 2401, 2402, 2403, 2404 includes four primary square images assembled together to form a 2×3 matrix with a missing primary square image in each of the two rows and in the first and third columns as shown.

Figure 25:
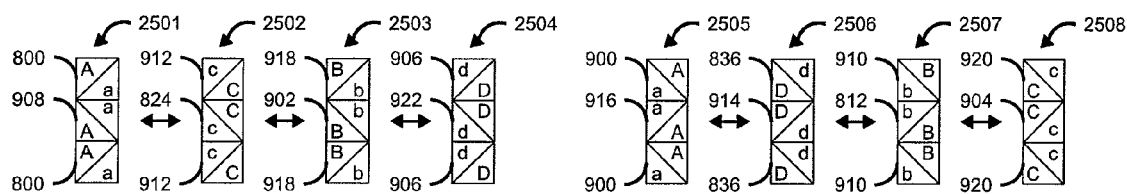
FIG. 25 is a diagram depicting four possible examples of three instances of primary squares assembled together to form 3×1 matrices of primary squares in accordance with embodiments of the present disclosure, and further depicting a manner by which such four 3×1 matrices may be assembled together to form a larger (3×4) matrix.

For a tenth example, a variety of larger images including three (3) primary square images may be formed. Images 2501, 2502, 2503, 2504, 2505, 2506, 2507, and 2508 fit this description. The images 2501, 2502, 2503, 2504, 2505, 2506, 2507, and 2508 include, respectively: 1) two instances of the image 800 and one instance of the image 908, 2) two instances of the image 912 and one instance of the image 824, 3) two instances of the image 918 and one instance of the image 902, 4) two instances of the image 906 and one instance of the image 922, 5) two instances of the image 900 and one instance of the image 916, 6) two instances of the image 836 and one instance of the image 914, 7) two instances of the image 910 and one instance of the image 812, and 8) two instances of the image 920 and one instance of the image 904. As shown in FIG. 25, each of the images 2501, 2502, 2503, 2504, 2505, 2506, 2507, and 2508 includes three primary square images assembled together to form a 1×3 matrix, wherein the images 2501, 2502, 2503, and 2504 may be further assembled together to form a first 3×4 matrix of twelve (12) primary square images (not separately shown), and the images 2505, 2506, 2507, and 2508 may be further assembled together to form a second 3×4 matrix of twelve (12) primary square images (not separately shown).

Figure 26:
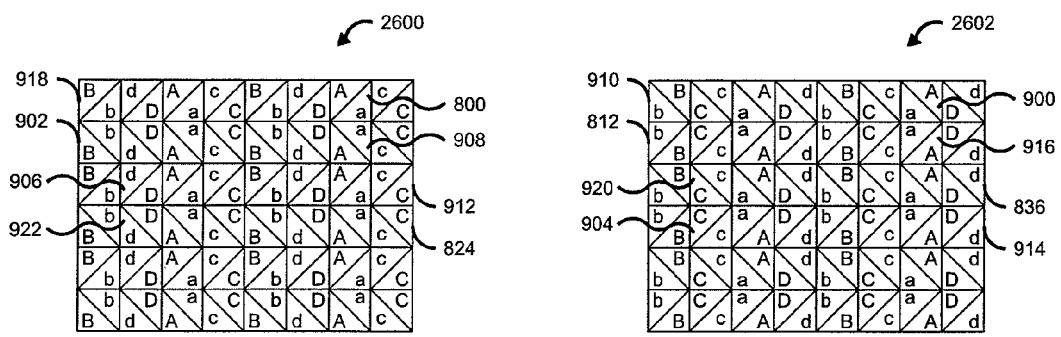
FIG. 26 is a diagram depicting a possible example of forty-eight instances of primary squares assembled together to form a 6×8 matrix of primary squares in accordance with embodiments of the present disclosure.

For an eleventh example, a variety of larger images including forty-eight (48) primary square images may be formed. The images 2600 and 2602 shown in FIG. 26 fit this description. Each of the images 2600 and 2602 may include or define an edgewise perimeter in the shape of a rectangle. As shown in FIG. 26, the image 2600 may include forty-eight primary squares assembled together in vertical and horizontal sequence to form a first 6×8 matrix that includes three instances each of images 800, 908, 912, 824, 918, 902, 906, and 933, and the image 2602 may include forty-eight primary squares assembled together in vertical and horizontal sequence to form a second 6×8 matrix that includes three instance each of images 900, 916, 920, 904, 910, 812, 836, and 914.

Figure 27:
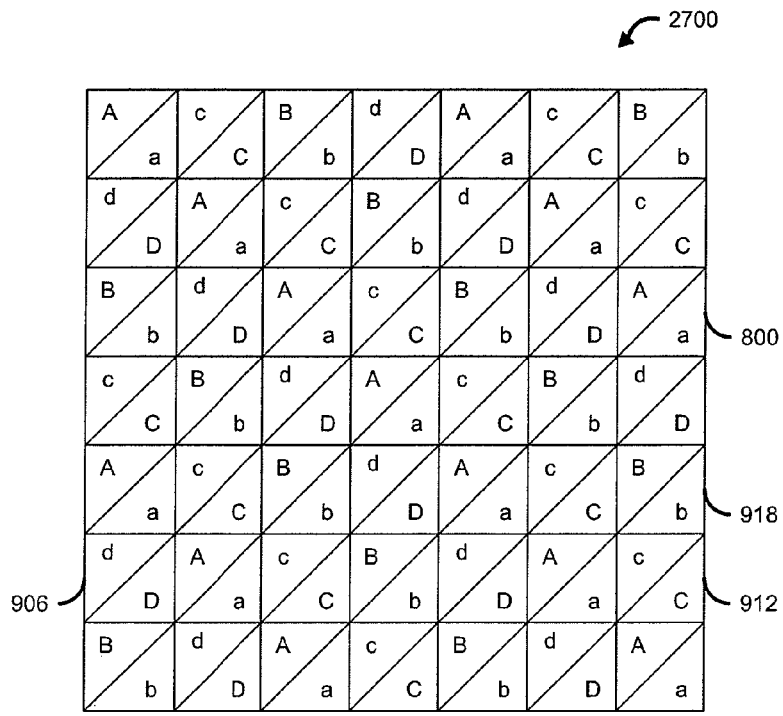
FIG. 27 is a diagram depicting a possible example of forty-nine instances of primary squares assembled together to form a 7×7 matrix of primary squares in accordance with embodiments of the present disclosure.

For a twelfth example, a variety of larger images including forty-nine (49) primary squares may be formed. The image 2700 shown in FIG. 27 fits this description. The image 2700 may include or define an edgewise perimeter in the shape of a rectangle, which rectangle may be a regular rectangle, or square. As shown in FIG. 27, the image 2700 may include multiple instances of each of primary square images 800, 918, 912, and 906 assembled together in a vertical and horizontal sequence to form a 7×7 matrix.

In accordance with embodiments of the present disclosure, many of the larger images shown and described above with respect to FIGS. 15-27 may be replicated and assembled as necessary and/or as desired (e.g., while sharing common edges/sides/legs and/or corners) to form still larger images extending to a potentially unlimited extent along one or more, or all, of the horizontal direction (i.e., left-to-right, and/or right-to-left, in such figures), the vertical direction (i.e., top-to-bottom, and/or bottom-to-top, in such figures), a first diagonal direction extending generally from the lower left to the upper right, and/or from the upper right to the lower left, in such figures, and a second diagonal direction extending generally from the lower right to the upper left, and/or from the upper left to the lower right, in such figures. For example, by virtue of such potentially unlimited extent of extension along the horizontal, vertical, and/or diagonal directions, continuous patterned images may be formed in accordance with embodiments of the present disclosure. Such patterned images may be suitable to adorn larger sheet-like or planar objects appearing in any of a wide variety of potential sizes, and/or having any of a wide variety of potential uses, including personal and commercial uses.

Examples of Bi-Quadrant Assembly Methods

In accordance with embodiments of the present disclosure, bi-quadrants may be formed, created, assembled, or arrived at in a variety of ways. As discussed above, bi-quadrants may be formed by replicating one or more of the images A, B, C, and D (FIGS. 7-8), mirroring such images about legs and diagonals (hypotenuses), and/or assembling such replicated and/or mirrored instances of such images as necessary and/or as desired to arrive at the desired bi-quadrant image. Other methods of forming bi-quadrants are possible in accordance with embodiments of the present disclosure.

Figure 28:
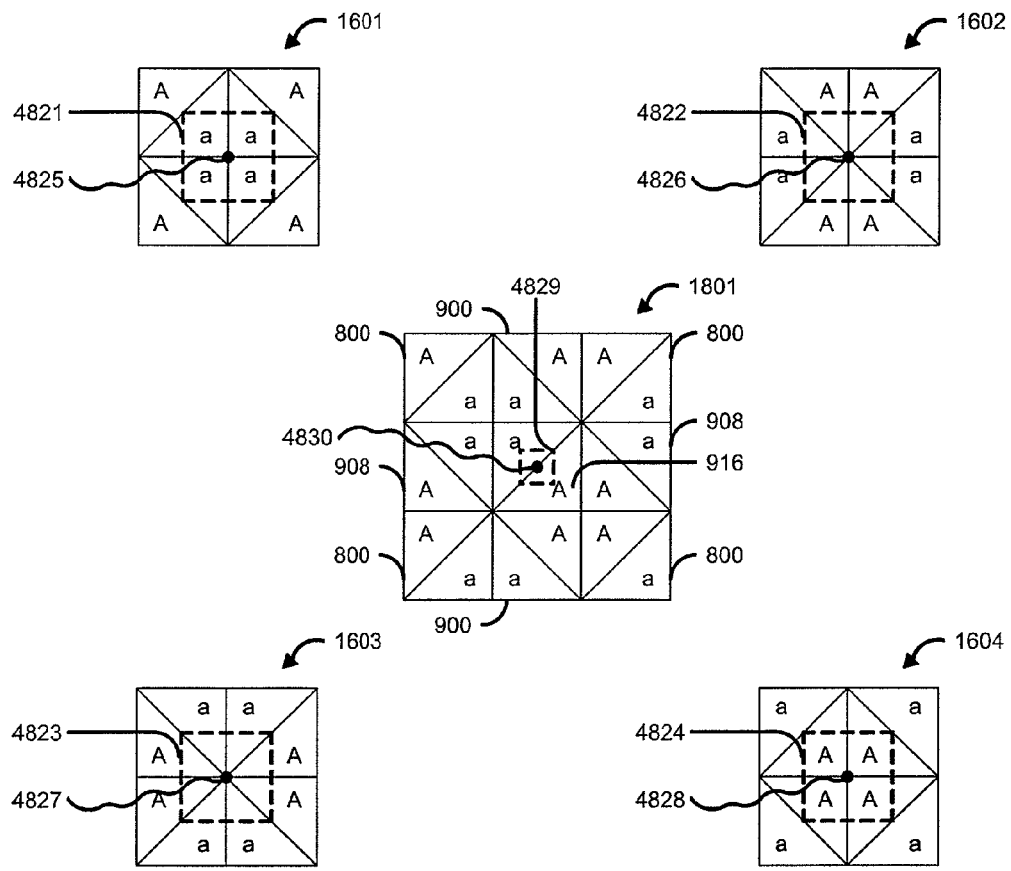
FIG. 28 is a diagram depicting four different quadrants, as well as a bi-quadrant that may be created by assembling the four different quadrants together as discussed herein with reference to FIG. 28.

For a first example, and turning now to FIG. 28, the bi-quadrant 1801 is shown, surrounded by the quadrant images 1601, 1602, 1603, 1604. As shown in FIG. 28, in the event the quadrant images 1601, 1602, 1603, 1604 were to be overlaid, one atop each other, such that four instances of the primary square image 916 are all aligned and 'stacked' (e.g., registered with respect to each other along a direction normal to the paper of FIG. 28), the result would be the bi-quadrant image 1801. In such an overlaying or 'stacking' regime or method, two separate 'two-deep' overlaps will be formed from respective pairs of instances of the primary square image 908 being aligned or stacked with respect to each other, and two more separate 'two-deep' overlaps will be formed from respective pairs of instances of the primary square image 900 being aligned or stacked with respect to each other. Finally, four instances of the primary square image 800 form 'corner-located' instances of the primary square images in which no such stacking or alignment need take place in order to form the bi-quadrant image 1801. All of the bi-quadrants 1802-1816 may be formed in similar ways using respective sets of the quadrants 1601-1616.

Figure 29:
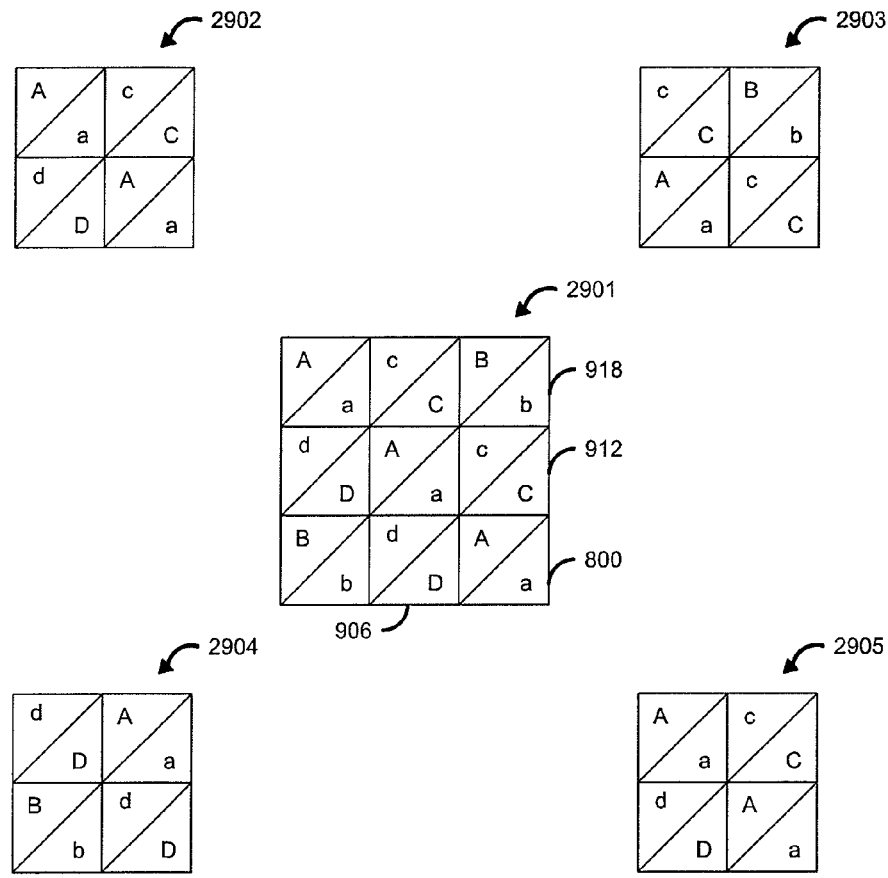
FIG. 29 is a diagram depicting four different 2×2 matrices of primary squares, as well as a 3×3 matrix of primary squares that may be created by assembling the four different 2×2 matrices of primary squares together as discussed herein with reference to FIG. 28.

For a second example, and referring now to FIG. 29, a further image 2901 is shown which includes two or three instances each of the primary square images 800, 918, 912, and 906 assembled together in a vertical and horizontal sequence to form a 3×3 matrix. Further images 2902, 2903, 2904, and 2905 are also shown, each of which includes one or two instances each of three out of the four primary square images 800, 918, 912, and 906 assembled together in a vertical and horizontal sequence to form a 3×3 matrix. As shown in FIG. 29, in the event the images 2901, 2902, 2903, 2904 were to be overlaid, one atop each other, such that four instances of the primary square image 800 are all aligned and 'stacked' (e.g., registered with respect to each other along a direction normal to the paper of FIG. 29), the result would be the image 2901. In such an overlaying or 'stacking' regime or method, two separate 'two-deep' overlaps will be formed from respective pairs of instances of the primary square image 906 being aligned or stacked with respect to each other, and two more separate 'two-deep' overlaps will be formed from respective pairs of instances of the primary square image 912 being aligned or stacked with respect to each other. Finally, two separate instances of the primary square image 800, and two separate instances of the primary square image 918 form four 'corner-located' instances of the primary square images in which no such stacking or alignment need take place in order to form the image 2901. Other 3×3 matrix images may be formed in similar ways.

Examples of Matrix Assembly Methods

In accordance with embodiments of the present disclosure, matrix images may be formed, created, assembled, and/or arrived at in a variety of ways. As discussed above, matrices may be formed by replicating one or more of the images A, B, C, and D (FIGS. 7-8), mirroring such images about legs and diagonals (hypotenuses), and/or assembling such replicated and/or mirrored instances of such images as necessary and/or as desired to arrive at the desired matrix image. Other methods of forming matrices are possible in accordance with embodiments of the present disclosure.

Figure 30:
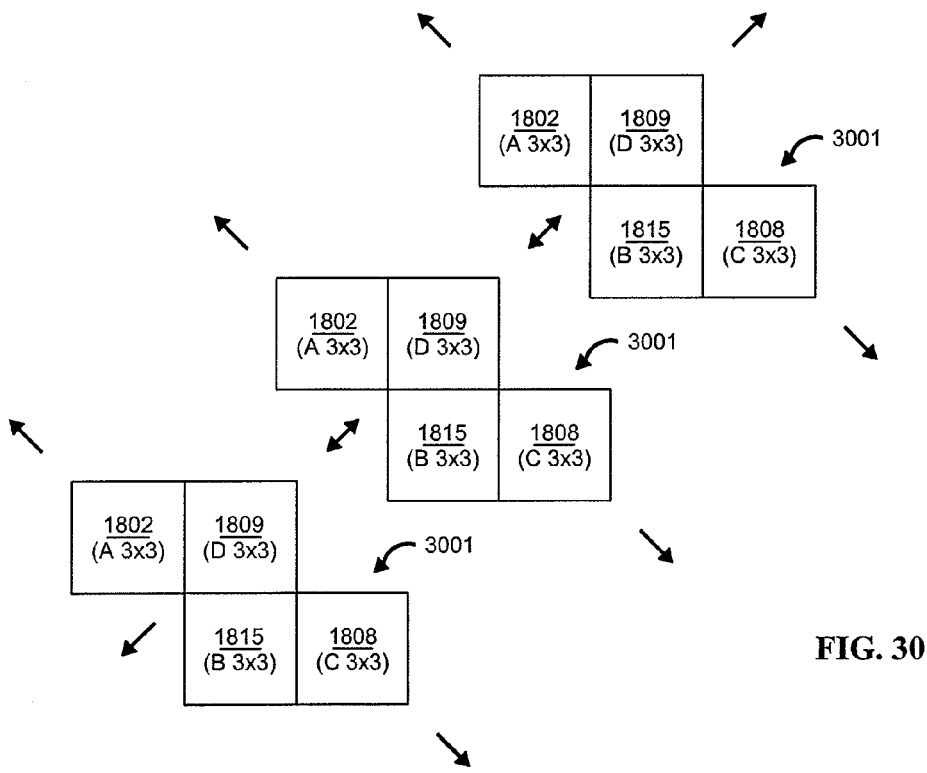
FIG. 30 is a diagram depicting three instances of four distinct bi-quadrants assembled together to form respective 2×3 matrices of bi-quadrants with a bi-quadrant missing from each of the rows and from each of the first and third columns, as well as a manner of assembling a potentially infinite number of instance of such 2×3 matrices together to form larger images extending vertically, horizontally and diagonally.

For a first example, and turning now to FIG. 30, three instances of a matrix image 3001 are shown. Each instance of the matrix image 3001 includes one instance each of the bi-quadrant image 1802 associated with the image A, the bi-quadrant image 1809 associated with the image D, the bi-quadrant image 1815 associated with the image B, and the bi-quadrant image 1808 associated with the image C, linked together to form a 2×3 matrix image from which two bi-quadrant images are 'missing', one from each row and from each of the first and third columns. As shown, multiple instance of the matrix image 3001 may be assembled or linked together along respective right and left diagonal lines to form a larger matrix image, the size of which may be as large or small as desired.

Figure 31:
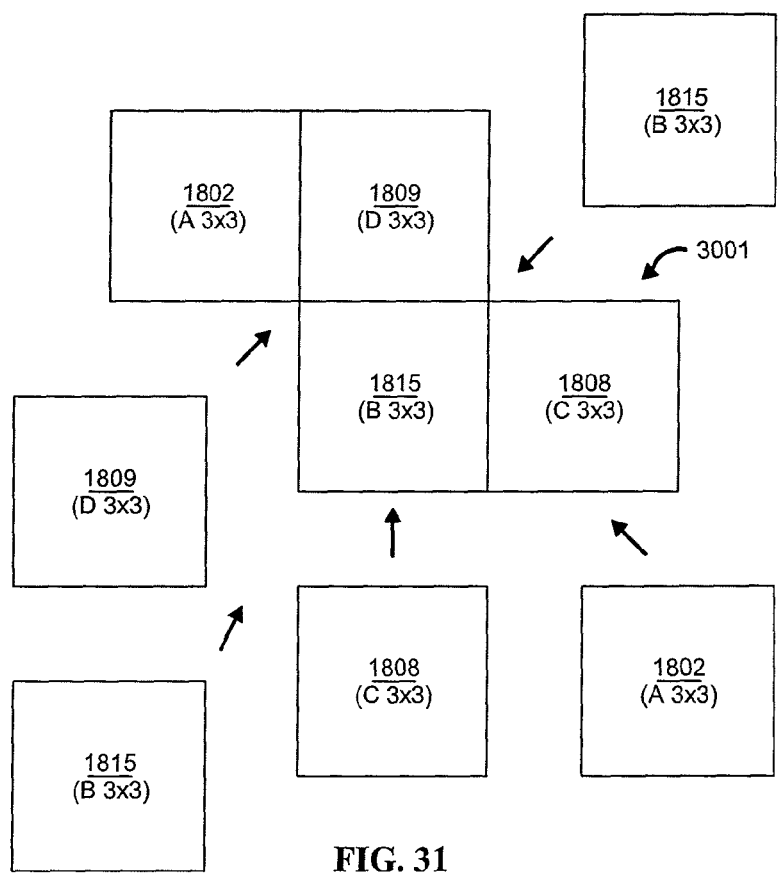
FIG. 31 is a diagram depicting one instance of four distinct bi-quadrants assembled together to form a 2×3 matrix of bi-quadrants with a bi-quadrant missing from each row and from each of the first and third columns, and five additional bi-quadrants, as well as a manner of assembling such 2×3 matrix and such five additional bi-quadrants together to form a 3×3 matrix of bi-quadrants in accordance with embodiments of the present disclosure.

For a second example, and referring now to FIG. 31, another instance of the matrix image 3001 may be combined with additional instances of bi-quadrant images to form a larger image, the larger image so formed being equivalent to the 3×3 matrix image 2200 of nine bi-quadrant images shown and described above with respect to FIG. 22. More particularly, the matrix image 3001, consisting of one instance each of the bi-quadrant images 1802, 1809, 1815, and 1808 linked together to form the above-described 'incomplete' 2×3 matrix image, may be assembled together with additional instances of bi-quadrant images as needed to form the desired 3×3 matrix image, which in this instance includes two additional instances of the bi-quadrant image 1815 associated with the image B, and one additional instance of each of the bi-quadrant images 1802, 1809, and 1808 respectively associated with the images A, D, and C.

Images Formed from Grids of Adjacent Pictorial References

Figure 32:
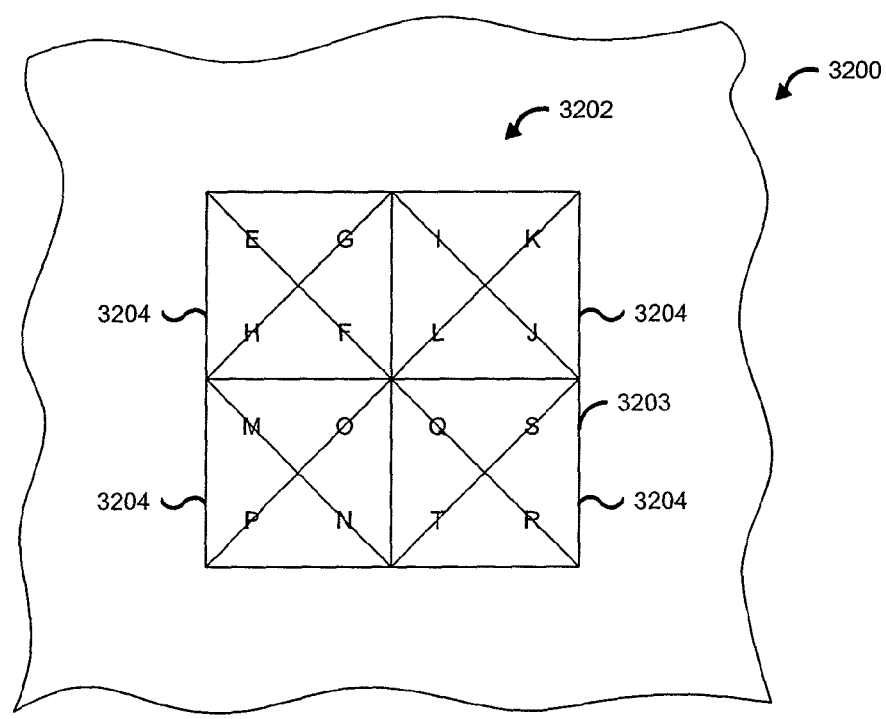
FIG. 32 is a diagram depicting the pictorial reference shown and described herein with respect to FIG. 7 together with three further pictorial reference in the form of a 2×2 grid of pictorial references in accordance with embodiments of the present disclosure, each of the pictorial reference being divided into four distinct half portions, each distinct half portion being an isosceles right triangle.

A portion or portions of an existing image may be used to generate further images, including but not necessarily limited to ordered patterns, in accordance with embodiments of the present disclosure. For example, and as shown in FIG. 32, a part of an existing image 3200 may be identified or selected, e.g., by means of a frame or otherwise, to serve as a pictorial reference 3202 for further processing. In accordance with the embodiment shown in FIG. 32, the pictorial reference 3202 may include or define an edgewise perimeter 3203 in the shape of a rectangle, e.g., a regular rectangle, or square. The pictorial reference 3202 may include and/or be divided into four smaller pictorial sub-references 3204 forming a 2×2 matrix of such sub-references. The content of each of the four smaller pictorial sub-references 3204 may be copied, mirrored, and/or manipulated in accordance with the present disclosure, including wherein each of a first group of images E, F, G, and H, a second group of images I, J, K, and L, a third group of images M, N, O, and P, and a fourth group of images Q, R, S, and T may be similar in this regard to the above-discussed group of images A, B, C, and D for purposes of further copying, mirroring, and manipulation of such images to generate further images. More particularly, and similar to the above-discussed group of images A, B, C, and D, each of the first (E-H), second (I-L), third (M-P), and fourth (Q-T) groups of images includes mutually overlapping pairs of isosceles right triangles occupying or corresponding to respective corners of a common pictorial reference in accordance with embodiments of the present disclosure.

Figure 33:
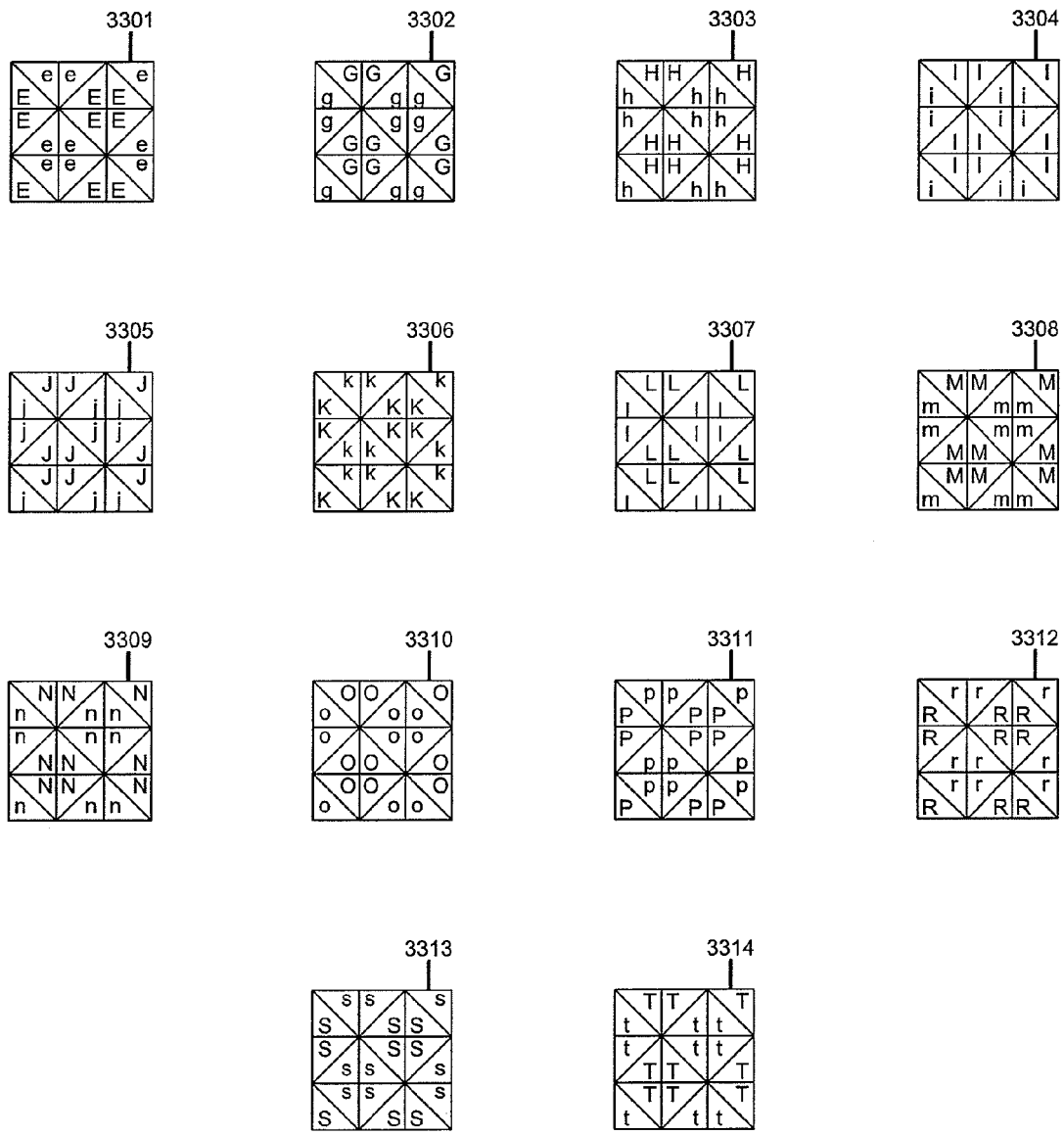
FIG. 33 is a diagram depicting fourteen possible examples of nine related instances of primary squares derived from various distinct half portions associated with the pictorial references discussed herein with respect to FIG. 32 assembled together to form respective 3×3 matrices or 'bi-quadrants' in accordance with embodiments of the present disclosure.
Figures 34, 35:
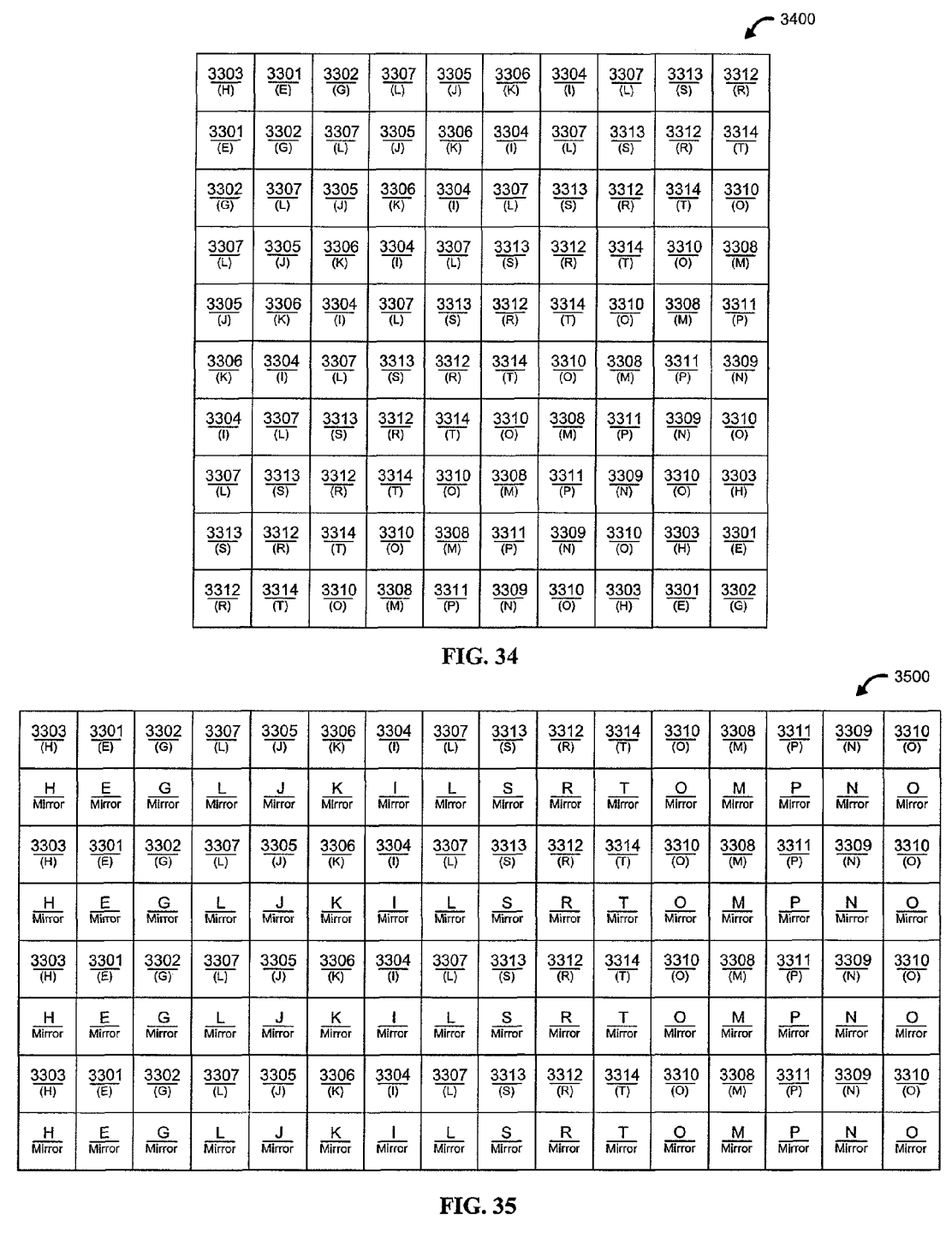

Turning now to FIG. 33, fourteen bi-quadrant images 3301-3314, each of which is formed from a particular one of the images E, G, H, I, J, K, L, M, N, O, P, R, S, and T, are shown. (In this specific example, at least, no bi-quadrants are used that correspond to the images F, and Q.) A first larger image formed from multiple instances of each of the fourteen bi-quadrant images E, G, H, I, J, K, L, M, N, O, P, R, S, and T is shown in FIG. 34. The image 3400 shown in FIG. 34 includes one-hundred (100) bi-quadrant images assembled together in a vertical and horizontal sequence to form a 10×10 matrix as shown. A second larger image formed from multiple instances of each of the fourteen bi-quadrant images E, G, H, I, J, K, L, M, N, O, P, R, S, and T, together with multiple instances of the same bi-quadrant images vertically mirrored about corresponding upper or lower horizontally-extending sides thereof, is shown in FIG. 35. The image 3500 shown in FIG. 35 includes one-hundred twenty-eight (128) bi-quadrant images assembled together in a vertical and horizontal sequence to form a 8×16 matrix as shown. Extensions of displayed images, or of portions of images shown in FIGS. 34 and 35, along respective horizontal, vertical, and/or diagonal dimensions to form still larger images, and/or images of potentially unlimited size along one or more such dimensions, are possible in accordance with embodiments of the present disclosure.

Figure 36:
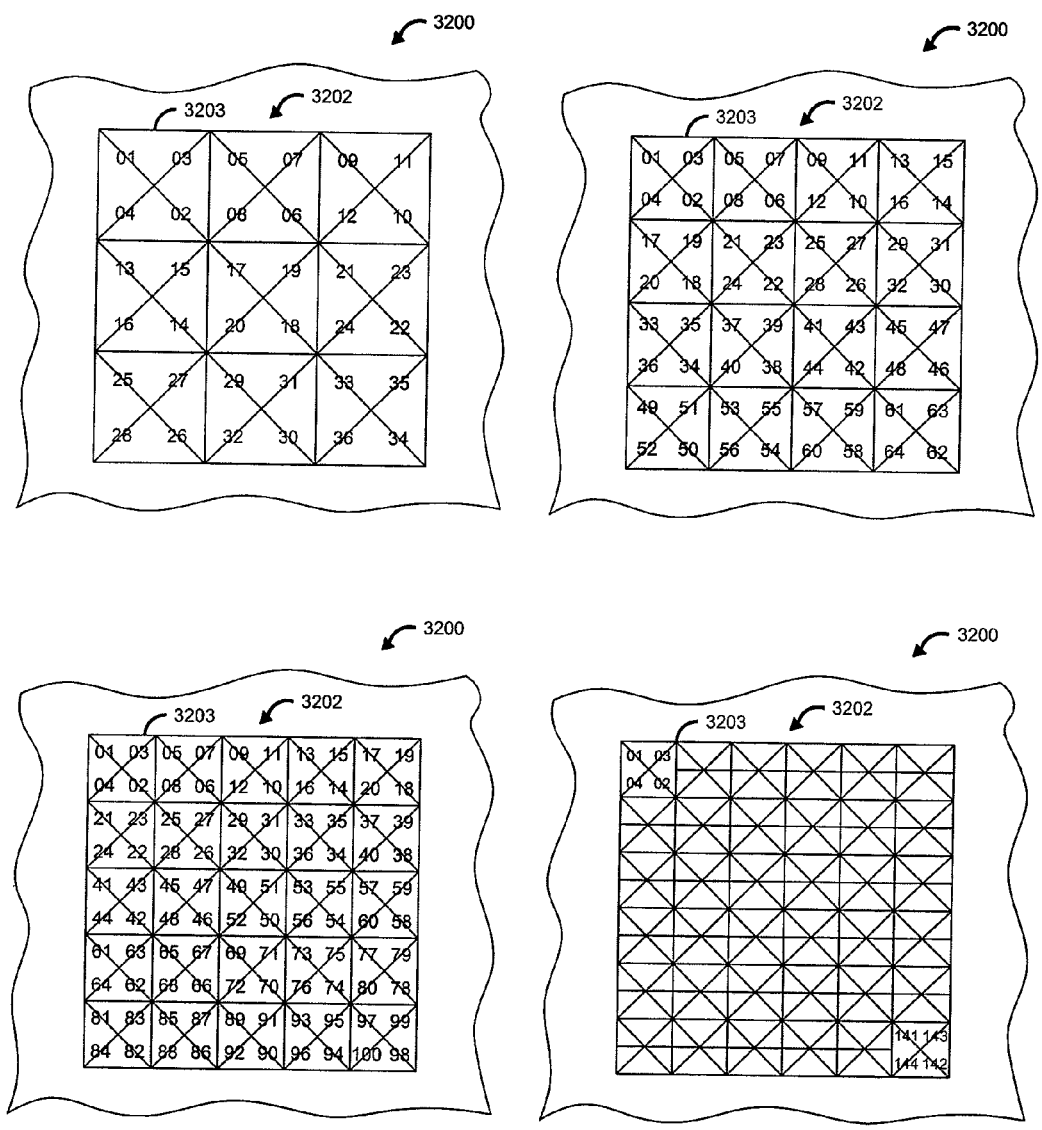
FIG. 36 is a diagram depicting respective 3×3, 4×4, 5×5, and 6×6 matrices of pictorial references in accordance with embodiments of the present disclosure.

As shown in FIG. 36, grids of pictorial sub-references that are finer than the 2×2 grid thereof shown and described with respect to FIG. 32, are possible in accordance with the present disclosure. For example, and as shown in FIG. 36, the pictorial reference 3202, while still retaining the square shape of its edgewise perimeter 3203, and while still containing the same visual content and/or texture), may include and/or be divided into nine (9) pictorial sub-references forming a 3×3 grid of such sub-references, sixteen (16) pictorial sub-references forming a 4×4 grid of such sub-references, twenty-five (25) pictorial sub-references forming a 5×5 grid of such sub-references, or thirty-six (36) pictorial sub-references forming a 6×6 grid of such sub-references. The size of such an M×M grid, in terms of the number of pictorial sub-references it contains, is potentially infinite.

Other grids are possible. Not all of such grids would necessarily facilitate extension or expansion in each of the horizontal and the vertical directions, or in each of the diagonal directions (e.g., at least not without the benefit of further mirroring) as easily as the M×M grids discussed above. Also, not all of such grids would necessarily be susceptible to forming larger images that are free from gaps (e.g., again, at least not without the benefit of further mirroring).

For example, and also in accordance with embodiments of the present disclosure, other and/or different parts (not separately shown) of the existing image 3200 may be identified or selected, e.g., by means of a frame or otherwise, to serve as a pictorial reference (not shown) for further processing, in which the such pictorial reference includes or defines an edgewise perimeter (not shown) in the shape of a non-square rectangle. In accordance with at least some such embodiments, the pictorial reference may include and/or be divided into smaller pictorial sub-references forming an M×N matrix of such sub-references in which M≠N. The content of each sub-reference of the M×N sub-references may be copied, mirrored, and/or manipulated in accordance with the present disclosure, including wherein with respect to each such sub-reference, each of a group of four half-content images may be similar in this regard to the above-discussed group of images A, B, C, and D for purposes of further copying, mirroring, and manipulation of such images to generate further images.

Also in accordance with embodiments of the present disclosure, variations on the above-described embodiments involving M×N (M≠N) matrices of sub-references, as well as variations on the above described embodiments involving M×M matrices of sub-references, are possible which include grids in which at least some sub-references that would otherwise be present in the grid, are instead missing from the grid, but the patterned formed by the sub-references in the grid is continuous, at least insofar as each sub-reference in the grid is positioned vertically or horizontally adjacent to at least one other sub-reference in the grid, and therefore shares a common side/edge/leg with such adjacent sub-reference. Included among such variations are: 1) embodiments (not separately shown) in which the sub-references present in the grid are aligned along the horizontal (e.g., 1×N); 2) embodiments (not separately shown) in which the sub-references present in the grid are aligned along the vertical (e.g., M×1), 3) embodiments (not separately shown) in which the sub-references present in the grid form a plus sign ('+'), and 4) embodiments in which the sub-references present in the grid take the form of a letter 'z' (e.g., similar to the above-discussed images 2401-2404 (FIG. 24).

Using Non-Overlapping Portions of Pictorial References

Figure 37:
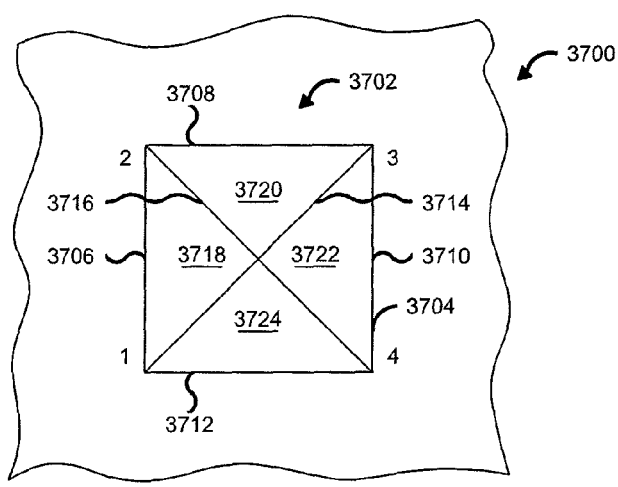
FIG. 37 is a diagram depicting a pictorial reference in accordance with embodiments of the present disclosure, the pictorial reference being divided into four non-overlapping quarter portions, each non-overlapping quarter portion being an isosceles right triangle.

Turning now to FIG. 37, a portion or portions of an existing image 3700 may be used to generate further images, including but not necessarily limited to ordered patterns, in accordance with embodiments of the present disclosure. For example, a part of the existing image 3700 may be identified or selected, e.g., by means of a frame or otherwise, to serve as a pictorial reference 3702 for further processing. In accordance with the embodiment shown in FIG. 37, the pictorial reference 3702 may include or define an edgewise perimeter 3704 in the shape of a rectangle, e.g., a regular rectangle, or square. Other shapes for pictorial references are possible in accordance with the present disclosure, including irregular shapes, and non-rectangular shapes.

The square-shaped edgewise perimeter 3704 defined by the pictorial reference 3702 includes a first corner 1, a second corner 2, a third corner 3, a fourth corner 4, a first leg 3706 extending between the corner 1 and the corner 2, a second leg 3708 extending between the corner 2 and the corner 3 and positioned adjacent to the first leg 3706, a third leg 3710 extending between the corner 3 and the corner 4 and positioned adjacent to the second leg 3708, and a fourth leg 3712 extending between the corner 4 and the corner 1 and positioned adjacent to each of the third leg 3710 and the first leg 3706. In accordance with embodiments of the present disclosure, one or more portions of the pictorial reference 3702 may be used to generate one or more further images, including one or more ordered patterns. For example, the pictorial reference 3702 may be divided in quarters along respective first and second diagonal lines 3714, 3716, the first diagonal line 3714 extending between the corner 1 and the corner 3, and the second diagonal line 3716 extending between the corner 2 and the corner 4, thereby providing four separate images indicated, respectively, at the reference numerals 3718, 3720, 3722, and 3724.

As shown in FIG. 37, each of the images 3718, 3720, 3722, and 3724 defines an edgewise perimeter in the shape of an isosceles right triangle. In the case of the isosceles right triangle associated with the edgewise perimeter of the image 3718, the hypotenuse of the triangle coincides with the first leg 3706. In the case of the isosceles right triangle associated with the edgewise perimeter of the image 3720, the hypotenuse of the triangle coincides with the second leg 3708. In the case of the isosceles right triangle associated with the edgewise perimeter of the image 3722, the hypotenuse of the triangle coincides with the third leg 3710. And in the case of the isosceles right triangle associated with the edgewise perimeter of the image 3724, the hypotenuse of the triangle coincides with the fourth leg 3712.

Still referring to FIG. 37, and as discussed above, each of the images 3718, 3720, 3722, and 3724 comprehends a quarter portion of the total area of the original pictorial reference 3702. Due to the fact that each of the images 3718, 3720, 3722, and 3724 comprehends a separate quarter portion of the total area of the original pictorial reference 3702, the images 3718, 3720, 3722, and 3724 do not necessarily overlap each other in terms of their respective image content. In accordance with the present embodiment, a similar arrangement of peripherally-positioned pixels (e.g., in terms of similar pixel values or colors) appearing along common sides or edges of two images (e.g., along corresponding legs or sides nominally coinciding with the second diagonal line 3716 extending between the image 3718 and the image 3720, or along corresponding legs or sides nominally coinciding with the first diagonal line 3714 extending between the image 3720 and the image 3722), arising (for example) by virtue of a particular algorithm or method used for dividing a larger image into smaller images does not necessarily constitute or represent an overlap in terms of the respective image content of such images.

As will be discussed further below, in accordance with respective embodiments of the present disclosure, each of the image 3718, the image 3720, the image 3722, and the image 3724, may be used to generate one or more further images, including one or more ordered patterns.

Figure 38:
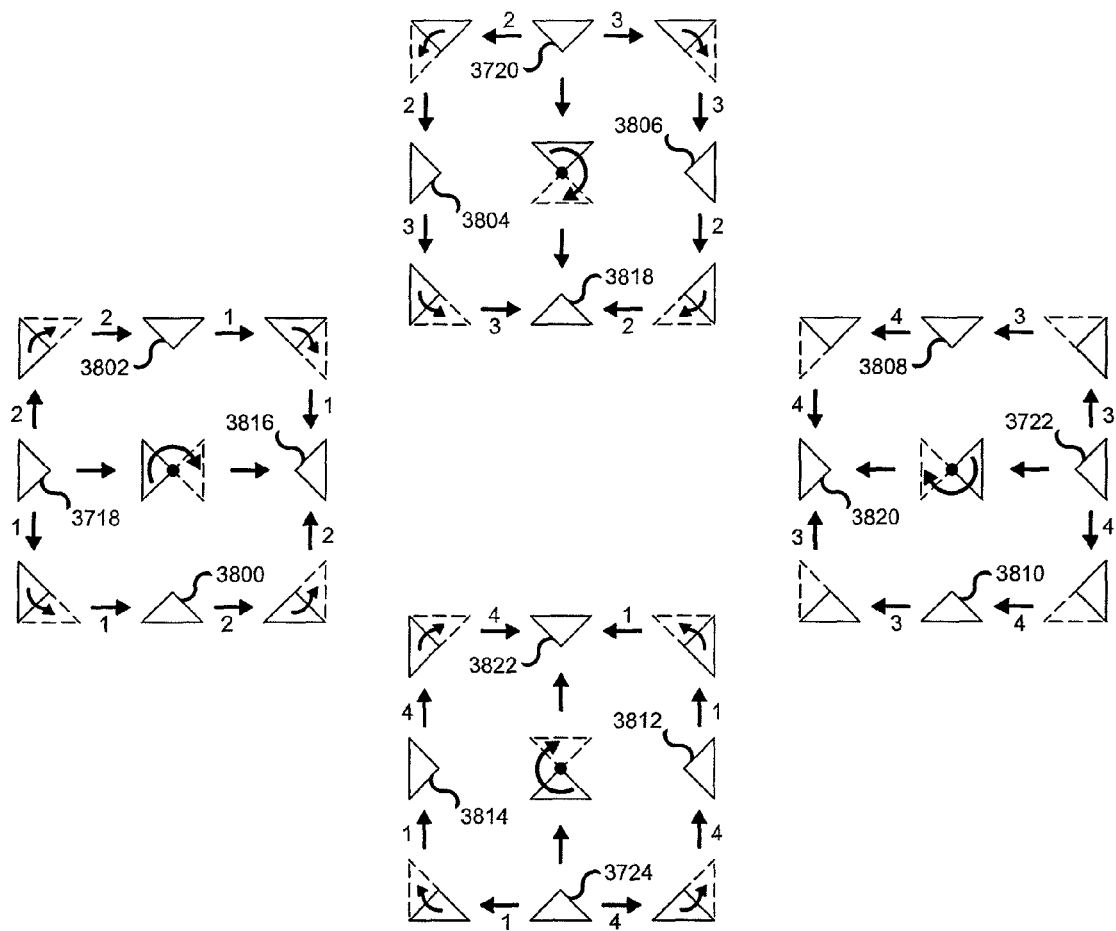
FIG. 38 is a diagram depicting three corresponding images which may be created based on each one of the four non-overlapping quarter portions shown and discussed with reference to FIG. 37, whether via mirroring the particular quarter portion about one or the other its respective isosceles right triangle legs, or via rotating the particular quarter portion one hundred and eighty (180) degrees within the plane of FIG. 38.

Turning now to FIG. 38, steps for generating larger images from the use of the images 3718, 3720, 3722, and 3724 may include creating mirror images thereof. For example, images 3800, 3802, 3804, 3806, 3808, 3810, 3812, and 3814 may be created by mirroring the respective images 3718, 3720, 3722, and 3724 about one or the other of their legs as shown. For another example, images 3816, 3818, 3820, and 3822 may be created by: 1) mirroring the respective images 3800, 3802, 3804, 3806, 3808, 3810, 3812, 3814 about one or the other of their legs as shown; or 2) rotating the respective images 3718, 3720, 3722, and 3724 one hundred and eighty (180) degrees within the plane of FIG. 38 as shown.

In accordance with embodiments of the present disclosure, each of the images 3718, 3720, 3722, 3724, 3800, 3802, 3804, 3806, 3808, 3810, 3812, 3814, 3816, 3818, 3820, and 3822 shown in FIGS. 37 and 38 may be a portion of, or become a portion of, a larger image.

Figure 39:
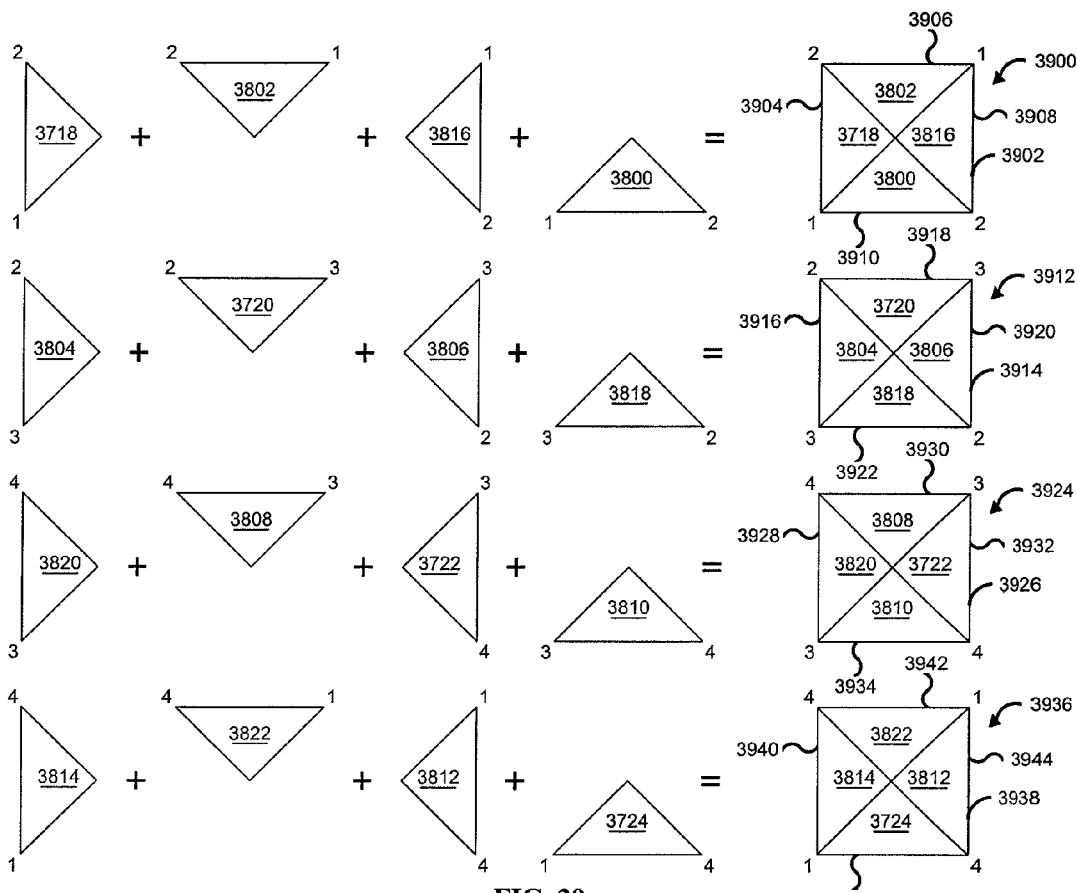
FIG. 39 is a diagram depicting primary squares in accordance with embodiments of the present disclosure, each primary square being formed from a different respective instance of an isosceles right triangle quarter portion of the pictorial reference of FIG. assembled together with three corresponding mirror images or rotated images based thereon.
Figure 40:
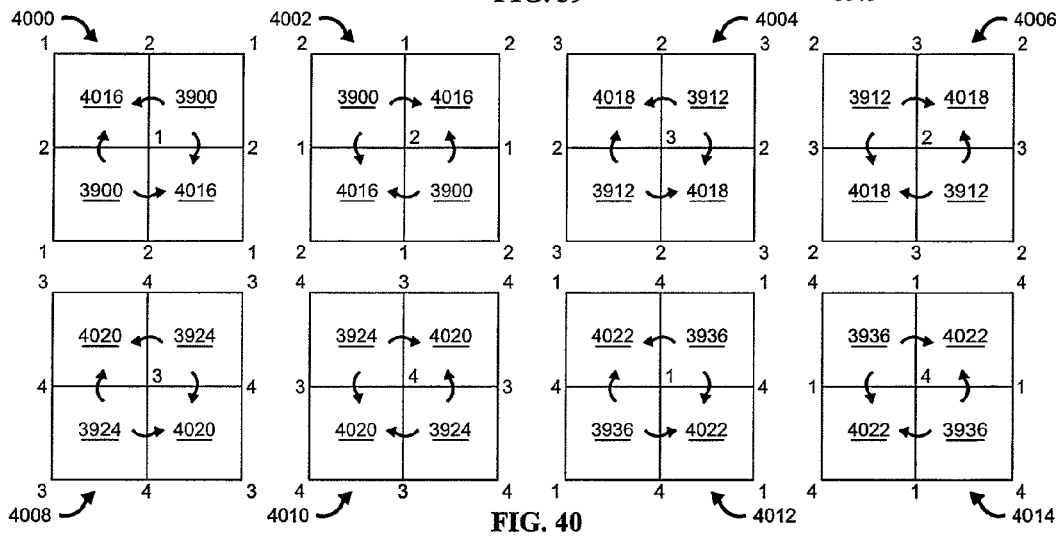
FIG. 40 is a diagram depicting an additional primary square which may derived from each of the primary squares shown and described herein with reference to FIG. 39, as well as eight examples of 2×2 matrices of four primary squares each which may be formed or created by assembling different examples such primary squares.

Turning now to FIG. 39, the mirror images 3800, 3802, and 3816 of the image 3718 may be combined with the original image 3718 to form a larger image 3900. The image 3900 may include or define an edgewise perimeter 3902 in the shape of a rectangle, which may be a regular rectangle, or square. The square-shaped edgewise perimeter 3902 defined by the image 3900 includes a first leg 3904, a second leg 3906 adjacent to the first leg 3904, a third leg 3908 adjacent to the second leg 3906, and a fourth leg 3910 adjacent both the third leg 3908 and the first leg 3904. The first leg 3904 of the image 3900 coincides with the first leg 3706 (FIG. 37) of the square-shaped edgewise perimeter 3704 (FIG. 37) defined by the pictorial reference 3702 (FIG. 37). Also, the lower left and the upper right corners of the image 3900 coincide with the corner 1 of the pictorial reference 3702 (FIG. 40), and the lower right and the upper left corners of the image 3900 coincide with the corner 2 of the pictorial reference 3702. Because the images 3800, 3802, and 3816 are mirror images of the image 3718, the second, third, and fourth legs 3906, 3908, 3910 correspond in mirrored fashion to the first leg 3706 (FIG. 40) of the pictorial reference 3702 (FIG. 40).

Similarly, the mirror images 3804, 3806, 3818 of the image 3720 may be combined with the original image 3720 to form a larger image 3912. The image 3912 may include or define an edgewise perimeter 3914 in the shape of a rectangle, which may be a regular rectangle, or square. The square-shaped edgewise perimeter 3914 defined by the image 3912 includes a first leg 3916, a second leg 3918 adjacent to the first leg 3916, a third leg 3920 adjacent to the second leg 3918, and a fourth leg 3922 adjacent both the third leg 3920 and the first leg 3916. The second leg 3918 of the image 3912 coincides with the second leg 3708 (FIG. 37) of the square-shaped edgewise perimeter 3704 (FIG. 37) defined by the pictorial reference 3702 (FIG. 37). Also, the upper left and the lower right corners of the image 3912 coincide with the corner 2 of the pictorial reference 3702 (FIG. 37), and the upper right and lower left corners of the image 3912 coincide with the corner 3 of the pictorial reference 3702. Because the images 3804, 3806, and 3818 are mirror images of the image 3720, the first, third, and fourth legs 3916, 3920, 3922 correspond in mirrored fashion to the second leg 3708 (FIG. 37) of the pictorial reference 3702 (FIG. 37).

Also similarly, the mirror images 3808, 3810, 3820 of the image 3722 may be combined with the original image 3722 to form a larger image 3924. The image 3924 may include or define an edgewise perimeter 3926 in the shape of a rectangle, which may be a regular rectangle, or square. The square-shaped edgewise perimeter 3926 defined by the image 3924 includes a first leg 3928, a second leg 3930 adjacent to the first leg 3928, a third leg 3932 adjacent to the second leg 3930, and a fourth leg 3934 adjacent both the third leg 3932 and the first leg 3928. The third leg 3932 of the image 3924 coincides with the third leg 3710 (FIG. 37) of the square-shaped edgewise perimeter 3704 (FIG. 37) defined by the pictorial reference 3702 (FIG. 37). Also, the upper left and the lower right corners of the image 3924 coincide with the corner 4 of the pictorial reference 3702 (FIG. 37), and the upper right and lower left corners of the image 3924 coincide with the corner 3 of the pictorial reference 3702. Because the images 3808, 3810, and 3820 are mirror images of the image 3722, the first, second, and fourth legs 3928, 3930, 3934 correspond in mirrored fashion to the third leg 3710 (FIG. 37) of the pictorial reference 3702 (FIG. 37).

Also similarly, the mirror images 3812, 3814, 3822 of the image 3724 may be combined with the original image 3724 to form a larger image 3936. The image 3936 may include or define an edgewise perimeter 3938 in the shape of a rectangle, which may be a regular rectangle, or square. The square-shaped edgewise perimeter 3938 defined by the image 3936 includes a first leg 3940, a second leg 3942 adjacent to the first leg 3940 a third leg 3944 adjacent to the second leg 3942, and a fourth leg 3946 adjacent both the third leg 3944 and the first leg 3940. The fourth leg 3946 of the image 3936 coincides with the fourth leg 3712 (FIG. 37) of the square-shaped edgewise perimeter 3704 (FIG. 37) defined by the pictorial reference 3702 (FIG. 37). Also, the upper left and the lower right corners of the image 3936 coincide with the corner 4 of the pictorial reference 3702 (FIG. 37), and the upper right and lower left corners of the image 3936 coincide with the corner 1 of the pictorial reference 3702. Because the images 3812, 3814, and 3822 are mirror images of the image 3724, the first, second, and third legs 3940, 3942, 3944 correspond in mirrored fashion to the fourth leg 3712 (FIG. 37) of the pictorial reference 3702 (FIG. 37).

In accordance with at least some embodiments of the present disclosure, each of the squares defined by the respective edgewise perimeters 3912, 3914, 3926, 3938 of the images 3900, 3912, 3924, and 3936 may be similar to (i.e., the same size as) the square defined by the edgewise perimeter 3704 of the pictorial reference 3702 shown and discussed with reference to FIG. 37. In accordance with at least some other embodiments of the present disclosure, the creation of the images 3900, 3912, 3924, and 3936 may result in one or more of the edgewise perimeters 3902, 3914, 3926, 3938 being of a smaller scale or size compared to that of the edgewise perimeter 3704 of the pictorial reference 3702 shown and discussed with reference to FIG. 37. In accordance with still further embodiments of the present disclosure, the creation of the images 3900, 3912, 3924, and 3936 may result in one or more of the edgewise perimeters 3902, 3914, 3926, 3938 being of a larger scale or size compared to that of the edgewise perimeter 704 of the pictorial reference 702 shown and discussed with reference to FIG. 7. In accordance with at least some or all of such embodiments, the pictorial reference 3702 (FIG. 37) and the images 3900, 3912, 3924, and 3936 may share both a common square shape, as well as at least some common content, such that each of the images 3900, 3912, 3924, and 3936 may be considered to be related to, based on, and/or derived from the pictorial reference 3702, at least for purposes of generating further images therefrom.

In accordance with embodiments of the present disclosure, each of the images 3900, 3912, 3924, and 3936 may be referred to as a 'primary sub-element' from which larger images (e.g., primary squares, quadrants, bi-quadrants, matrices, etc.) may be formed. In accordance with embodiments of the present disclosure, each of the four primary sub-elements associated with a given pictorial reference may constitute a half-portion of each of two of the four primary elements associated with that pictorial reference. As such, to the extent larger images created from the primary sub-elements exhibit or include common edges or sides with larger images created from the primary elements, it is within the scope of the present disclosure for such larger images created from the primary sub-elements and such larger images created from the primary elements to be combined to form still larger elements (not specifically shown).

Examples of Additional Images Formed from Images 3718, 3720, 3722, 3724

For a first example of additional images formed from images 3718, 3720, 3722, and 3724, a variety of larger images including four (4) primary square images may be formed. Images 4000, 4002, 4004, 4006, 4008, 4010, 4012, and 4014 shown in FIG. 40 fit this description. Each of the images 4000, 4002, 4004, 4006, 4008, 4010, 4012, and 4014 includes four (4) primary square images, one each occupying the respective upper left, upper right, lower left, and lower right corner portions of the images 4000, 4002, 4004, 4006, 4008, 4010, 4012, and 4014. The images 4000, 4002, 4004, 4006, 4008, 4010, 4012, and 4014 may include or define respective edgewise perimeters in the shape of a rectangle, which rectangle may be a regular rectangle, or square. As shown in FIG. 40, the images 4000, 4002, 4004, 4006, 4008, 4010, 4012, and 4014 may include four primary squares assembled together in vertical and horizontal sequence to form a square 2×2 matrix. In accordance with the present disclosure, each such image, as well as other similar images, may be referred to as a 'quadrant.' The images 4000, 4002, 4004, 4006, 4008, 4010, 4012, and 4014 may be created in part by creating mirror images of the images 3900, 3912, 3924, and 3936. More particularly, the images 4000, 4002, 4004, 4006, 4008, 4010, 4012, and 4014 may be created by providing two instances each of the images 3900, 3912, 3924, and 3936, mirroring the images 3900, 3912, 3924, and 3936 about one or the other of their vertical legs as shown to form two instances each of respective images 4016, 4018, 4020, and 4022, and assembling the images 3900, 3912, 3924, 3936, 4016, 4018, 4020, and 4022 as shown.

Figure 41:
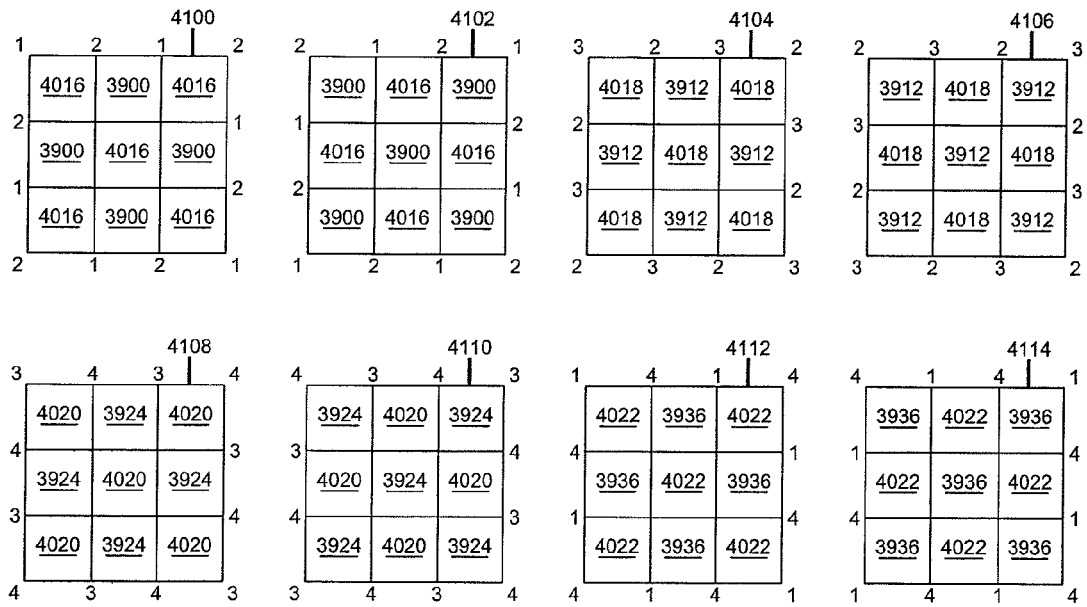
FIG. 41 is a diagram depicting eight examples of 3×3 matrices of nine primary squares each which may be formed or created by assembling different examples of the primary squares shown and discussed herein with reference to FIGS. 39 and 40.

For a second example, a variety of larger images including nine (9) primary square images may be formed. Images 4100, 4102, 4104, 4106, 4108, 4110, 4112, and 4114 shown in FIG. 41 fit this description. The images 4100, 4102, 4104, 4106, 4108, 4110, 4112, and 4114 may include or define respective edgewise perimeters in the shape of a rectangle, which rectangle may be a regular rectangle, or square. As shown in FIG. 41, the images 4100, 4102, 4104, 4106, 4108, 4110, 4112, and 4114 may include nine primary squares assembled together in vertical and horizontal sequence to form respective 3×3 matrices. In accordance with the present disclosure, each such image, as well as other similar images, may be referred to as a 'bi-quadrant.' The images 4100, 4102, 4104, 4106, 4108, 4110, 4112, and 4114 may be created by providing four or five instances each of the images 3900, 3912, 3924, 3936, 4016, 4018, 4020, and 4022 and assembling such images as shown.

Figure 42:
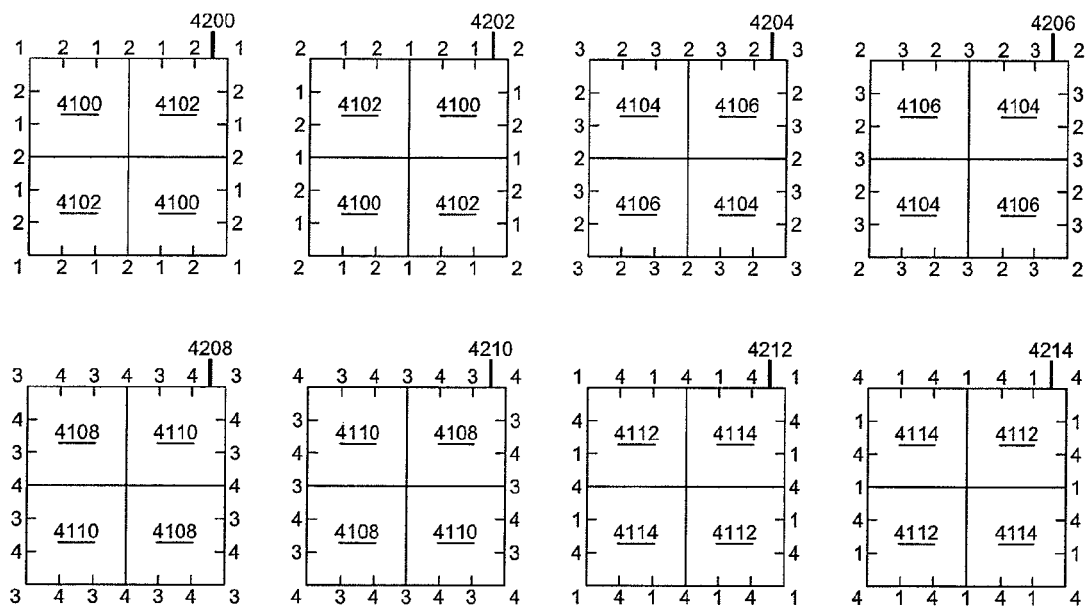
FIG. 42 is a diagram depicting eight examples of 6×6 matrices of thirty-six primary square each which may be formed or created by assembling different examples of the 3×3 matrices shown and discussed herein with reference to FIG. 41.

For a third example, a variety of larger images including thirty-six (36) primary square images may be formed. Images 4200, 4202, 4204, 4206, 4208, 4210, 4212, and 4214 shown in FIG. 42 fit this description. The images 4200, 4202, 4204, 4206, 4208, 4210, 4212, and 4214 may include or define respective edgewise perimeters in the shape of a rectangle, which rectangle may be a regular rectangle, or square. As shown in FIG. 42, the images 4200, 4202, 4204, 4206, 4208, 4210, 4212, and 4214 may include thirty-six primary squares assembled together in vertical and horizontal sequence to form respective 6×6 matrices. The images 4200, 4202, 4204, 4206, 4208, 4210, 4212, and 4214 may be created by providing two instances each of the images 4100, 4102, 4104, 4106, 4108, 4110, 4112, and 4114 and assembling such images as shown.

In accordance with embodiments of the present disclosure, many of the larger images shown and described above with respect to FIGS. 40-42 may be replicated and assembled as necessary and/or as desired to form still larger images extending to a potentially unlimited extent along one or more, or all, of the horizontal direction (i.e., left-to-right, and/or right-to-left, in such figures), the vertical direction (i.e., top-to-bottom, and/or bottom-to-top, in such figures), a first diagonal direction extending generally from the lower left to the upper right, and/or from the upper right to the lower left, in such figures, and a second diagonal direction extending generally from the lower right to the upper left, and/or from the upper left to the lower right, in such figures. For example, by virtue of such potentially unlimited extent of extension along the horizontal, vertical, and/or diagonal directions, continuous patterned images may be formed in accordance with embodiments of the present disclosure. Such patterned images may be suitable to adorn larger sheet-like or planar objects appearing in any of a wide variety of potential sizes, and/or having any of a wide variety of potential uses, including personal and commercial uses.

Cropping the Pictorial Reference, Rotating the Cropped Image

In accordance with embodiments of the present disclosure, including embodiments thereof shown and described herein with reference to FIGS. 7-42, a portion of an initial image may be selected for use as a pictorial reference, from which may be created primary elements and/or primary sub-elements for further processing. In accordance with at least some such embodiments, and other embodiments, a previously-selected pictorial reference may be subjected to further processing prior to the creation or generation of primary elements or sub elements. For example, a portion of the pictorial reference may be selected by means of a cropping procedure, after which the portion or portions of the pictorial reference that were not selected may be discarded or deleted, and the selected portion used for further processing. Items 4302, 4304, 4306, 4308, 4310, 4312, 4314, 4316, 4318, 4320, 4322, 4324, and 4326 shown in FIG. 43 illustrate various examples of such a cropping procedure.

Figure 43:
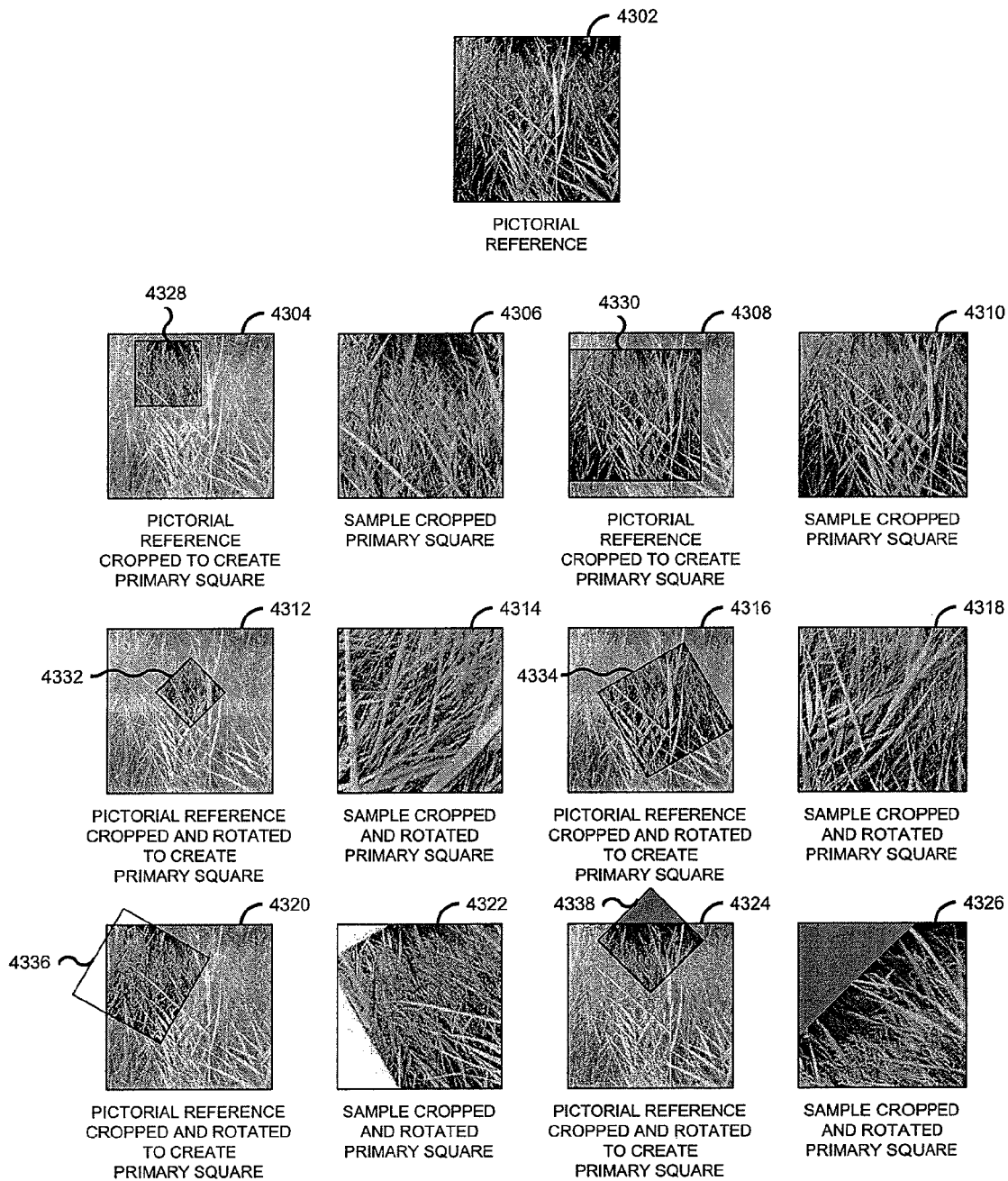
FIG. 43 is a diagram depicting different methods of deriving a pictorial reference from a given reference image by selecting a given portion of the reference image using a cropping frame, deleting unselected portions of the reference falling outside the cropping frame, and rotating the result as necessary to bring the same back into vertical alignment for further processing in accordance with embodiments of the present disclosure.

Referring now to FIG. 43, a pictorial reference is shown in item 4302. As shown in items 4304, 4308, 4312, 4316, 4320, and 4324, the pictorial reference may be cropped so as to retain a portion of the pictorial reference for further processing. As shown, a cropping frame may be overlaid on the pictorial reference. The portion of the pictorial reference being retained falls within the cropping frame. The portion or portions of the pictorial reference that fall without the cropping frame may be discarded or deleted. As shown in items 4312, 4316, 4320, and 4324, the cropping frame may be rotated away from a normal vertical orientation during the process such that the portion of the pictorial reference being retained is similarly rotated away from the normal vertical orientation. As shown in items 4320 and 4324, a portion of the cropping frame may extend beyond the perimeter of the pictorial reference. As shown in item 4320, if the pictorial reference was overlaid on a background or desktop that is white in color, has no color, and/or is transparent, this can result in a cropped sample that is partially blank (e.g., is partially colored white, or includes a portion that has no color and/or is transparent). As shown in item 4324, if the pictorial reference was overlaid on a background or desktop that has a non-white color and/or is non-transparent, this can result in a cropped sample that, to some extent at least, bears the color of such non-white, non-transparent background. As shown in items 4306, 4310, 4314, 4318, 4322, and 4326, the cropped sample may be scaled up to increase its size and/or cause the cropped sample to assume a size that is substantially the same as the original pictorial reference from which the cropped sample was obtained. As shown in items 4314, 4318, 4322, and 4326, in the event the cropping frame was rotated away from a normal vertical orientation in order to obtain the cropped sample, such cropped sample can be subjected to an equal and opposite rotation in the opposite direction to cause the cropped sample to re-assume a normal vertical orientation. Any and all of the cropped samples shown in items 4306, 4310, 4314, 4318, 4322, and 4326 may then be utilized as a pictorial reference for further processing, such that in accordance with embodiments of the present disclosure, primary elements and primary sub-elements may be created, formed, derived, etc. directly from the cropped samples shown in items 4306, 4310, 4314, 4318, 4322, and 4326.

Example

Figure 44:
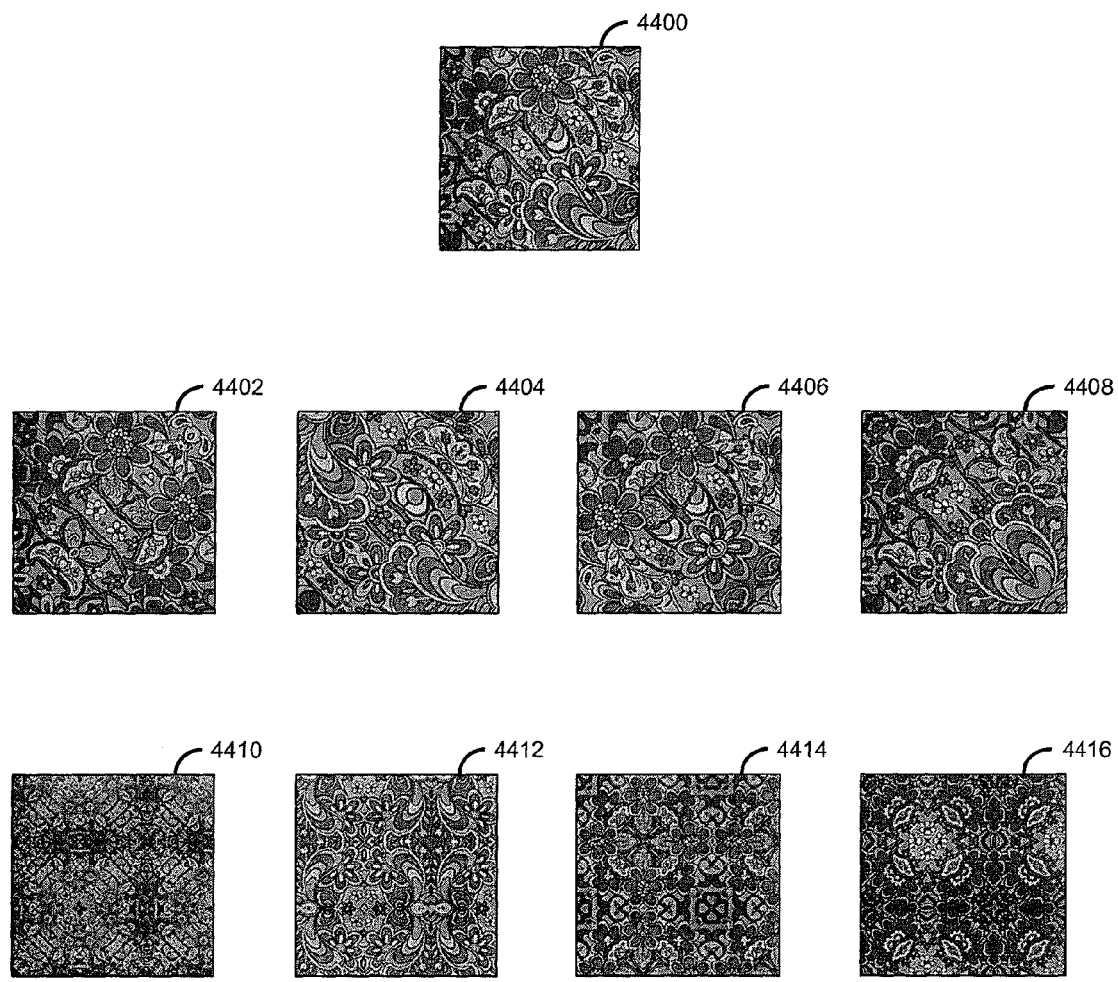
FIG. 44 is a diagram depicting a pictorial reference, four primary squares based on the pictorial reference, and four bi-quadrant images based on the respective primary squares in accordance with embodiments of the present disclosure.
Figure 45:
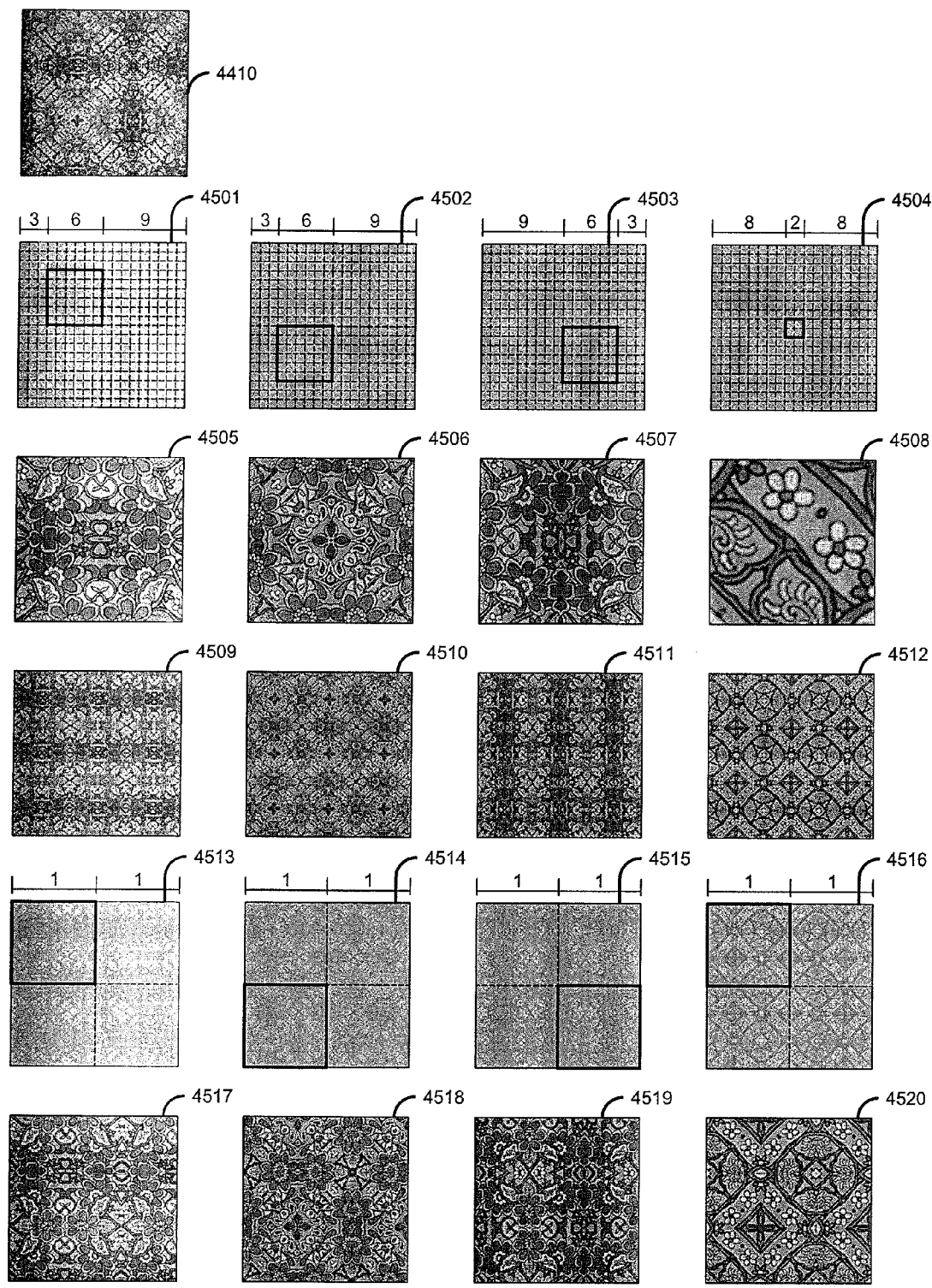
FIGS. 45, 46, 47, and 48 depict methods by which centered or offset pattern squares may be created or generated based on existing bi-quadrant images, and by which new bi-quadrant images may be created or generated based on such centered or offset pattern squares in accordance with embodiments of the present disclosure.
Figure 46:
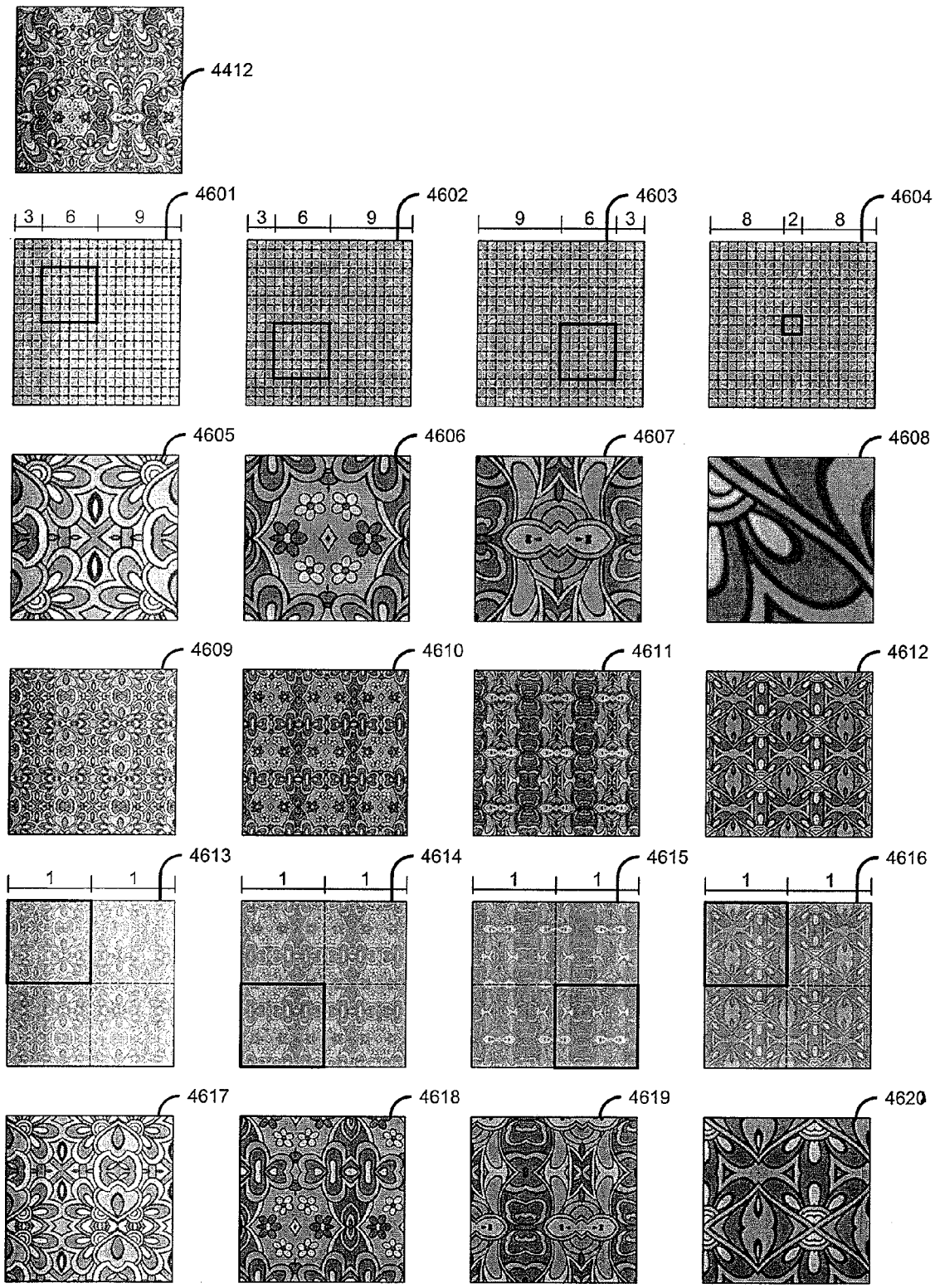
Figure 47:
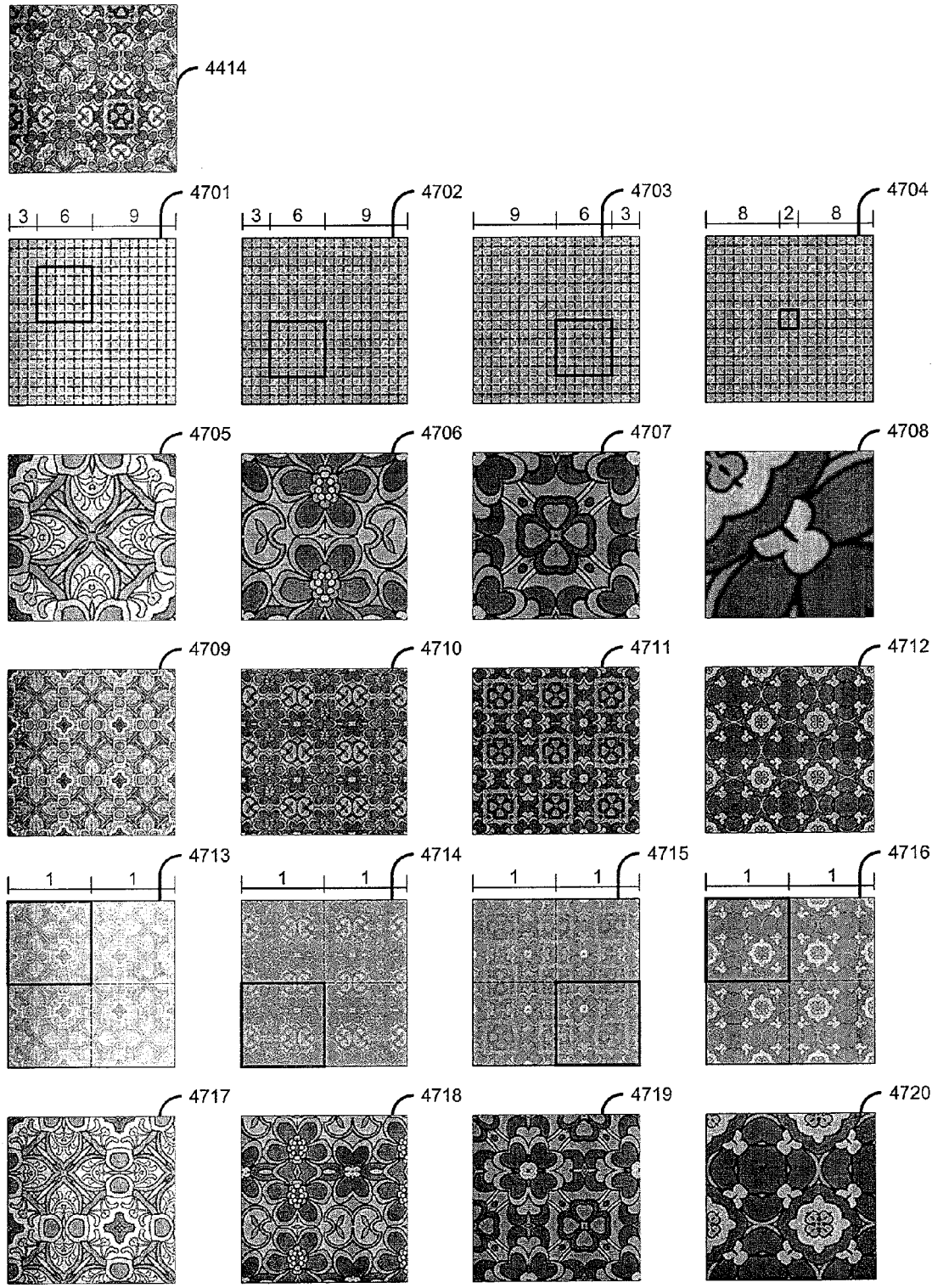
Figure 48:
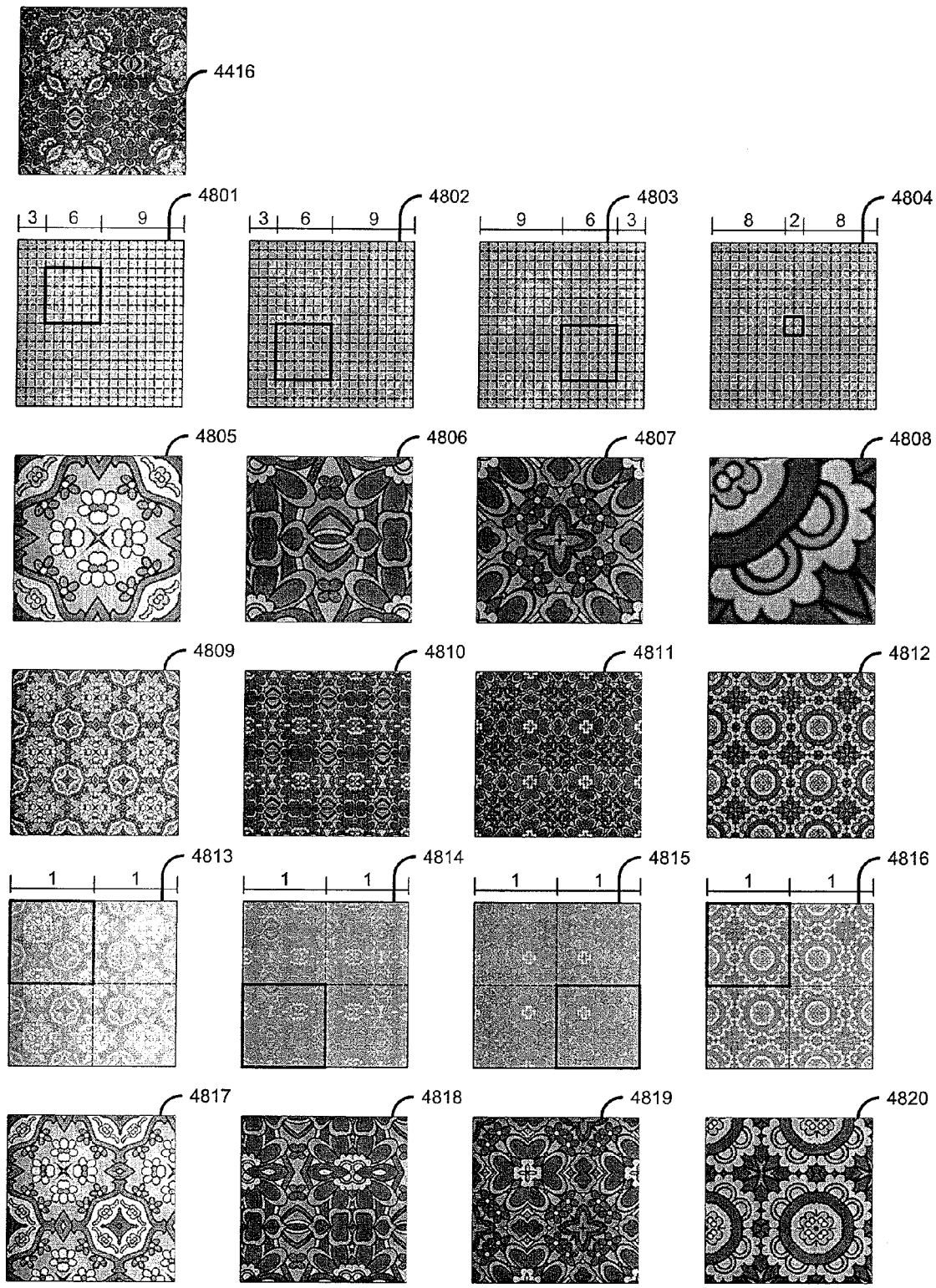

A Pictorial Reference Exhibiting a Floral Pattern, and Primary Squares and Bi-Quadrants Created Therefrom In accordance with embodiments of the present disclosure, essentially any reference image can yield a pictorial reference for further processing to create, for example, primary elements, primary squares based on such primary elements, and bi-quadrants based on such primary squares. The pictorial reference 4400, the primary squares 4402, 4404, 4406, and 4408, and the bi-quadrants 4410, 4412, 4414, and 4416 shown in FIG. 44 conveniently illustrate this fact. The pictorial reference 4400 exhibits a pleasing floral pattern. The primary squares 4402, 4404, 4406, and 4408 represent respective A/a, b/B, c\C, and D\d primary squares which may be formed or created from the pictorial reference 4400 in accordance with embodiments of the present disclosure (see, e.g., as shown and described herein with respect to FIGS. 7-8). The bi-quadrants 4410, 4412, 4414, and 4416 represent respective bi-quadrants which may be formed or created from the respective primary squares 4402, 4404, 4406, and 4408 in accordance with embodiments of the present disclosure (see, e.g., as shown and described herein with respect to FIGS. 9-18 and 28).

Centered and Offset Pattern Squares, Matrices, and Bi-Quadrants

Bi-quadrants created from primary elements or primary sub-elements through the use of methods and systems in accordance with the present disclosure (see, e.g., as shown and described herein with respect to FIGS. 7-18, 28, 29 and 37-41) may form the basis of additional images, some of which will now be discussed. As shown in FIGS. 45-48, and particularly in the items 4501-4520, 4601-4620, 4701-4720, and 4801-4820, graphic information may be extracted from within a given bi-quadrant to form or create one or more pattern squares. Pattern squares resulting from this process of proportional extraction or cropping may be considered to relate back to the original primary elements and/or sub-elements from which the reference bi-quadrant was created. In accordance with pattern square embodiments associated with the present disclosure, there is no limitation to the scale/size of the self-similar symmetrical image and/or asymmetrical images that can be created based on a given bi-quadrant image. Based on the nature of the portion or area of the given bi-quadrant from which the graphic information was extracted, the pattern square will be one of at least two different types of pattern squares.

One type of pattern square in accordance with the present disclosure is a 'centered' pattern square. Centered pattern squares are derived from a portion of a given bi-quadrant associated with the center of one of the four quadrant images from which the given bi-quadrant may be considered to have been created. For example, and as shown and discussed above with reference to FIG. 28, the bi-quadrant image 1801 may be considered to have been created from the four quadrant images 1601, 1602, 1603, and 1604. Each of the four quadrant images 1601, 1602, 1603, and 1604 includes four primary squares (not separately indicated) sharing a common corner in the center of the given quadrant image. In accordance with the present embodiment, respective squares 4821, 4822, 4833, and 4844 may be formed or positioned on the quadrant images 1601, 1602, 1603, and 1604, the perimeter of which may be smaller than the perimeter of the respective quadrant image. The squares 4821, 4822, 4823, 4824 may be positioned in such a way as to be centered on the common corner (indicated in FIG. 28 via reference numerals 4825, 4826, 4827, 4828) of the four primary squares (not separately indicated) from which the respective quadrant images 1601, 1602, 1603, and 1604 are created. The points 4825, 4826, 4827, and 4828 fall at the center of their respective quadrant images, and as such may be referred to as the 'focal points' or the 'center points' of the respective quadrant images. Because the squares 4821, 4822, 4823, and 4824 are aligned with the focal points or center points of their corresponding quadrant images, each such square may be referred to as a centered pattern square in accordance with the present embodiment.

Another type of pattern square in accordance with the present disclosure is an 'offset' pattern square. Offset pattern squares are derived from a portion of a given bi-quadrant that is not associated with the center of one of the four quadrant images from which the given bi-quadrant may be considered to have been created. Still referring to FIG. 28, and for example, a square 4829 may be formed or positioned on the bi-quadrant image 1801, the perimeter of which may be smaller than the perimeter of the bi-quadrant image 1801. The square 4829 may be positioned in such a way as to be centered on a point 4830 that falls at the center of the bi-quadrant image 1801 on a diagonal line that is associated with an aligned set of primary element hypotenuses and that extends from the lower left corner of the bi-quadrant image 1801 to the upper right corner thereof. Because the square 4829 is aligned with a point on a line that is associated with an aligned set of primary element hypotenuses or legs, and does not fall at the center of any of the constituent quadrant images, the square 4829 may be referred to as an offset pattern square in accordance with the present embodiment.

Referring once more to FIG. 44, the original image (see the pictorial reference 4400) is shown with all subsequent primary squares (see the primary squares 4402, 4404, 4406, and 4408), and all subsequent bi-quadrants (see the bi-quadrants

4410, 4412, 4414, and 4416). Referring once again to FIGS. 45-48, the bi-quadrants 4410, 4412, 4414, and 4416 are shown at the top of each figure, respectively.

As shown in items 4501-4504, 4601-4604, 4701-4704, and 4801-4804, a graduated graph in 18ths may be overlaid onto the bi-quadrants 4410, 4412, 4414, and 4416 in order to determine and establish a divisible and graduated method and ability to create proportional extractions from within each bi-quadrant. Using the graduated graph in 18ths as a guide, the bi-quadrants 4410, 4412, 4414, and 4416 are eighteen by eighteen units square (18×18) in size, the quadrant images (not separately shown) from which the bi-quadrants 4410, 4412, 4414, and 4416 may be formed are twelve units by twelve units square (12×12) in size, and the primary square images (not separately shown) from which the quadrant images may be formed are six units by six units square (6×6) in size.

As shown in items 4501-4503, 4601-4603, 4701-4703, and 4801-4803, a (primary square-sized) 6×6 extraction grid may be positioned on or in the bi-quadrant image directly over the center points of one or more, or all, of the upper left, lower left, upper right, and lower right quadrant components associated with the given bi-quadrant 4410, 4412, 4414, and 4416 as part of a process leading to the creation of a centered pattern square. As the 6×6 extraction grid associated with items 4501-4503, 4601-4603, 4701-4703, and 4801-4803 is one half (½) the twelve-unit height and one half (½) the twelve-unit width of the constituent quadrant images of the given bi-quadrant 4410, 4412, 4414, and 4416, the 6×6 extraction grid may be described herein as being a 'one half size' extraction grid.

As shown in items 4504, 4604, 4704, and 4804, a 2×2 extraction grid may be positioned elsewhere on or in the bi-quadrant image (e.g., at the center point of a given primary square, as exemplified by the extraction grid 4829 which, as shown in FIG. 28, is aligned with the primary square center point 4830 appearing within the bi-quadrant image 1801). As the 2×2 extraction grid associated with items 4504, 4604, 4704, and 4804 is one sixth (⅙) the twelve-unit height and one sixth (⅙) the twelve-unit width of the constituent quadrant images of the given bi-quadrant 4410, 4412, 4414, and 4416, the 2×2 extraction grid may be described herein as being a 'one sixth size' extraction grid.

As shown in items 4505-4508, 4605-4608, 4705-4708, and 4805-4808, the 6×6 and 2×2 extraction grids may be used to select a portion of the given bi-quadrant image 4410, 4412, 4414, and 4416 for further processing in accordance with the present embodiment, and to discard or eliminate the (non-selected) remainder of the bi-quadrant image. The selected portions, each of which may referred to either as a centered pattern square or an offset pattern square, may be kept the same size in advance of further processing, or increased or decreased in size as necessary and/or as desired. As discussed above, the result of such cropping and/or resizing is a centered pattern square in each of items 4505-4507, 4605-4607, 4705-4707, and 4805-4807. In each of items 4508, 4608, 4708, and 4808, the result is an offset pattern square.

Each of the centered and offset pattern squares may be replicated and/or mirrored as necessary and/or as desired about their horizontally- and vertically-oriented sides to form respective centered or offset matrices based on such pattern squares. As shown in items 4509-4511, 4609-4611, 4709-4711, and 4809-4811, the result of such replication and mirroring of the pattern squares 4505-4507, 4605-4607, 4705-4707, and 4805-480 may be a further image including nine original or mirrored instances of the respective pattern square assembled together in a square 3×3 centered or offset matrix.

As shown in items 4512, 4612, 4712, and 4812, the result of such replication and mirroring of the pattern squares 4508, 4608, 4708, and 4808 may be a further image including nine original or mirrored instances of the respective pattern square assembled together in a square 6×6 centered or offset matrix.

Each of the square 3×3 centered or offset matrices 4509-4511, 4609-4611, 4709-4711, and 4809-4811, and each of the square 6×6 offset matrices and 4512, 4612, 4712, and 4812 may be divided to form further derivative images. For example, and as shown in items 4513-4516, 4613-4616, 4713-4716, and 4813-4816, each of the centered or offset matrices 4509-4512, 4609-4612, 4709-4712, and 4809-4812 may be divided into four quarters. As shown in items 4517-4520, 4617-4620, 4717-4720, and 4817-4820, the result of such division may be a centered or offset bi-quadrant image which may be used for further processing, replication, or mirroring as necessary and/or as desired to create further images in accordance with embodiments of the present disclosure.

The sizes selected above to establish the above-described centered or offset images have been selected based upon the proportional relationships of the size and scale of the quadrants associated with the primary elements A, B, C, and D. The Applicant has determined that such size and scale creates widely varying new self-similar figurative images. The process as described above may begin based upon equal divisions of the beginning bi-quadrant reference. Depending on the symmetry or asymmetry of the beginning bi-quadrant chosen, any area within beginning bi-quadrant or the entire beginning bi-quadrant can be considered a new pattern square and have the above process applied to generate new derivative centered or offset matrices and new derivative centered or offset bi-quadrants. The extraction can also breach the image, taking into consideration empty space along the initial bi-quadrant's perimeter as an applicable design element for the images being created, thereby introducing empty space into the repeat. The limit of extractions available within this process approaches the infinite. It is only limited relative to the user's discretion.

Sets of Pattern Stripes

Bi-quadrants created from primary elements or primary sub-elements through the use of methods and systems in accordance with the present disclosure (see, e.g., as shown and described herein with respect to FIGS. 7-18, 28, 29 and 37-41) may form the basis of still further images, some of which will now be discussed.

Figure 49:
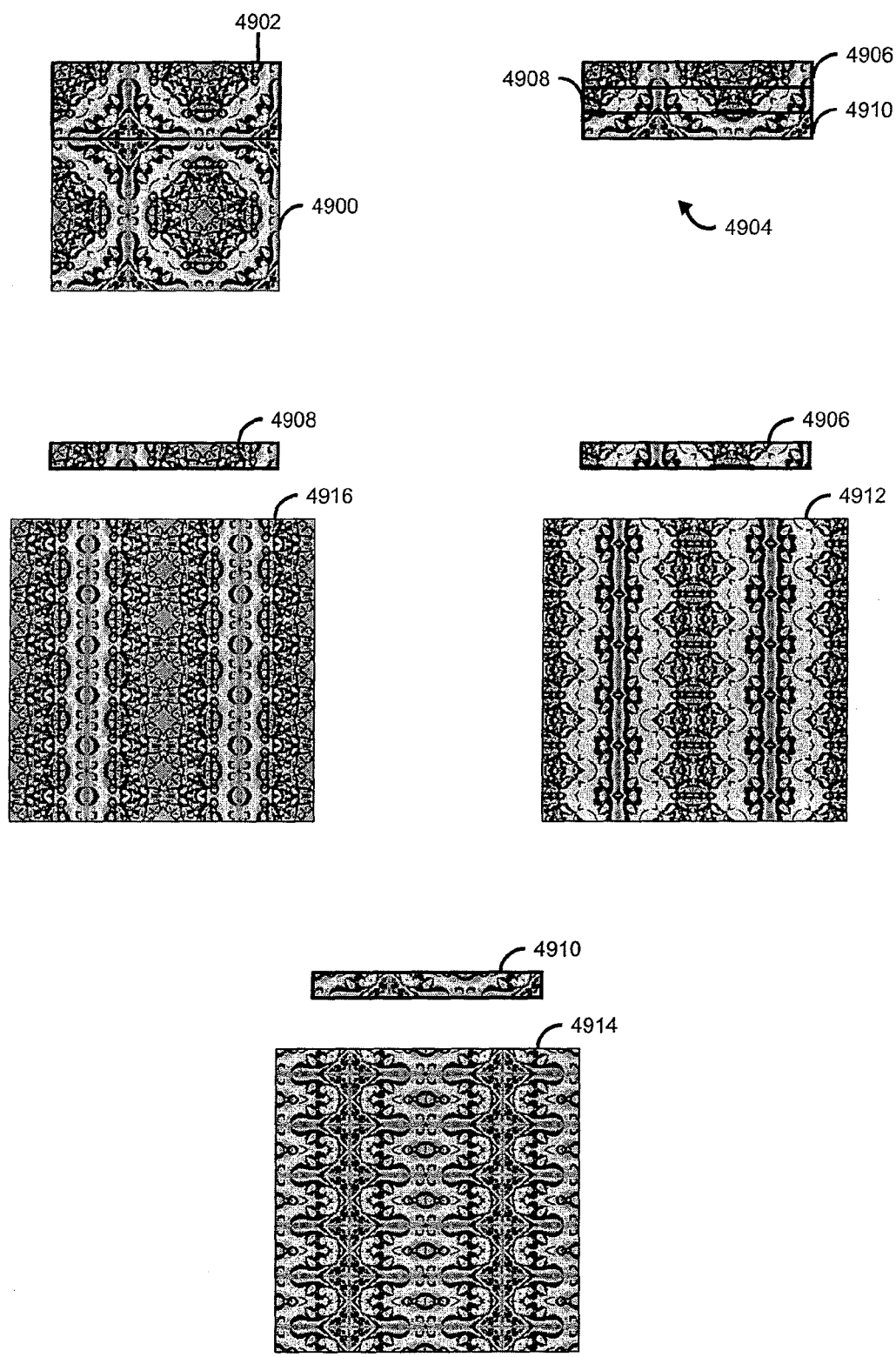
FIGS. 49 and 50 depict methods by which sets of parallel pattern stripes may be derived based on a process of selecting respective linear portions of a bi-quadrant image and replicating or mirroring the same in a perpendicular direction to form respective sets of pattern stripes in accordance with embodiments of the present disclosure.
Figure 50:
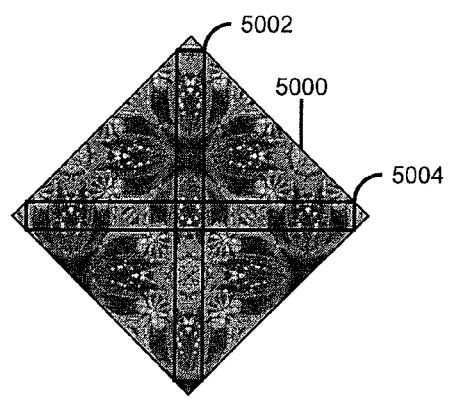
Figure 50:
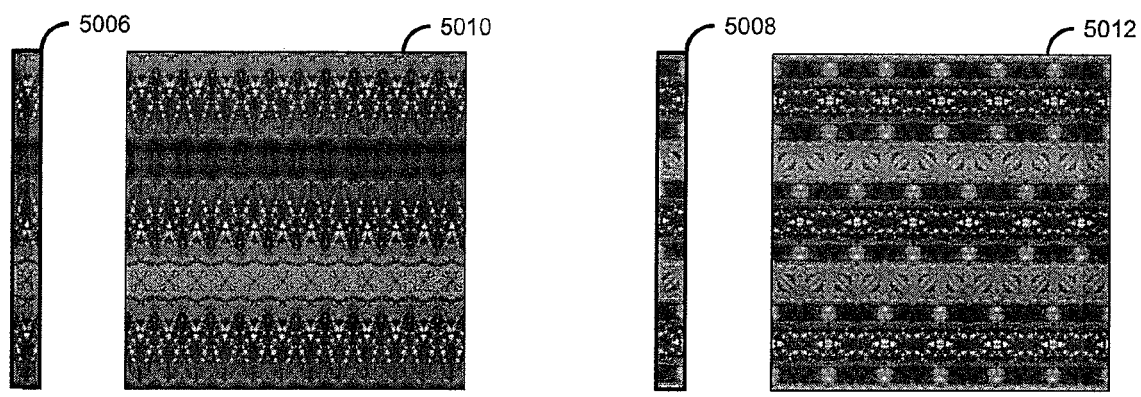

As shown in FIGS. 49-50, graphic information may be extracted from within a given bi-quadrant to form or create one or more sets of pattern stripes. Sets of pattern stripes resulting from this process of proportional extraction or cropping may be considered to relate back to the original primary elements and/or sub-elements from which the reference bi-quadrant was created. In accordance with pattern stripe embodiments associated with the present disclosure, there is no limitation to the scale/size of the self-similar symmetrical image and/or asymmetrical images that can be created based on a given bi-quadrant image. Based on the nature of the portion or area of the given bi-quadrant from which the graphic information was extracted, the portion of the bi-quadrant with which such graphic information is associated will be symmetric/self-similar across its longitudinal axis, or will be asymmetric across its longitudinal axis.

Referring now to FIG. 49, a bi-quadrant image 4900 is shown. A one third portion 4902 of the bi-quadrant image 4900 is indicated. The one third portion 4902 is equivalent in height to the initial primary square or squares (not separately shown) from which the biquadrant image 4900 may have been created, and is equivalent in width to three such primary squares. As such, the one third portion 4902 comprehends, in original or mirrored form, the full measure or quantity of graphical information contained in the full bi-quadrant image 4900. As shown in FIG. 49 at reference numeral 4904, the one third portion 4902 of the bi-quadrant image 4900 may be divided into a first linear portion 4906, a second linear portion 4908, and a third linear portion 4910, each of which may be one third as high as the one third portion 4902 so as to contain a relatively thin graphic pattern representation within a linear area, but may be equivalent to the one-third portion 4902 in width. In accordance with embodiments of the present disclosure, there is no specific limit to the size of the extraction height, however the applicant observes that a relatively small size limitation such as from one fourth (¼) to one half (½) the height of the constituent primary squares yields good results. This extraction (e.g., one or another of the first, second, or third linear portions 4906, 4908, 4910) may be mirrored, potentially continuously, on one or both of the elongated (or primary) sides of the initial extraction until the desired overall height or length of a set of pattern stripes (e.g., as shown in FIG. 49, respectively, at reference numerals 4912, 4914, 4916) has been achieved. This extraction may also be mirrored, potentially continuously, on one or both of the shorter (or secondary) sides of the initial extraction until the desired overall width of the set of pattern stripes has been achieved.

Referring now to FIG. 50, a bi-quadrant image 5000 is shown, rotated with respect to the vertical to an extent of 45 degrees. Respective first and second diagonal portions 5002, 5004 of the bi-quadrant image 5000 are indicated. Each of the first and second diagonal portions may be extracted from the bi-quadrant image to form respective first and second diagonal linear portions 5006, 5008. The first linear portion 5006 is symmetrical/self-similar across its longitudinal axis such that this extraction may be replicated without mirroring potentially continuously on one or both its elongated (or primary) sides to achieve the desired set of pattern stripes (e.g., to create the set of pattern stripes shown at 5010). The second linear portion 5008 is asymmetrical across its longitudinal axis such that this extraction may be replicated and/or mirrored potentially continuously on one or both of its elongated (or primary) sides to achieve the desired set of pattern stripes (e.g., to create the set of pattern stripes shown at 5012).

Sets of Stripes, Plaids Based Thereon

Bi-quadrants created from primary elements or primary sub-elements through the use of methods and systems in accordance with the present disclosure (see, e.g., as shown and described herein with respect to FIGS. 7-18, 28, 29 and 37-41) may form the basis of yet further images, some of which will now be discussed.

Figure 51:
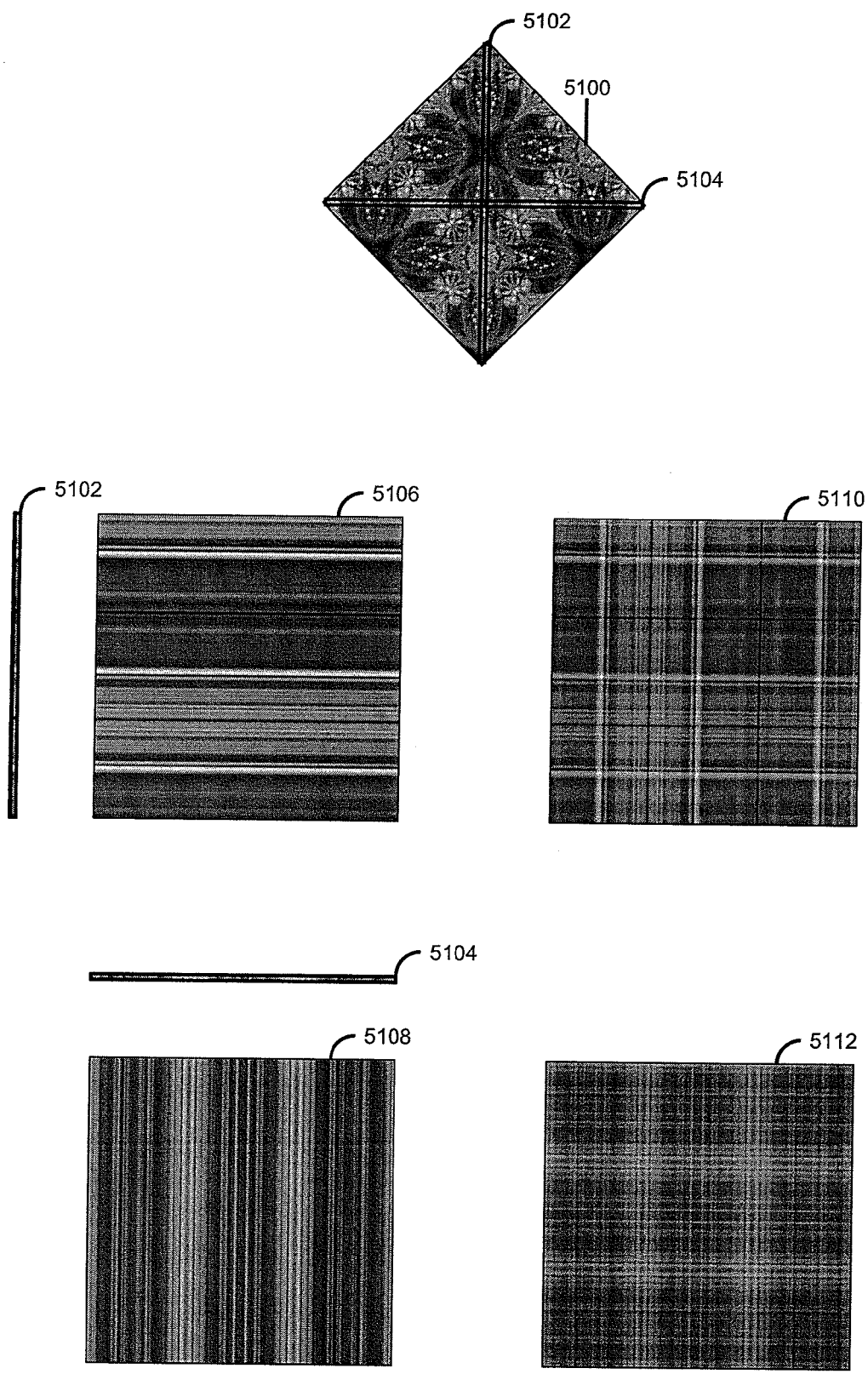
FIGS. 51 and 52 depict methods by which sets of parallel stripes may be derived based on a process of selecting respective pixel lines of a bi-quadrant image and extending the same in a perpendicular direction to form respective sets of stripes in accordance with embodiments of the present disclosure, as well as an additional method by which separate respective instances of a given set of pattern stripes may be combined to form plaid images in accordance with embodiments of the present disclosure.
Figure 52:
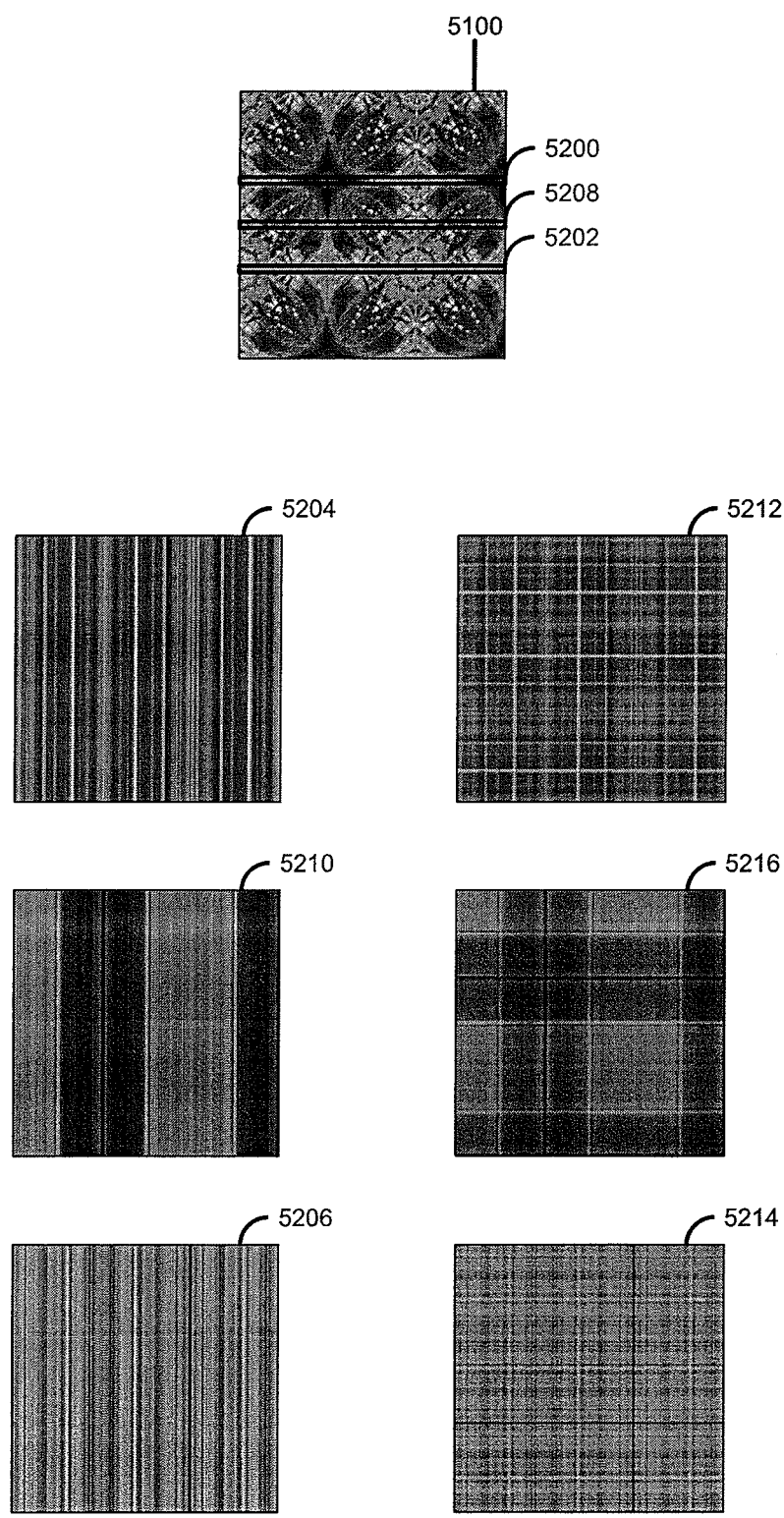

As shown in FIGS. 51-52, graphic information may be extracted from within a given bi-quadrant to form or create sets of normal stripes. In accordance with embodiments of the present disclosure, stripes may be created by selecting a one (1) pixel height row (line) either horizontally, vertically, or at any degree of angle through and/or within the above-discussed images and patterns, including but not limited to bi-quadrant images, and then subsequently dragging all of the pixels along that line equally and at a right angle in either or both directions of the extracted reference row or line. This creates a linear 'stretch' effect of parallel colored lines (stripes) of varying widths relative to the dispersion, number, and variation of colored pixels along the original extracted reference row (line). Within any graphic or pictorial reference created in accordance with the present disclosure, there are a multiplicity of pixel lines that can be determined and then extracted based upon the size, scale, and resolution of the reference image. However, the Applicant has determined five (5) specific areas at which pixel lines may be extracted from presently disclosed bi-quadrant images in order to extract potentially the maximum graphic pixel information. As shown in FIG. 51, in which another bi-quadrant image 5100 is shown, rotated with respect to the vertical to an extent of 45 degrees, the first and second line extractions 5102, 5104 rest on the major diagonals of associated with any given bi-quadrant image, and serve to provide respective first and second sets of stripes 5106, 5108. As shown in FIG. 52, in which the bi-quadrant image 5100 is again shown, this time in a non-rotated orientation, the third and fourth line extractions 5200, 5202 are either vertical or horizontal parallel pixel line extractions passing through the rotating centers of each of any two of the constituent quadrant images associated with any given bi-quadrant image, and serve to provide respective third and fourth sets of stripes 5204, 5206. As also shown in FIG. 52, the fifth line extraction 5208 is a pixel line that rests on either the horizontal (x) or vertical (y) axis associated with any given bi-quadrant image, and serves to provide a fifth set of stripes 5210. Accordingly, a selection of five stripes can be created from one bi-quadrant image which in most cases will reveal most or all of the variety of graphic information available without excessive stripe repeating. However, the pixel line extractions are not limited to only these areas. Any other arbitrary area may also and/or alternatively be selected.

As also shown in FIGS. 51-52, plaids may be created (e.g., as shown at reference numerals 5110, 5112, 5212, 5214, 5216) in accordance with embodiments of the present disclosure by selecting and duplicating any given one of the above-discussed sets of stripes 5106, 5108, 5204, 5206, and 5210 to create a second instance thereof, rotating one or the other of the original and the duplicate copy of the selected set of stripes (e.g., to an extent of ninety (90) degrees) with respect to the other thereof, and overlaying one of the two sets of stripes atop the other of the two. In accordance with at least some embodiments of the present disclosure, one of the two sets of stripes (e.g., the overlaying set of stripes) may be set to fifty (50) percent transparency.

Geometrics Based on Stripes, Plaids, and Pattern Stripes

Additional images may be created indirectly from the pixel lines and/or linear or lattice-like patterns that constitute the construction of the above-described stripes, plaids, and pattern stripes. Any of these patterns, once created in accordance with embodiments of the present disclosure, may be reintroduced into the image generation process shown and described above with respect to FIGS. 7-42 to create various scaled 'geometric' patterns consisting, for example, of squares, diamonds, and other more complex patterns such as stellations and octagonal shapes, etc. Each extraction selected from any of the stripes, plaids, and/or pattern stripes may generate, for example, from 32 to 160 new geometric patterns. FIGS. 53, 54, 55, and 56 illustrate four separate types of axial extractions for a given reference image. For the purpose of illustrating this function, one set of stripes is used as an initial reference image from which respective pictorial references 5300, 5400, 5500, and 5600 are generated.

Figure 53:
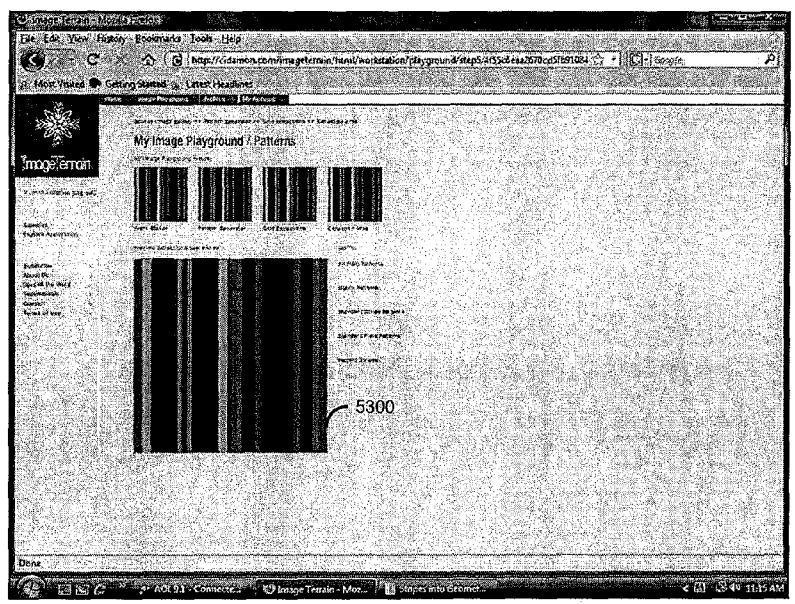
FIGS. 53, 54, 55, and 57 depict methods by which a large variety of primary squares, quadrants, bi-quadrants, and other matrix-type images may be created or generated by processing the image associated with a pictorial reference in accordance with embodiments of the present disclosure, such pictorial reference including an image of a set of stripes oriented at an angle to one, or another, or both of the vertical and the horizontal.
Figure 53:
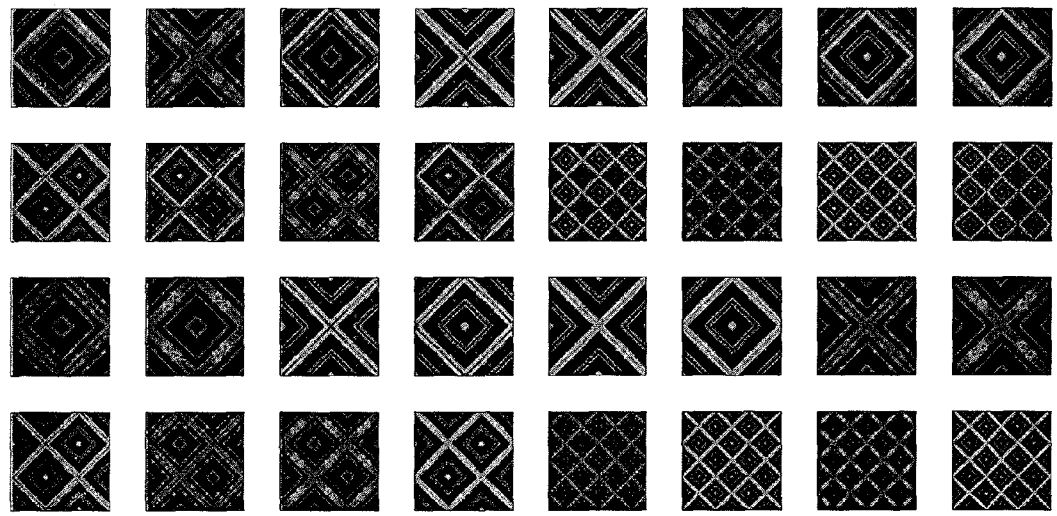
Figure 54:
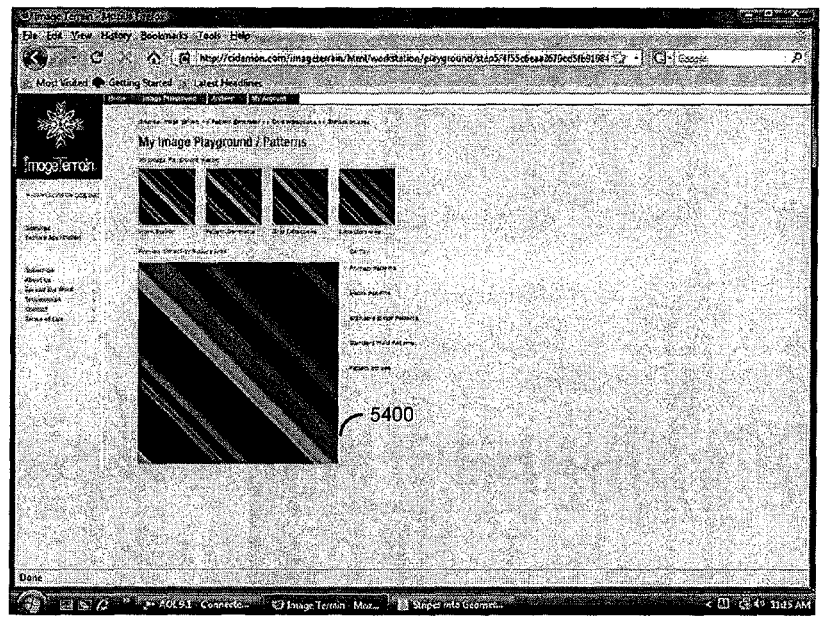
Figure 54:
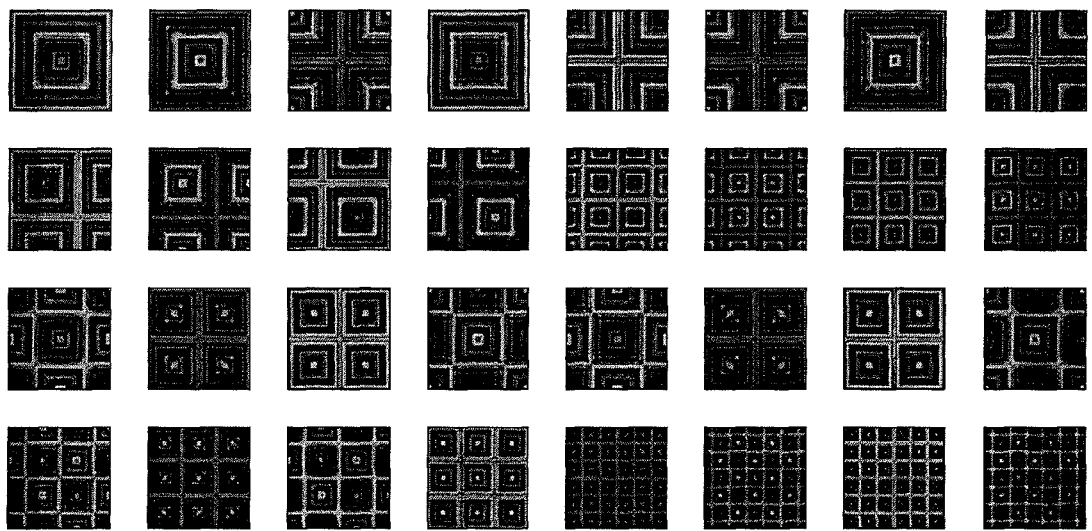
Figure 55:
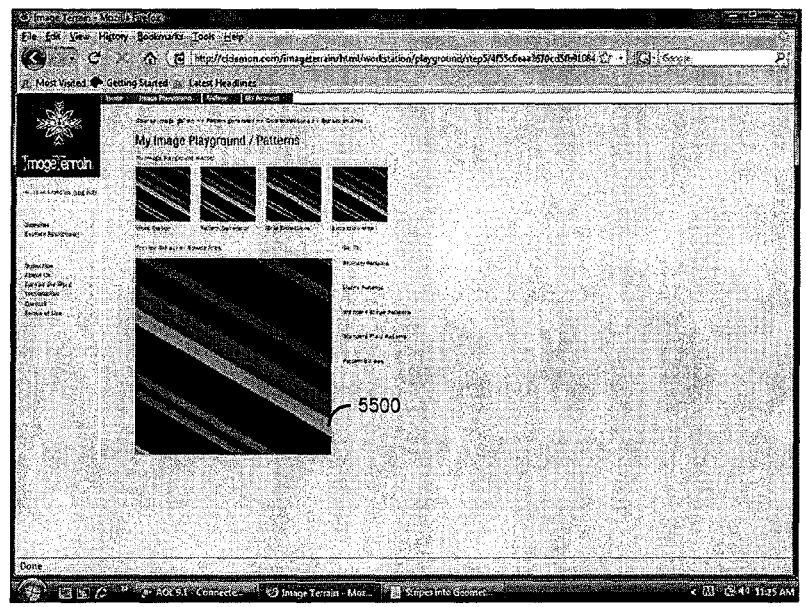
Figure 55:
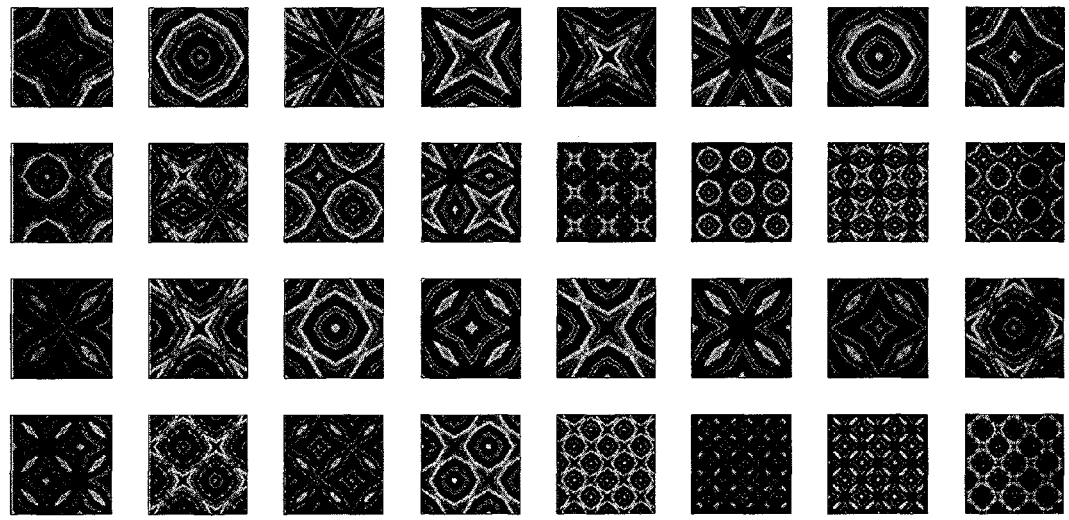
Figure 56:
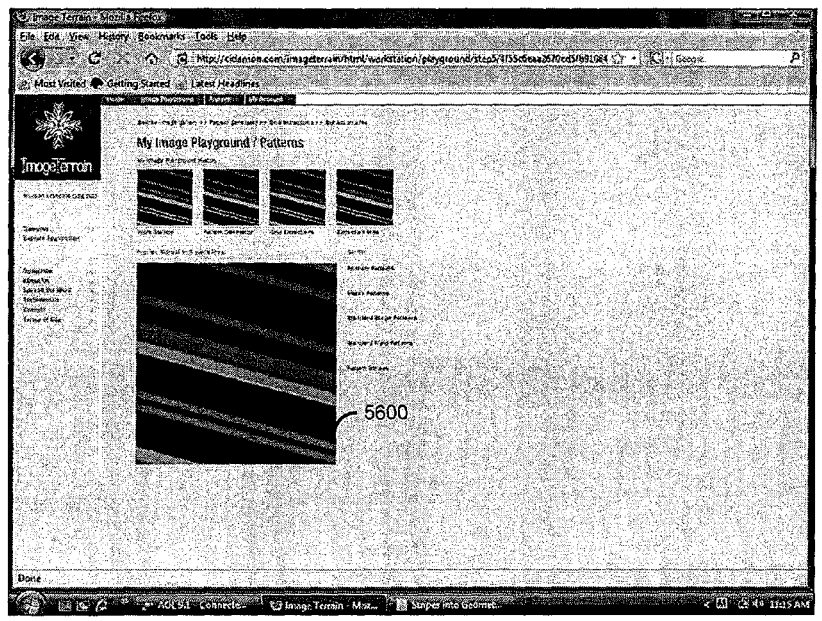
Figure 56:
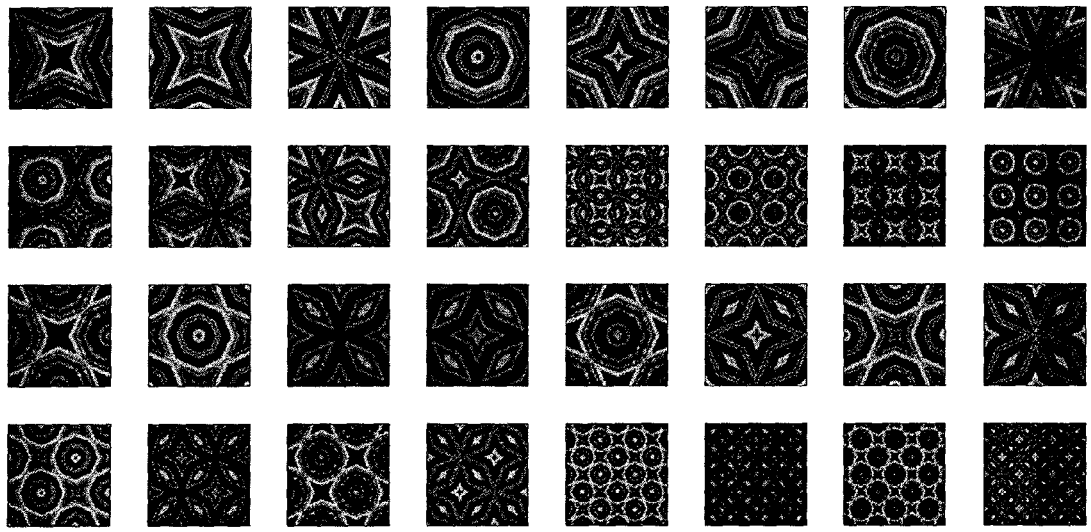

In FIG. 53, the pictorial reference 5300 maintains the vertical and horizontal axes of the reference images parallel and perpendicular to the frame of reference of the process as it is put through the extraction process. This will typically generate diamonds and X-shaped patterns. In FIG. 54, the pictorial reference 5400 places the vertical and horizontal axes of the reference images at respective forty-five (45) degree angles to the frame of reference of the process as it is put through the extraction process. This will typically generate squares and right angle grid patterns. In FIG. 55, the pictorial reference 5500 places the vertical and horizontal axes of the reference images at respective thirty (30) degree angles to the frame of reference of the process as it is put through the extraction process. This will typically generate star patterns, octagonal patters, stellations, and other multi polyhedral shaped patterns, etc. And in FIG. 56, the pictorial reference 5600 places the vertical and horizontal axes of the reference images at respective fifteen (15) degree angles to the frame of reference of the process as it is put through the extraction process. This will also generate star patterns, octagonal patterns, stellations, and other multi polyhedral shaped patterns, etc. Although the extractions utilized above are based upon four specific different axis angle settings or selections, potentially any angle setting or selection for the vertical and horizontal axes of the pictorial reference will work to at least some extent, yielding a vast assortment of geometrically varying patterns that will manifest themselves as images with shape and form that will average geometrically between the types of images shown in FIGS. 53-56 and as discussed above.

Pattern Examples

Quickly-Generated Doodle, Jackson Pollack

Figure 57:
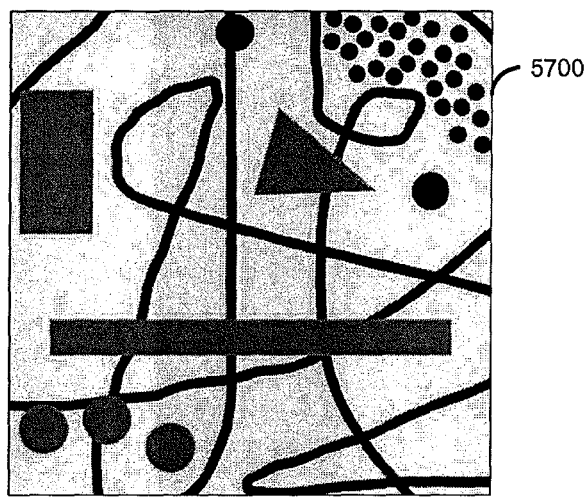
Figure 58:
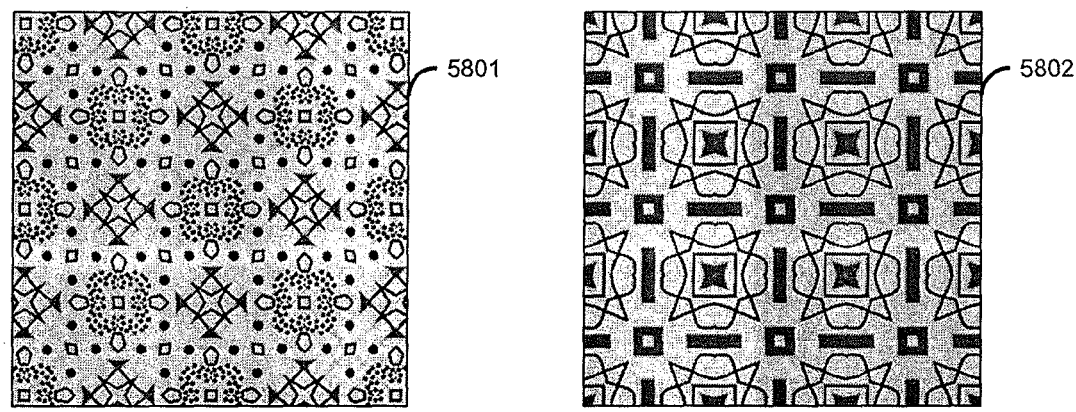
Figure 58:
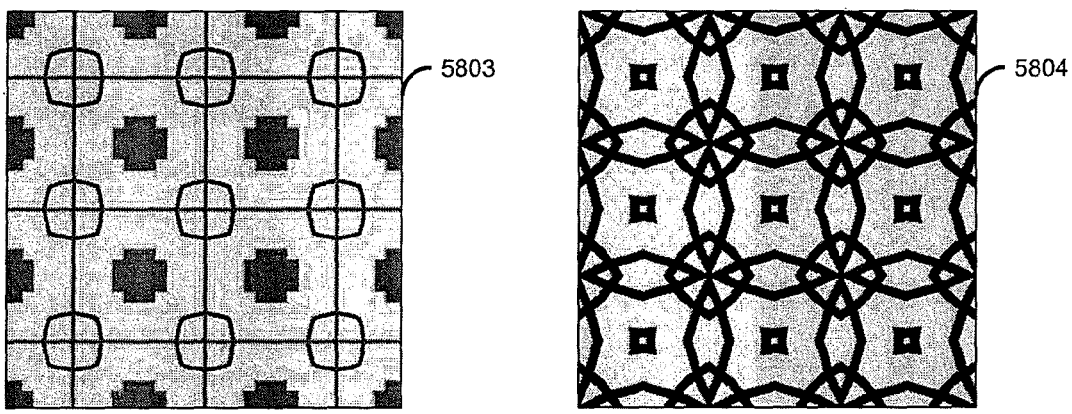
Figure 59:
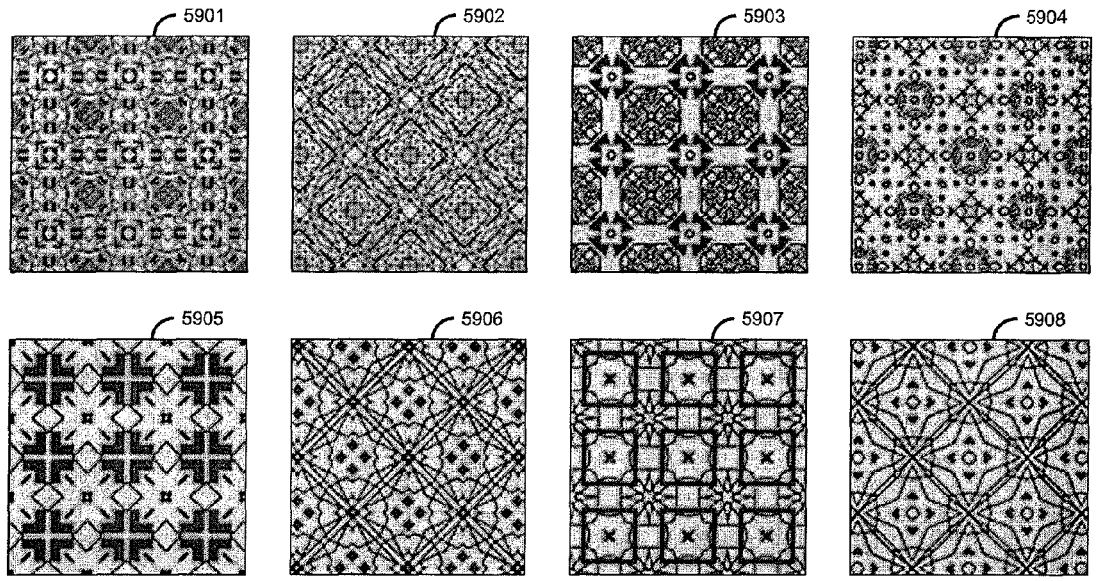

Turning now to FIG. 57, in accordance with embodiments of the present disclosure, a user may quickly generate an electronically-displayable image 5700 in the form of a doodle containing curved and straight strokes and a variety of the user's desired colors. As shown in FIGS. 58 and 59, a portion or portions of the original doodle image 5700 (FIG. 57) may be selected for use in generating a wide variety of images 5801-5804 and 5901-5908 (e.g., using the above-described methods for creating and/or assembling bi-quadrant images, shown and described with reference to FIGS. 7-18, 28, 29 and 37-41).

Figure 60:
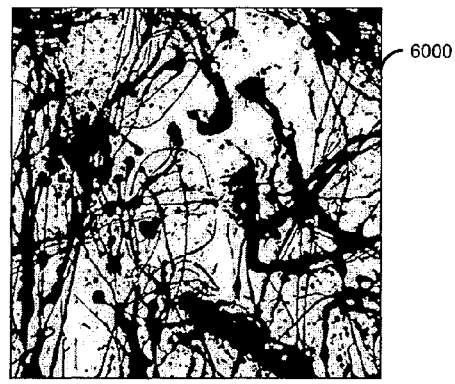
FIGS. 60, 61, 62, and 63 depict methods by which a computer system and related computer software application in accordance with embodiments of the present disclosure may be used, both easily and quickly, to convert a seemingly random image consisting of a portion of a picture painted by the artist Jackson Pollack into a wide variety of ordered patterns for use (for example) in adorning products.
Figure 61:
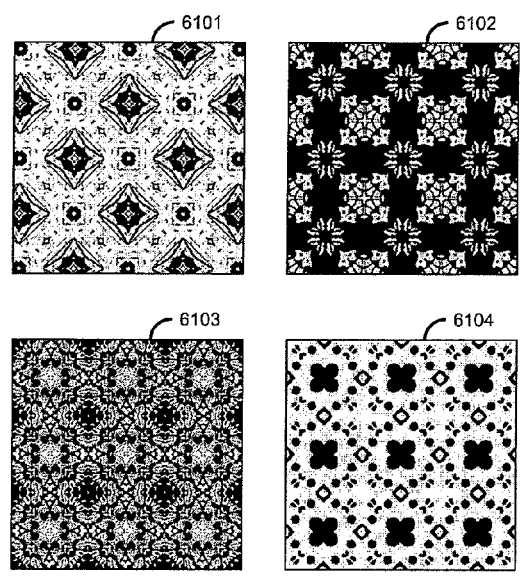
Figure 62:
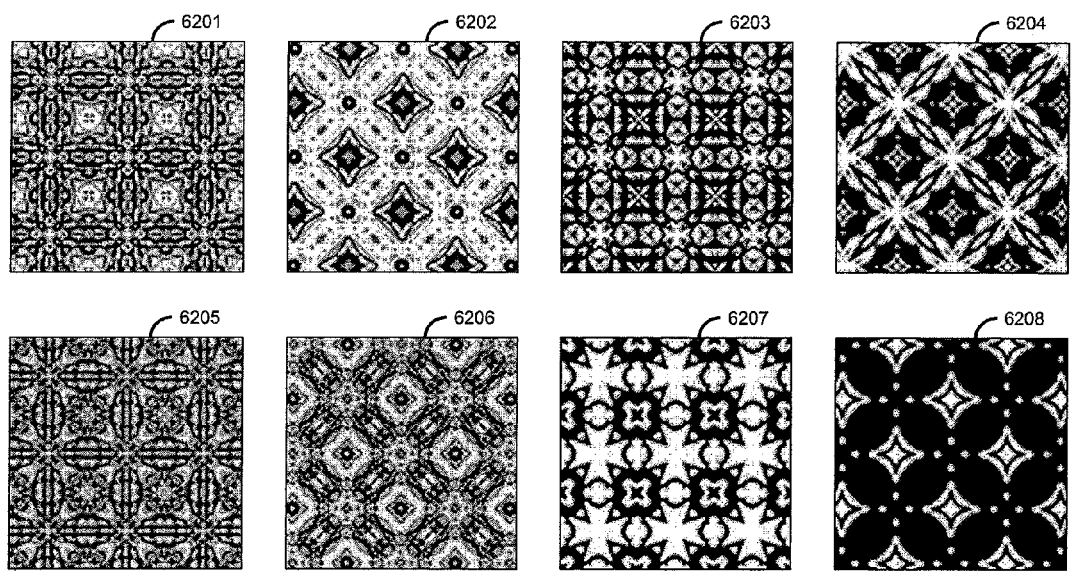
Figure 63:
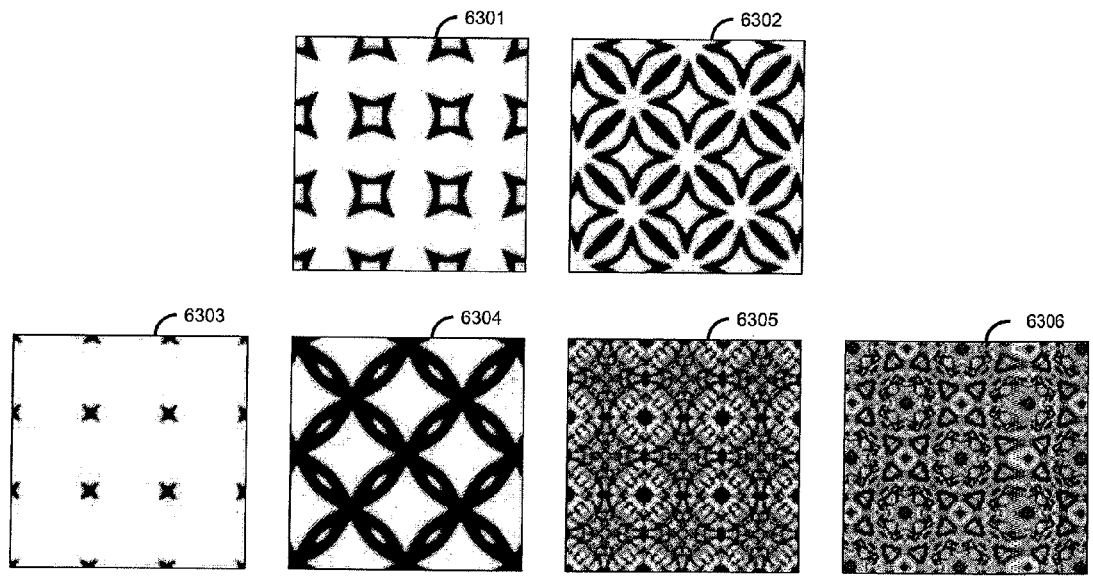
Figure 64:
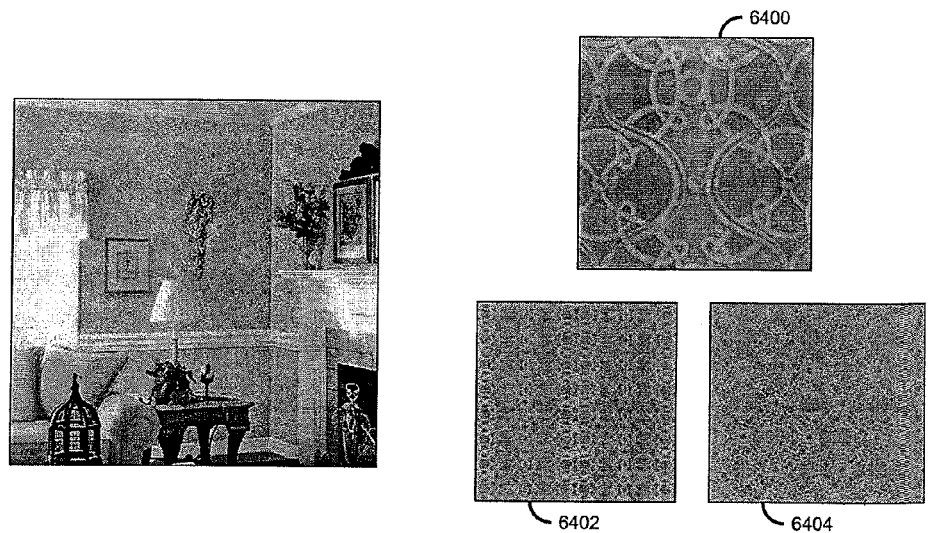
FIGS. 64, 65, 66, 67, 68, 69, 70, 71, 72, 73, 74, 75, and 76 depict various reference images, at least two coordinated designs based each on such reference image and created in accordance with embodiments of the present disclosure, and a variety of products, into the visible surfaces of which have been incorporated one or another of such coordinated designs in accordance with embodiments of the present disclosure.
Figure 65:
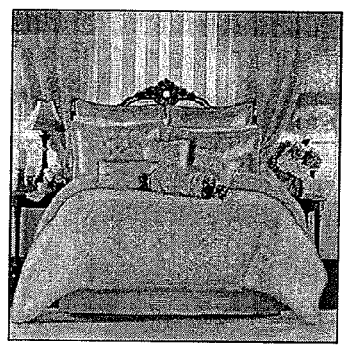
Figure 65:
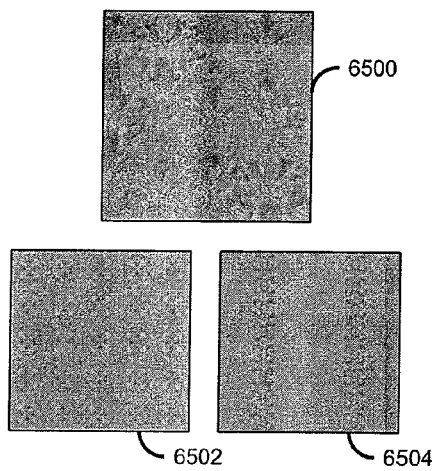
Figure 66:
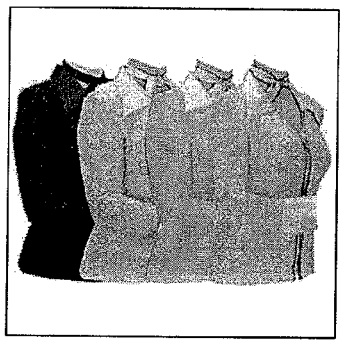
Figure 66:
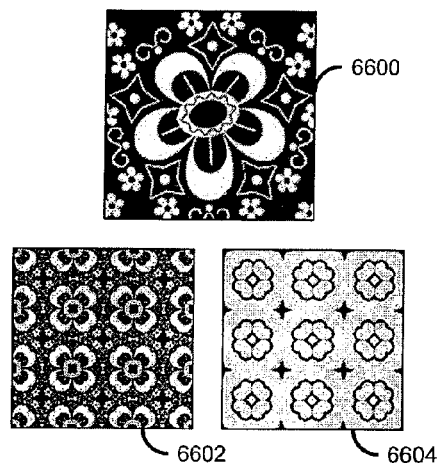
Figure 67:
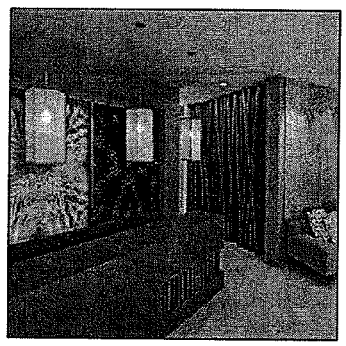
Figure 67:
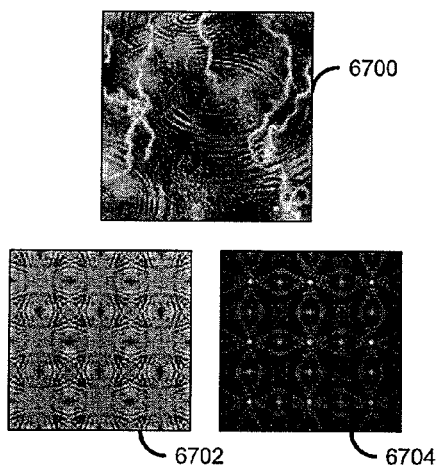
Figure 68:
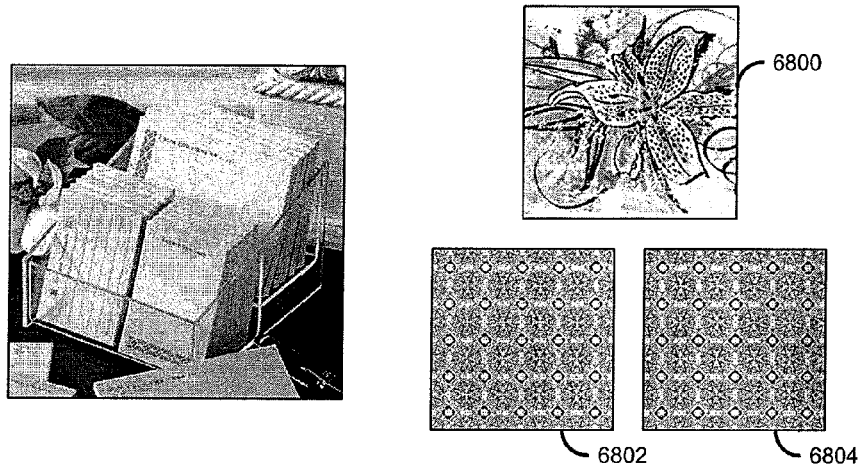
Figure 69:
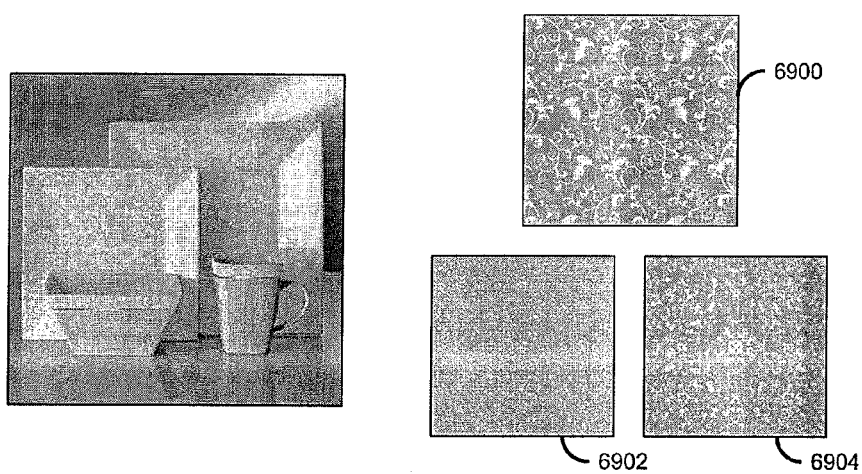
Figure 70:
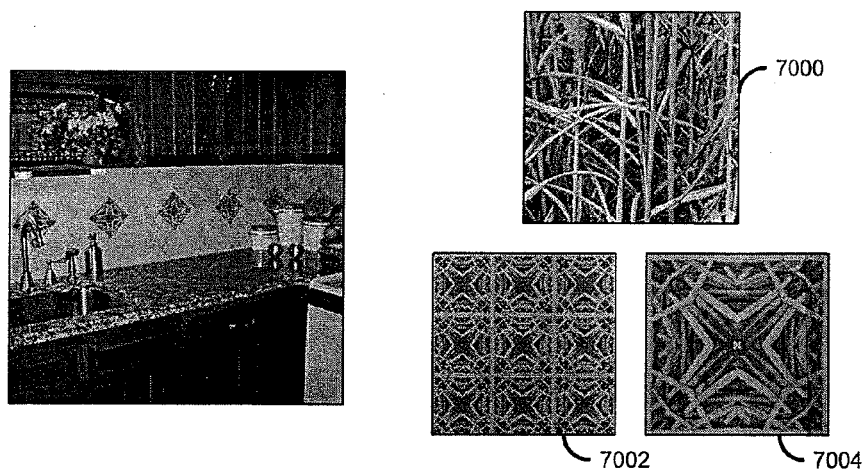
Figure 71:
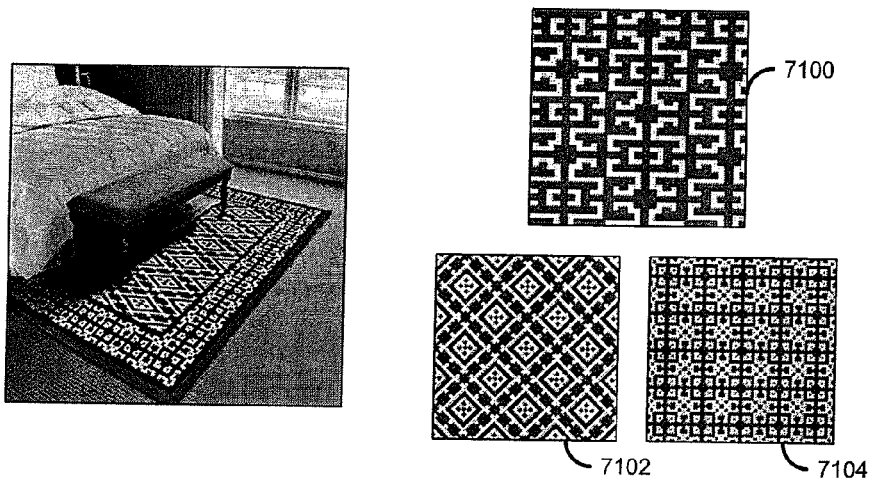
Figure 72:
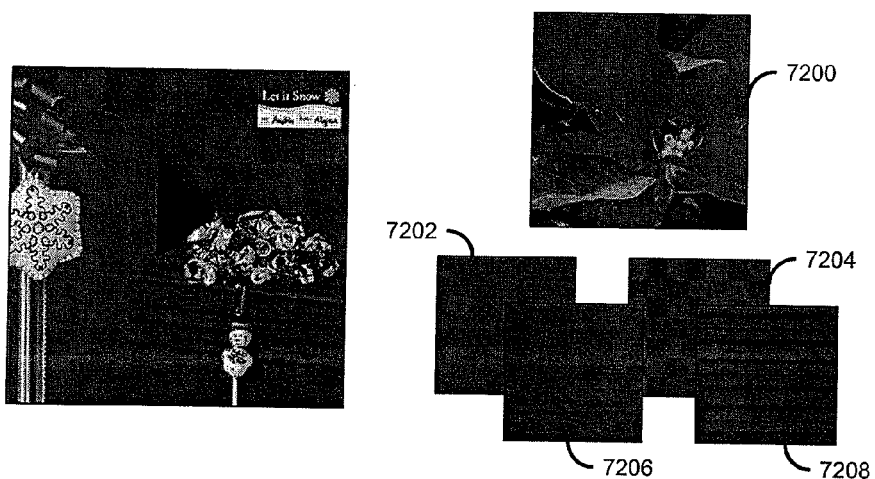
Figure 73:
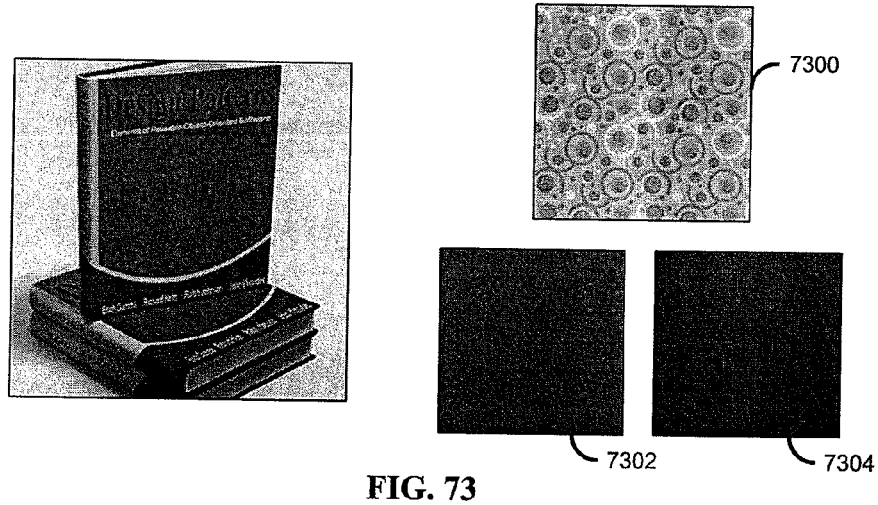
Figure 74:
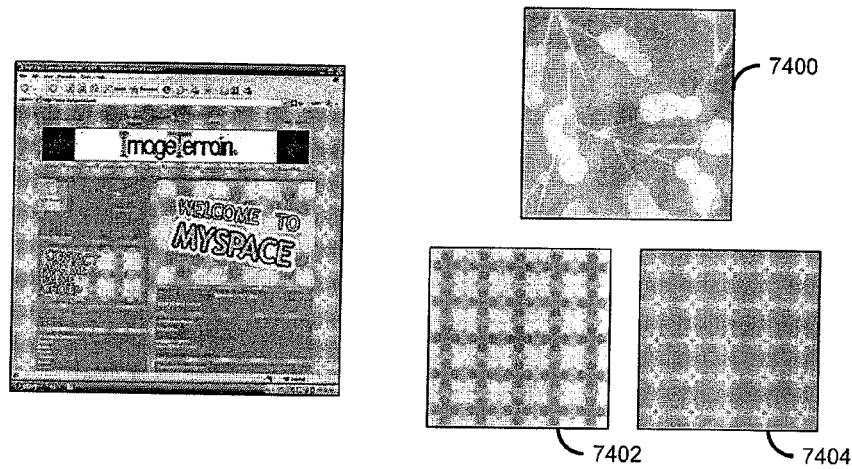
Figure 75:
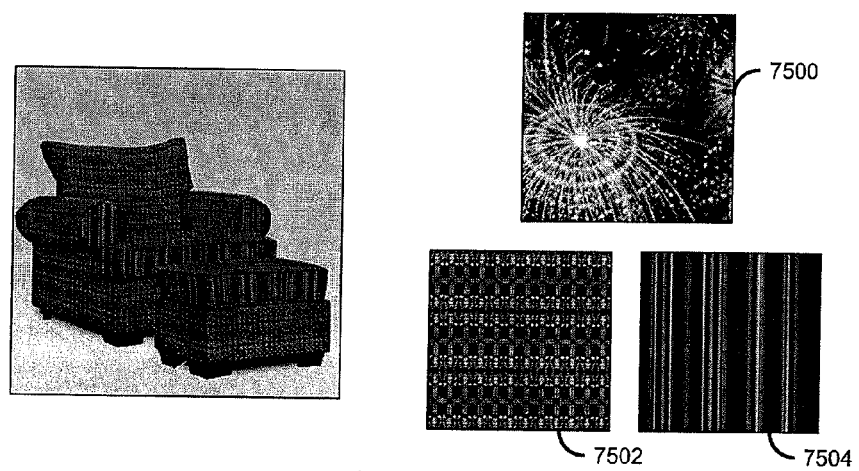
Figure 76:
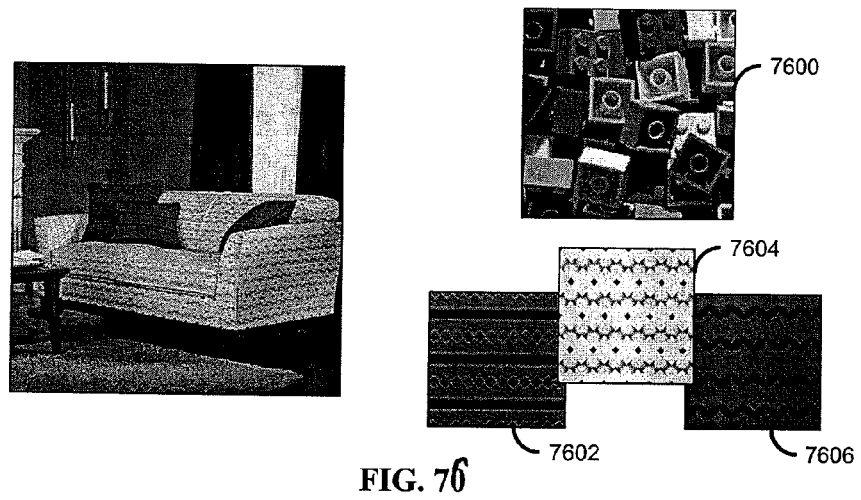

Referring now to FIG. 60, in accordance with embodiments of the present disclosure, a user may obtain or generate an image 6000 constituting part or all of a painting by an artist (e.g., and in this example, a painting by the artist Jackson Pollack). As shown in FIGS. 61, 62, and 63, a portion or portions of the Jackson Pollack image 6000 (FIG. 60) may be selected for use in generating a wide variety of images 6101-6104, 6201-6208, and 6301-6306.

Product Examples

Wallpaper, Bedding/Linens, Curtains, Clothing, Fine Art, Stationery, Dinnerware, Tiles, Carpets, Gift Wrap, Book Liners, Website Background, Chairs, Sofas, Etc.

In accordance with embodiments of the present disclosure, images and patterns created according to the methods disclosed herein, and by the use of the apparatus and systems described herein, may be used to adorn a wide variety of important and popular products. For example, in the textile industry, print, woven, and jacquard fabrics bearing or incorporating such images and patterns may be produced for use in home products and fashion apparel garments and accessories. In the field of paper products, wallpaper, stationery, gift-wrap, greeting cards, paper plates, and napkins bearing or incorporating such images and patterns may be produced. Other home products, such as carpeting, tiles, linoleum flooring, dinnerware, tabletops, and barware may be produced that bear or incorporate such images.

Many such examples are shown in FIGS. 64-76 and will now be described. A textile designer may start with an antique wallpaper swatch 6400 and create coordinated designs 6402, 6404 for use above and below the chair rail in a living room. The same textile designer may start with an antique ornately-designed single-color fabric swatch 6500 and create coordinated designs 6502, 6504 for use in a matched set of comforter, pillows, linen, curtains, and window treatments. A fashion designer may start with an eye-catching floral design 6600 and proceed to produce coordinated designs 6602, 6604 for use in ladies garments and matching neckerchiefs. An interior designer may start with an interesting, multi-textured image 6700 and create coordinated designs 6702, 6704 for use in matched set of fine art pieces. A graphic artist may start with a photo 6800 of wrapping paper with a ribbon arranged in a flower-like bow to create coordinated designs 6802, 6804 to place on personalized stationery. An industrial designer may begin with an antique design motif 6900 and proceed to produce coordinated designs 6902, 6904 for incorporation in cups, plates, and other dinnerware. A tile manufacturer may begin with a photograph 7000 of hay as a reference to create coordinated designs 7002, 7004 for kitchen wall/backsplash tiles. Another interior designer may begin with public domain imagery 7100 to create coordinated designs 7102, 7104 for the main area and peripheral border of an area rug. An artist begins with a photograph 7200 of ribbons and bows and creates a variety of designs 7202, 7204, 7206, and 7208 for the gift wrapping industry. A publisher begins with a simple image 7300 and creates coordinated designs 7302, 7304 for use in adorning the cover of a book. A web designer begins with an existing reference 7400 and proceeds to produce coordinated designs 7402, 7404 for use as background art for his site. A furniture designer begins with a photograph 7500 of a burst of fireworks and proceeds to produce coordinated designs 7502, 7504 for fabric for use as upholstery for a chair. The same furniture designer begins with a photograph 7600 of a pile of LEGO® brand building blocks and creates coordinated designs 7602, 7604, 7606 for a sofa and throw pillows.

Exemplary Software/Computer System Implementation

As discussed above, the above-described methods for generating product designs may be embodied in software and computer system/network applications configured to place the full power of such algorithms in the hands of designers and artists worldwide. A web-based system includes LINUX-based Cisco servers hosting an image generation and manipulation application. PHP is employed as the programming language, and MySQL for database functionality. The application is an on-demand service accessible by users via their web browsers, notably including the particularly well-functioning web browser Mozilla Firefox 2 & 3 for Apple Corporation's Macintosh computers and PCs provided by the Mozilla Corporation, a wholly-owned subsidiary of the Mozilla Foundation. Other web browsers observed to function adequately include Internet Explorer 7&8 in Windows, and Safari version 4 and above for Mac.

Although the present disclosure has been provided with reference to exemplary embodiments and implementations thereof, the present disclosure is not to be limited by such exemplary implementations. Rather, the disclosed apparatus, systems, products and methods are susceptible to many variations, enhancements, modifications and/or alternatives without departing from the spirit or scope of the present disclosure, as will be readily apparent to persons skilled in the art. Accordingly, the present disclosure extends to and encompasses such variations, enhancements, modifications and/or alternatives within its scope.

Since certain changes may be made in the above-described methods, apparatus, products, and systems without departing from the spirit and scope of the present invention, it is intended that all matter contained in the above description and shown in the accompanying drawings shall be interpreted as illustrative and not in a limiting sense.

The present invention may be embodied in other specific forms without departing from the spirit or essential attributes of the invention. Accordingly, reference should be made to the appended claims, rather than the foregoing specification, as indicating the scope of the invention.

What is claimed is:

1. A method for generating an ordered pattern based on an existing image, comprising:

providing a first image, the first image exhibiting an edgewise perimeter defining an isosceles right triangle including a first isosceles right triangle corner, a second isosceles right triangle corner, a third isosceles right triangle corner, a first isosceles right triangle leg extending between the first and second isosceles right triangle corners, a second isosceles right triangle leg joined to the first isosceles right triangle leg at the second isosceles right triangle corner and extending between the second isosceles right triangle corner and the third isosceles right triangle corner, and an isosceles right triangle hypotenuse joined to the second isosceles right triangle leg at the third isosceles right triangle corner, extending between the third isosceles right triangle corner and the first isosceles right triangle corner, and joined to the first isosceles right triangle leg at the first isosceles right triangle corner, including wherein each of the first and second isosceles right triangle legs exhibits a similar first length extent between the first and second isosceles right triangle corners, and the second and third isosceles right triangle corners, respectively, and the isosceles right triangle hypotenuse exhibits a second length extent between the third and first isosceles right triangle corners; and creating a second image based on the first image, the second image at least including a first portion formed in its entirety from a plurality of axially symmetrically mirrored or unmirrored, axially rotated or unrotated, and non-overlapping instances of the first image specifically arranged in the shape of a complete rectangle defining respective first and second pairs of parallel rectangle legs, each of the rectangle legs of the first pair of parallel rectangle legs exhibiting a similar third length extent between the rectangle legs of the second pair of parallel rectangle legs, and each of the rectangle legs of the second pair of parallel rectangle legs exhibiting a similar fourth length extent between the rectangle legs of the first pair of parallel rectangle legs;

wherein each of the third and fourth length extents associated with the complete rectangle is at least as long as at least one of the first and second length extents associated with the isosceles right triangle;

wherein a total area encompassed by the first portion of the second image is at least twice as large as a total area encompassed by the first image;

wherein the plurality of instances of the first image being specifically arranged in the shape of a complete rectangle includes wherein each instance of the first image of the plurality of instances of the first image is positioned adjacent to at least one other instance thereof, and further includes wherein adjacent instances of the first image of each pair of adjacent instances of the first image are one of: 1) joined at and aligned along their respective first isosceles right triangle leg, 2) joined at and aligned along their respective second isosceles right triangle leg, and 3) joined at and aligned along their respective isosceles right triangle hypotenuses, as well as two of: 4) joined at their respective first isosceles right triangle corners, 5) joined at their respective second isosceles right triangle corners, and 6) joined at their respective third isosceles right triangle corners;

wherein the step of providing the first image further includes:

selecting an existing image;

defining a pictorial reference based on the existing image, wherein the pictorial reference exhibits an edgewise perimeter defining a regular rectangle, the regular rectangle including a first leg, a second leg adjacent the first leg, a third leg adjacent the second leg, an fourth leg adjacent both the first leg and the third leg, a first corner joining the fourth leg and the first leg, a second corner joining the first leg and the second leg, a third corner joining the second leg and the third leg, and an fourth corner joining the third leg and the fourth leg; and selecting a first portion of the pictorial reference in the shape of an isosceles right triangle; and creating the first image by selecting and cropping from the pictorial reference a first portion thereof in the shape of an isosceles right triangle, the first portion of the pictorial reference being a half-portion of the pictorial reference associated with a first one of the first, second, third, and fourth corners of the regular rectangle such that the legs of the isosceles right triangle associated with the first portion of the pictorial reference are defined by a corresponding first unique pairing of the first, second, third, and fourth legs of the regular rectangle joined by the first one of the first, second, third, and fourth corners thereof, and the hypotenuse of the isosceles right triangle associated with the first portion of the pictorial reference extends diagonally across the regular rectangle between the regular rectangle legs of the first unique pairing; and wherein the method further comprises:

creating a third image by selecting and cropping from the pictorial reference a second portion thereof in the shape of an isosceles right triangle, the first and second portions of the pictorial reference overlapping each other to an extent of half the total area of each such portion, the second portion being a half-portion of the pictorial reference associated with a second one of the first, second, third, and fourth corners of the regular rectangle adjacent the first one thereof such that the legs of the isosceles right triangle associated with the second portion of the pictorial reference are defined by a corresponding second unique pairing of the first, second, third, and fourth legs of the regular rectangle joined by the second one of the first, second, third, and fourth corners thereof, and the hypotenuse of the isosceles right triangle associated with the second portion of the pictorial reference extends diagonally across the regular rectangle between the regular rectangle legs of the second unique pairing;

creating a second portion of the second image based on the third image, the second portion of the second image being formed in its entirety from a similar plurality of axially symmetrically mirrored or unmirrored, axially rotated or unrotated, and non-overlapping instances of the third image specifically arranged in the shape of a similar, complete rectangle defining respective third and fourth pairs of parallel rectangle legs, each of the rectangle legs of the third pair of parallel rectangle legs exhibiting a similar third length extent between the rectangle legs of the fourth pair of parallel rectangle legs, and each of the rectangle legs of the fourth pair of parallel rectangle legs exhibiting a similar fourth length extent between the rectangle legs of the third pair of parallel rectangle legs;

assembling the rectangle-shaped first portion of the second image and the rectangle-shaped second portion of the second image together, including wherein the first and second portions of the second image are joined at and aligned along respective corresponding instances of one of their respective first and second isosceles right triangle legs, and as well as each of: 1) joined at respective corresponding instances of one of their respective first isosceles right triangle corners positioned between the isosceles right triangle hypotenuse thereof and a first one of the isosceles right triangle legs thereof, and 2) joined at respective corresponding instances of another one of their respective second isosceles right triangle corners positioned between the first one of the isosceles right triangle legs thereof and the second one of the isosceles right triangle legs thereof;

creating a fourth image by selecting and cropping from the pictorial reference a third portion thereof in the shape of an isosceles right triangle, the second and third portions of the pictorial reference overlapping each other to an extent of half the total area of each such portion, the third portion being a half-portion of the pictorial reference associated with a third one of the first, second, third, and fourth corners of the regular rectangle adjacent the second one thereof such that the legs of the isosceles right triangle associated with the third portion of the pictorial reference are defined by a corresponding third unique pairing of the first, second, third, and fourth legs of the regular rectangle joined by the third one of the first, second, third, and fourth corners thereof, and the hypotenuse of the isosceles right triangle associated with the third portion of the pictorial reference being aligned with and coextensive with the hypotenuse of the isosceles right triangle associated with the first portion of the pictorial reference;

creating a third portion of the second image based on the fourth image, the third portion of the second image being formed in its entirety from a similar plurality of axially symmetrically mirrored or unmirrored, axially rotated or unrotated, and non-overlapping instances of the fourth image specifically arranged in the shape of a similar, complete rectangle defining respective fifth and sixth pairs of parallel rectangle legs, each of the rectangle legs of the fifth pair of parallel rectangle legs exhibiting a similar third length extent between the rectangle legs of the sixth pair of parallel rectangle legs, and each of the rectangle legs of the sixth pair of parallel rectangle legs exhibiting a similar fourth length extent between the rectangle legs of the fifth pair of parallel rectangle legs;

assembling the rectangle-shaped second portion of the second image and the rectangle-shaped third portion of the second image together, including wherein the second and third portions of the second image are joined at and aligned along respective corresponding instances of one of their respective first and second isosceles right triangle legs, and as well as each of: 1) joined at respective corresponding instances of one of their respective first isosceles right triangle corners positioned between the isosceles right triangle hypotenuse thereof and a first one of the isosceles right triangle legs thereof, and 2) joined at respective corresponding instances of another one of their respective second isosceles right triangle corners positioned between the first one of the isosceles right triangle legs thereof and the second one of the isosceles right triangle legs thereof;

creating a fifth image by selecting and cropping from the pictorial reference a fourth portion thereof in the shape of an isosceles right triangle, the third and fourth portions of the pictorial reference overlapping each other to an extent of half the total area of each such portion, and the fourth and first portions of the pictorial reference overlapping each other to an extent of half the total area of each such portion, the fourth portion being a half-portion of the pictorial reference associated with a fourth one of the first, second, third, and fourth corners of the regular rectangle adjacent each of the third and first ones thereof such that the legs of the isosceles right triangle associated with the fourth portion of the pictorial reference are defined by a corresponding fourth unique pairing of the first, second, third, and fourth legs of the regular rectangle joined by the fourth one of the first, second, third, and fourth corners thereof, and the hypotenuse of the isosceles right triangle associated with the fourth portion of the pictorial reference being aligned with and coextensive with the hypotenuse of the isosceles right triangle associated with the second portion of the pictorial reference;

creating a fourth portion of the second image based on the fifth image, the fourth portion of the second image being formed in its entirety from a similar plurality of axially symmetrically mirrored or unmirrored, axially rotated or unrotated, and non-overlapping instances of the fifth image specifically arranged in the shape of a similar, complete rectangle defining respective seventh and eighth pairs of parallel rectangle legs, each of the rectangle legs of the seventh pair of parallel rectangle legs exhibiting a similar third length extent between the rectangle legs of the eighth pair of parallel rectangle legs, and each of the rectangle legs of the eighth pair of parallel rectangle legs exhibiting a similar fourth length extent between the rectangle legs of the seventh pair of parallel rectangle legs; and assembling the rectangle-shaped third portion of the second image and the rectangle-shaped fourth portion of the second image together, including wherein the third and fourth portions of the second image are joined at and aligned along respective corresponding instances of one of their respective first and second isosceles right triangle legs, and as well as each of: 1) joined at respective corresponding instances of one of their respective first isosceles right triangle corners positioned between the isosceles right triangle hypotenuse thereof and a first one of the isosceles right triangle legs thereof, and 2) joined at respective corresponding instances of another one of their respective second isosceles right triangle corners positioned between the first one of the isosceles right triangle legs thereof and the second one of the isosceles right triangle legs thereof.

2. A method of generating an ordered pattern in accordance with claim 1, wherein the plurality of instances of the first image includes a total of two instances of the first image, the complete rectangle is a regular rectangle, or square, and each of the third and fourth length extents associated with the complete rectangle is equivalent in length to the first length extent associated with the isosceles right triangle.

3. A method of generating an ordered pattern in accordance with claim 1, wherein the plurality of instances of the first image includes a total of four instances of the first image, the complete rectangle is a regular rectangle, or square, and each of the third and fourth length extents associated with the complete rectangle is equivalent in length to the second length extent associated with the isosceles right triangle.

4. A method of generating an ordered pattern in accordance with claim 1, wherein the plurality of instances of the first image includes a total of four instances of the first image, the complete rectangle is a regular rectangle, or square, and each of the third and fourth length extents associated with the complete rectangle is twice as long as the first length extent associated with the isosceles right triangle.

5. A method of generating an ordered pattern in accordance with claim 1, wherein the plurality of instances of the first image includes at least four instances of the first image.

6. A method of generating an ordered pattern in accordance with claim 1, wherein the complete rectangle is a regular rectangle, or square, and each of the third and fourth length extents associated with the complete rectangle is at least three times as long as one of the first and second length extents associated with the isosceles right triangle.

7. A method of generating an ordered pattern in accordance with claim 1, wherein the complete rectangle is an oblong rectangle.

8. A method of generating an ordered pattern in accordance with claim 1, wherein the complete rectangle is an oblong rectangle, and one of the third and fourth length extents associated with the complete rectangle is equivalent in length to one of the first and second length extents associated with the isosceles right triangle.

9. A method of generating an ordered pattern in accordance with claim 1, wherein the complete rectangle is an oblong rectangle, a first one of the third and fourth length extents associated with the complete rectangle is at least twice as long as one of the first and second length extents associated with the isosceles right triangle, and the other of the third and fourth length extents associated with the complete rectangle is longer than the first one thereof.

10. A method for generating an ordered pattern from an existing image in accordance with claim 1, wherein each of the rectangle associated with the first portion of the second image, the rectangle associated with the second portion of the second image, the rectangle associated with the third portion of the second image, and the rectangle associated with the fourth portion of the second image, defines a single primary square formed from two instances of the respective one of the first, third, fourth, and fifth image mirrored about the respective isosceles right triangle hypotenuse.

11. A method for generating an ordered pattern from an existing image in accordance with claim 1, wherein each of the rectangle associated with the first portion of the second image, the rectangle associated with the second portion of the second image, the rectangle associated with the third portion of the second image, and the rectangle associated with the fourth portion of the second image, defines a total of nine primary squares assembled in a 3×3 matrix, each primary square of the total of nine primary squares being formed from a total of two instances of the respective one of the first, third, fourth, and fifth image.

12. A method for generating an ordered pattern from an existing image in accordance with claim 1, further comprising:
  incorporating the pictorial reference in a regular N×N array of multiple adjacent pictorial references based on the existing image, wherein N is a whole number greater than or equal to two (2);
  repeating all of the above steps with respect to each of the other pictorial references of the regular N×N array of multiple adjacent pictorial references; and
  generating a horizontally and vertically continuous matrix of images formed from respective 3×3 matrix images formed from each of at least three of the four isosceles right triangles associated with each of the pictorial references in the pictorial references of the N×N array.

13. A method of generating an ordered pattern in accordance with claim 1, wherein the plurality of mirrored or non-mirrored, rotated or non-rotated, and non-overlapping instances of the first image specifically arranged in the shape of a complete rectangle includes a total of eighteen (18) non-overlapping instances of the first image forming a regular rectangle including primary squares assembled together in a 3×3 matrix bi-quadrant, and wherein the method further comprises one of:
  1) selecting a portion of the 3×3 matrix hi-quadrant for further processing, the portion comprising a centered pattern square or an offset pattern square, and creating a further 3×3 matrix bi-quadrant based on the centered pattern square;
  2) selecting a portion of the 3×3 matrix hi-quadrant for further processing, the portion comprising a pixel line, and extending the pixel line in a direction normal to the direction of extension of the pixel line to create a set of parallel stripes based on the pixel line; or
  3) selecting a portion of the 3×3 matrix bi-quadrant for further processing, the portion comprising a linear portion thereof having a width of at least two pixel lines, and replicating or mirroring the linear portion as necessary in a direction normal to the direction of extension of the linear portion to create a set of parallel pattern stripes based on the linear portion.

14. A method of generating an ordered pattern in accordance with claim 1, wherein the method comprises selecting a portion of the 3×3 matrix bi-quadrant for further processing, the portion comprising a pixel line, and extending the pixel line in a direction normal to the direction of extension of the pixel line to create a set of parallel stripes based on the pixel line, and further comprises:
  rotating the pixel line ninety (90) degrees;
  extending the pixel line in a direction normal to the direction of extension of the pixel line to create another set of parallel stripes based on the pixel line; and
  combining the first and second set of parallel stripes to create a plaid pattern.

15. A method of generating an ordered pattern in accordance with claim 1, wherein the first image includes an image of a set of parallel stripes or a set of parallel pattern stripes, wherein the stripes of the set of parallel stripes or the stripes of the set of parallel pattern stripes are oriented at an angle to one or both of the horizontal and the vertical.

16. A method of generating an ordered pattern in accordance with the steps of at least one or more of the claims 1, 2, 3, 4, 5, 6, 7, 8, 9, 10, 11, 12, 13, 14, and 15, further comprising:
adorning a product with an ordered pattern by incorporating at least one instance of the second image into a visible surface of the product;
wherein the product is one or more selected from the group comprising: a flexible fabric, a textile, a print fabric, a woven fabric, a jacquard fabric, a wearable garment, a paper product, wallpaper, stationery, gift-wrap, a greeting card, a paper plate, a napkin, a rug, a tile, linoleum flooring, dinnerware, a tabletop, barware, a comforter, a pillow, linen, a curtain, a window treatment, a neckerchief, a computer display, upholstery for a chair, upholstery for a sofa, a light-projection transparency, and an architectural window.

17. A method for generating an ordered pattern based on an existing image, comprising:
providing a first image, the first image exhibiting an edgewise perimeter defining an isosceles right triangle including a first isosceles right triangle corner, a second isosceles right triangle corner, a third isosceles right triangle corner, a first isosceles right triangle leg extending between the first and second isosceles right triangle corners, a second isosceles right triangle leg joined to the first isosceles right triangle leg at the second isosceles right triangle corner and extending between the second isosceles right triangle corner and the third isosceles right triangle corner, and an isosceles right triangle hypotenuse joined to the second isosceles right triangle leg at the third isosceles right triangle corner, extending between the third isosceles right triangle corner and the first isosceles right triangle corner, and joined to the first isosceles right triangle leg at the first isosceles right triangle corner, including wherein each of the first and second isosceles right triangle legs exhibits a similar first length extent between the first and second isosceles right triangle corners, and the second and third isosceles right triangle corners, respectively, and the isosceles right triangle hypotenuse exhibits a second length extent between the third and first isosceles right triangle corners; and
creating a second image based on the first image, the second image at least including a first portion formed in its entirety from a plurality of axially symmetrically mirrored or unmirrored, axially rotated or unrotated, and non-overlapping instances of the first image specifically arranged in the shape of a complete rectangle defining respective first and second pairs of parallel rectangle legs, each of the rectangle legs of the first pair of parallel rectangle legs exhibiting a similar third length extent between the rectangle legs of the second pair of parallel rectangle legs, and each of the rectangle legs of the second pair of parallel rectangle legs exhibiting a similar fourth length extent between the rectangle legs of the first pair of parallel rectangle legs;
wherein each of the third and fourth length extents associated with the complete rectangle is at least as long as at least one of the first and second length extents associated with the isosceles right triangle;
wherein a total area encompassed by the first portion of the second image is at least twice as large as a total area encompassed by the first image;
wherein the plurality of instances of the first image being specifically arranged in the shape of a complete rectangle includes wherein each instance of the first image of the plurality of instances of the first image is positioned adjacent to at least one other instance thereof, and further includes wherein adjacent instances of the first image of each pair of adjacent instances of the first image are one of: 1) joined at and aligned along their respective first isosceles right triangle leg, 2) joined at and aligned along their respective second isosceles right triangle leg, and 3) joined at and aligned along their respective isosceles right triangle hypotenuses, as well as two of: 4) joined at their respective first isosceles right triangle corners, 5) joined at their respective second isosceles right triangle corners, and 6) joined at their respective third isosceles right triangle corners; and
wherein the step of providing the first image further includes:
selecting an existing image;
defining a pictorial reference based on the existing image, wherein the pictorial reference exhibits an edgewise perimeter defining a regular rectangle, the regular rectangle including a first leg, a second leg adjacent the first leg, a third leg adjacent the second leg, an fourth leg adjacent both the first leg and the third leg, a first corner joining the fourth leg and the first leg, a second corner joining the first leg and the second leg, a third corner joining the second leg and the third leg, and an fourth corner joining the third leg and the fourth leg; and
selecting a first portion of the pictorial reference in the shape of an isosceles right triangle; and creating the first image by selecting and cropping from the pictorial reference a first portion thereof in the shape of an isosceles right triangle, the first portion of the pictorial reference being a half-portion of the pictorial reference associated with a first one of the first, second, third, and fourth corners of the regular rectangle such that the legs of the isosceles right triangle associated with the first portion of the pictorial reference are defined by a corresponding first unique pairing of the first, second, third, and fourth legs of the regular rectangle joined by the first one of the first, second, third, and fourth corners thereof, and the hypotenuse of the isosceles right triangle associated with the first portion of the pictorial reference extends diagonally across the regular rectangle between the regular rectangle legs of the first unique pairing.

18. A method for generating an ordered pattern based on an existing image, comprising:
providing a first image, the first image exhibiting an edgewise perimeter defining an isosceles right triangle including a first, a second and a third isosceles right triangle corner, a first and a second isosceles right triangle legs, and an isosceles right triangle hypotenuse wherein the first and second isosceles right triangle legs exhibit a first length extent and the isosceles right triangle hypotenuse exhibits a second length extent;
creating a mirror image of the first image and combining the mirror image and the first image to form a larger image; and
creating a second image based on the first image, the second image at least including a first portion formed in its entirety from a plurality of axially symmetrically mirrored or unmirrored, axially rotated or unrotated, and non-overlapping instances of the larger image specifically arranged in the shape of a rectangle defining respective first and second pairs of parallel rectangle legs, each of the rectangle legs of the first pair of parallel rectangle legs exhibits a similar third length extent between the rectangle legs of the second pair of parallel rectangle legs, and each of the rectangle legs of the second pair of parallel rectangle legs exhibiting a similar fourth length extent between the rectangle legs of the first pair of parallel rectangle legs;

wherein the second image is defined by instances of the first image and the mirror image;

wherein the third and fourth length extents associated with the rectangle is at least as long as one of the first and second length extents associated with the isosceles right triangle;

wherein the plurality of instances of the larger image being specifically arranged in the shape of a rectangle includes wherein each instance of the larger image of the plurality of instances of the larger images is positioned adjacent to at least one other instance thereof, including wherein adjacent instances of the larger image of each pair of adjacent instances of the first image are one of: 1) joined at and aligned along their respective first isosceles right triangle legs, 2) joined at and aligned along their respective second isosceles right triangle legs, and 3) joined at and aligned along their respective isosceles right triangle hypotenuses, as well as two of: 4) joined at their respective first isosceles right triangle corners, 5) joined at their respective second isosceles right triangle corners, and 6) joined at their respective third isosceles right triangle corners, and wherein the plurality of instances of the larger image being specifically arranged in the shape of a rectangle includes positioning the plurality of instances of the first image adjacent to other instances of the first image and positioning the plurality of instances of the mirror image adjacent to other instances of the mirror image;

wherein the step of providing the first image includes:
  selecting an existing image,
  defining a pictorial reference based on the selected image, the pictorial reference exhibiting an edgewise perimeter defining a regular rectangle, the regular rectangle including a first leg, a second leg adjacent the first leg, a third leg adjacent the second leg, a fourth leg adjacent both the first leg and the third leg, a first corner joining the fourth leg and the first leg, a second corner joining the first leg and the second leg, a third corner joining the second leg and the third leg, and an fourth corner joining the third leg and the fourth leg,
  dividing the pictorial reference in half along a first diagonal line extending between the first and the third corners and dividing the pictorial reference in half along a second diagonal line extending between the second and the fourth corners so as to form four different portions of the pictorial reference in the shape of isosceles right triangles,
  selecting a first portion of the pictorial reference among the four different portions; and
  creating the first image by selecting and cropping the first portion of the pictorial reference.

* * * * *